United States Patent
Takai

(10) Patent No.: US 6,661,766 B2
(45) Date of Patent: *Dec. 9, 2003

(54) DISK APPARATUS AND DISK MAGAZINE WITH UPPER AND LOWER SECTIONS

(75) Inventor: Kazuki Takai, Tokyo (JP)

(73) Assignee: Clarion Co., Ltd., Saitama-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/906,417

(22) Filed: Jul. 16, 2001

(65) Prior Publication Data

US 2001/0038599 A1 Nov. 8, 2001

Related U.S. Application Data

(62) Division of application No. 09/245,936, filed on Feb. 5, 1999, now Pat. No. 6,262,952.

(30) Foreign Application Priority Data

Feb. 17, 1998 (JP) .......................................... 10-034604

(51) Int. Cl.[7] .............................................. G11B 17/30
(52) U.S. Cl. ...................................................... 369/192
(58) Field of Search ................................ 369/192, 179, 369/263, 30.82, 30.85, 30.81, 99.12, 75.2

(56) References Cited

U.S. PATENT DOCUMENTS

| | | | | |
|---|---|---|---|---|
| 5,014,143 A | * | 5/1991 | Mori et al. .............. | 360/99.12 |
| 5,042,024 A | | 8/1991 | Kurosawa et al. ......... | 369/75.1 |
| 5,101,399 A | * | 3/1992 | Watanabe et al. ........... | 369/263 |
| 5,123,001 A | | 6/1992 | Nakamichi et al. ...... | 369/30.67 |
| 5,461,518 A | | 10/1995 | Saiki et al. ................... | 360/69 |
| 5,481,512 A | * | 1/1996 | Morioka et al. ......... | 369/30.82 |
| 5,602,818 A | * | 2/1997 | Kage et al. ................ | 369/75.2 |
| 5,682,364 A | * | 10/1997 | Ogawa .................... | 369/30.81 |
| 5,761,007 A | | 6/1998 | Price et al. .............. | 360/264.4 |
| 5,852,597 A | | 12/1998 | Fujisawa et al. ............ | 369/192 |
| 5,862,109 A | | 1/1999 | Nakamichi ............... | 369/30.85 |
| 5,870,358 A | * | 2/1999 | Kim et al. ................ | 369/30.85 |

FOREIGN PATENT DOCUMENTS

| | | |
|---|---|---|
| DE | 4005058 | 8/1990 |
| DE | 19753690 | 7/1998 |
| EP | 519069 | 12/1992 |
| EP | 724261 | 7/1995 |
| EP | 833324 | 4/1998 |
| JP | 9320165 | 12/1997 |
| JP | 10106114 | 4/1998 |
| JP | 10293954 | 11/1998 |

* cited by examiner

*Primary Examiner*—Tianjie Chen

(57) ABSTRACT

A magazine casing is composed of a magazine upper section and a magazine lower section. A chassis unit includes a magazine shift unit for lifting the magazine upper section, a vertical-tracking unit for selecting a desired disk, a swing unit transferred into a space between the divided magazine upper section and the magazine lower section, and a drive unit provided on the swing unit for playing back the selected disk. A vertical guide hole is formed in the magazine upper section. The chassis unit is provided with a vertical guide shaft that is inserted into the guide hole when lifting the magazine upper section.

13 Claims, 41 Drawing Sheets

DISK APPARATUS AND DISK MAGAZINE WITH UPPER AND LOWER SECTIONS

This divisional application of U.S. Ser. No. 09/245,936, filed on Feb. 5, 1999, now U.S. Pat. No. 6,262,952.

BACKGROUND OF THE INVENTION

1. Field of the Invention

The present invention relates to a disk apparatus which selects a desired disk from a disk magazine accommodating therein a plurality of disks for playback and/or recording. More particularly, the present invention relates to a disk apparatus which performs disk selecting and playback and/or recording with a disk magazine divided into upper and lower sections, thereby allowing components thereof to be arranged adjacent to each other so as to allow a reduction in size of the overall apparatus, and to a disk magazine used therewith.

2. Description of the Related Art

In recent years, disk apparatuses, such as CD players and MD players, using disks as a medium, have become very popular. In particular, an auto-changer-type disk apparatus has been developed wherein a desired disk is selected from a disk magazine accommodating therein a plurality of disks for playback. The auto-changer-type disk apparatus is particularly convenient as a disk apparatus for use in a vehicle because there is no need to load and unload disks one by one each time the disks to be played are exchanged.

In the disk apparatus of the type described above using a disk magazine, a disk playback section is arranged adjacent to a magazine accommodation section. In a large number of such disk apparatuses, a desired disk in a magazine is pulled out and transported by a transporting mechanism to the disk playback section to be set thereat, and then a disk playback is performed. With this arrangement, however, a certain distance must be provided between the disk playback section and the magazine accommodation section in order to conserve space for setting the disk to the disk playback section for playback. Accordingly, the overall disk apparatus must be of increased size, and the disk apparatus is disadvantageous as an in-vehicle apparatus in which a mounting space is restricted.

For example, in a recent in-vehicle audio apparatus, the size of the opening for accommodating the equipment in vehicles has been standardized to 180 mm by 50 mm, called a "DIN size", or 180 mm by 100 mm, called a "double-DIN size". In addition, the depth of the opening is only about 160 mm at present, so that audio device-mounting space in a vehicle is restricted.

Since compact disks are 120 mm in diameter, 240 mm (=120 mm×2) in the longest width direction is required for the above disk apparatus. Accordingly, the device cannot be accommodated in the opening located beside the driver's seat.

In view of the foregoing circumstances, a conventional CD auto-changer is accommodated in the trunk of a vehicle, or near the foot of the driver's seat. In the former case, however, the trunk space is reduced, the trunk must be opened each time disks are exchanging, and a long line connecting the trunk and an operating section is required. In the latter case, there is a risk that foot space will be reduced, resulting in breakage of the auto-changer when accidentally impacted by the driver's foot.

In order to cope with the above problems, Japanese Unexamined Patent Publication No. 6-203519 discloses a disk apparatus in which a disk magazine is divided into upper and lower sections, and disk playback is performed with a disk playback section transferred therebetween. In such a disk apparatus, a disk accommodation position overlaps a disk playback position, so that a horizontal dimension can be reduced.

The disk magazine is usually divided by a magazine holder provided on a chassis unit to be movable in the vertical direction. That is, the arrangement is such that a pin fixed to the magazine holder is inserted into a step-wise cam formed on a cam plate, and the cam plate is slidably moved back and forth, thereby moving the magazine holder upward together with the pin moving within the step-wise cam. Then, an upper disk magazine is held by the magazine holder, and the magazine holder is moved upward, whereby the upper disk magazine is lifted together with an internal tray to be divided from a lower disk magazine.

The disk apparatus using the above divided disk magazine has the following drawbacks which must be overcome. When the divided upper and lower disk magazines are reunited, the shift of the disk magazines makes the reuniting impossible and causes operation failure. This problem may be overcome by employing a solid holding mechanism, or by increasing positioning accuracy. However, a complicated mechanism and expensive components are required, so that the size cannot be decreased or the cost is disadvantageously increased.

In order to smoothly move the magazine holder up and down by the cam plate as described above, it is necessary to provide two cam plates at opposite positions, such as left and right or front and back, of the magazine holder. However, when the disk playback section is transferred into a space between the divided disk magazines, it is necessary to allow a transferring disk playback section to stand by at either left or right position of the magazine holder. Thus, in a compact disk apparatus such as within the DIN size, it is difficult for the cam plate provided on the standby side of the disk playback section to ensure a longitudinal stroke. In addition, since the front of the magazine holder must be opened as a magazine insertion opening, it is impractical to provide the cam plates in front and back of the magazine holder.

In the in-vehicle disk apparatus, a vibration-proof mechanism using a damper, etc., is provided on the disk playback section in order to reduce effects of external vibrations. The disk playback section is, however, definitely provided with an optical pickup that moves in a radial direction of the disk. For this reason, the damper must be provided outside the movement range of the optical pickup so as not to disturb the movement of the optical pickup. Accordingly, an additional area for the damper is required for the disk playback section, so that overall size of the disk apparatus is increased.

The disk playback section is usually provided on a swing unit that rotates about a rotation shaft. Thus, when the swing unit is transferred into a space between the vertically divided disk magazines, the disk playback section is supported only by a rotation support of the swing unit, and is easily affected by vibrations. Accordingly, the disk apparatus is disadvantageous as the in-vehicle disk apparatus.

When a disk signal surface is directly touched by hands, fingerprints are left thereon, resulting in poor playback. Thus, extreme care must be taken in moving the disk into and out of the disk magazine. The disk magazine has a structure such that the disk is moved into and out of a space formed between trays that partition the inside of the disk magazine into multiple stages. Accordingly, when the disk is inserted into the disk magazine, the disk is grasped at its outer periphery, inserted into the disk magazine, and then pressed at its rear end, whereby the disk can be easily inserted without being touched by hands at the signal-encoding surface thereof. When taking the disk out of the disk magazine, however, it is necessary to eject the disk, and to pick up the disk while the disk partly protrudes from the disk magazine. Thus, fingerprints might be left on the signal-encoding surface.

This might be avoided by a configuration such that the outside shape of the disk magazine is reduced and the disk is exposed to some extent in advance. By this configuration, the amount of protrusion of the disk when it is removed from the disk magazine can be increased, and the disk can be easily taken out of the disk magazine without being touched by hands at its signal-encoding surface. In this case, however, the exposed part of the disk might be scratched when the disk magazine is inserted into and ejected from the disk apparatus or when transporting the disk magazine.

SUMMARY OF THE INVENTION

Accordingly, it is an object of the present invention to provide a disk apparatus which can realize an advantageous operation by preventing a shift caused in dividing a disk magazine into upper and lower sections or in uniting the divided sections of the disk magazine with a simple mechanism.

It is another object of the present invention to provide a compact disk apparatus which can provide a transfer structure of a disk playback section and a lift structure of a magazine holder in a narrow space.

It is another object of the present invention to provide a compact disk apparatus which can save space for dampers without damaging the vibration-reducing capability.

It is another object of the present invention to provide a disk apparatus which can more firmly hold a swing unit provided with a disk playback section, and which is resistant to vibrations during playing back of the disk.

It is another object of the present invention to provide a disk magazine which can prevent contamination of a signal-encoding surface when loading and unloading a disk, and prevent damage to the disk when being inserted into and ejected from a disk apparatus.

In accordance with a first aspect of the present invention, there is provided a disk apparatus including a disk magazine having a plurality of trays, each tray having mounted therein a disk, the disk magazine divided into upper and lower sections, a chassis unit for mounting therein the disk magazine, a magazine dividing section for dividing and uniting the disk magazine mounted in the chassis unit, a disk selecting section for selecting a desired disk, a swing unit transferred into a space between the divided upper and lower sections of the disk magazine, and a disk playback section provided on the swing unit for playing back the disk selected by the disk selecting section, wherein a vertical guide hole is formed in at least one of the upper section and the lower section of the disk magazine, and wherein the chassis unit is provided with a vertical guide shaft inserted into the guide hole when dividing and uniting the disk magazine.

In accordance with the described arrangements, the upper section or the lower section of the disk magazine is moved in a vertical direction when dividing the disk magazine by the magazine dividing section. At this time, the guide shaft is inserted into the guide hole formed in at least one of the upper section and the lower section of the disk magazine. When the divided magazine upper section and the magazine lower section are united, the movement of the magazine upper section or the magazine lower section is guided by the guide shaft, so that the positional deviation of the magazine upper section and the magazine lower section is prevented and operation failure is not caused.

In accordance with a second aspect of the present invention, there is provided a disk apparatus including a disk magazine having a plurality of trays, each tray having mounted therein a disk, the disk magazine divided into upper and lower sections, a chassis unit for mounting therein the disk magazine, a magazine dividing section for dividing and uniting the disk magazine mounted in the chassis unit, a disk selecting section for selecting a desired disk, a swing unit transferred into a space between the divided upper and lower sections of the disk magazine, and a disk playback section provided on the swing unit for playing back the disk selected by the disk selecting section, wherein the disk dividing section includes a magazine holder provided on the chassis unit to be engaged with at least one of the upper section and the lower section of the disk magazine, a cylindrical cam rotatably provided on the chassis unit, and a drive source for rotating the cylindrical cam, the chassis unit lifted thereby, wherein a holder guide pin is formed on one end of said magazine holder, wherein a helical cam is formed on the outer surface of the cylindrical cam, and wherein the holder guide pin is inserted into the helical cam.

In accordance with the described arrangements, the magazine holder is moved upward and downward by the cylindrical cam that is relatively small in its depth and width dimensions, thereby allowing the members to be arranged with a space efficiency, and the overall apparatus is easily reduced in size.

In the disk apparatus in accordance with the present invention, the magazine driving section may further include a magazine shift plate provided on the chassis unit so as to slide back and forth, and a transmission mechanism for transmitting a driving force of the drive source to the magazine shift plate. In addition, the cylindrical cam and the magazine shift plate may preferably be provided on a transfer side of the disk playback section and on the opposite side thereof sandwiching the magazine holder therebetween. In addition, holder guide pins may preferably be provided on the side of the cylindrical cam and on the side of the magazine shift plate of the magazine holder. The magazine shift plate may preferably be provided with an inclined cam. In addition, one of the holder guide pins may be inserted into the helical cam of the cylindrical cam, and the other holder guide pin may be inserted into the inclined cam of the magazine shift plate.

In accordance with the described arrangements, the depth stroke is reduced on the transfer side of the disk playback section. However, since a long depth stroke is not required for the cylindrical cam, the magazine holder is smoothly lifted. In addition, since the depth stroke is easily conserved on the opposite side of the transfer side of the disk playback section, the width of the apparatus can be reduced by using the magazine shift plate that requires the depth stroke and is small in its width dimension. Accordingly, a transfer structure of the disk playback section and a lift structure of the magazine holder can be realized in a narrow space, thereby allowing a reduction in size of the overall apparatus.

In accordance with a third aspect of the present invention, there is provided a disk apparatus including a disk magazine having a plurality of trays, each tray having mounted therein a disk, the disk magazine divided into upper and lower sections, a chassis unit for mounting therein the disk magazine, a magazine dividing section for dividing and uniting the disk magazine mounted in the chassis unit, a disk selecting section for selecting a desired disk, a swing unit transferred into a space between the divided upper and lower sections of the disk magazine, and a disk playback section provided on the swing unit for playing back the disk selected by the disk selecting section, wherein the disk playback section is supported on the swing unit by a plurality of dampers, and wherein at least one of the dampers is a movable damper provided so as to move between an accommodation position within a movable range of the disk playback section and a retracted position beyond the movable range of the disk playback section.

In accordance with the described arrangements, the movable damper is located at the accommodation position at the time of standby of the swing unit, and the movable damper is removed from the movable range of the disk playback section to perform disk playback operation, whereby space required for the dampers can be saved without damaging the vibration-reducing capability of the dampers.

The disk apparatus in accordance with the present invention may further include a floating lock mechanism for providing a floating locked state in which deviation of the disk playback section is restricted before the swing unit is transferred, and for providing a floating locked state in which the disk playback section is supported by only the dampers after the swing unit has been transferred, and a gear mechanism for synchronizing the floating lock mechanism and the movable damper so that the movable damper is located on the accommodation position when the disk playback section is in the former floating locked state, and the movable damper is located at the retracted position when the disk playback section is in the latter floating locked state.

In accordance with the described arrangements, the movable damper can be moved in synchronism with the floating lock mechanism, so that the movable damper can be moved to the retracted position only when damper support is required.

In accordance with a fourth aspect of the present invention, there is provided a disk apparatus including a disk magazine having a plurality of trays, each tray having mounted therein a disk, the disk magazine divided into upper and lower sections, a chassis unit for mounting therein the disk magazine, a magazine dividing section for dividing and uniting the disk magazine mounted in the chassis unit, a disk selecting section for selecting a desired disk, a swing unit transferred into a space between the divided upper and lower sections of the disk magazine, and a disk playback section provided on the swing unit for playing back the disk selected by the disk selecting section, wherein the chassis unit is provided with a holding section for holding the terminal end of the transferred swing unit.

In accordance with the described arrangements, the terminal end of the swing unit is supported by the holding section during the disk playback. Thus, the swing chassis is supported by a rotation support and the holding section, and is hardly affected by vibrations.

The disk apparatus in accordance with the present invention may further include a hold arm for holding an end of the swing unit opposite to the terminal end held by the holding section when the swing unit is transferred.

In accordance with the described arrangement, the terminal end of the swing unit is held by the holding section, and the opposite end thereof is held by the hold arm during the disk playback. Thus, the swing unit is supported by the rotation support, the holding section, and the hold arm, and is more hardly affected by vibrations.

The disk apparatus in accordance with the present invention may further include a hold plate for pressing the hold arm in the direction to hold the swing unit when the swing unit is transferred.

In accordance with the described arrangement, the swing unit is supported by the rotation support, the holding section, and the hold arm, and the hold plate presses the hold arm during the disk playback. Thus, the swing unit is held more firmly.

In accordance with a fifth aspect of the present invention, there is provided a disk magazine including a casing having an upper plate, a lower plate and a side plate, and a plurality of trays provided in the casing on multiple stages, the disk magazine capable of accommodating a disk between the trays from a side surface of an opening of the casing, wherein at least one of said upper plate and said lower plate has a cutout formed on the side surface of an opening thereof.

In accordance with the described arrangements, since the disk accommodated in the disk magazine is substantially covered with the magazine upper section and the magazine lower section, the disk may not be damaged when the disk magazine is inserted into and ejected from the disk apparatus. In addition, when the disk is partly ejected in order to take out the disk, a part of the outer periphery of the disk is exposed from the cutout. Accordingly, the disk can easily be taken out of the disk magazine by being grasped at its exposed end portion without being touched by hands at the signal-encoding surface thereof.

In the disk magazine in accordance with the present invention, a disk ejection lever may preferably be provided on the opposite side of the side surface of the opening. In addition, one end of the disk ejection lever may abut against an edge of the disk so as to press the disk. Furthermore, the other end of the disk ejection lever may preferably be exposed so as to be rotationally operated from the outside.

In accordance with the described arrangements, the disk can easily be ejected by rotationally operating the disk ejection lever from the outside, and the disk can easily be pulled out by being grasped at its exposed end portion.

BRIEF DESCRIPTION OF THE DRAWINGS

FIGS. 14A to 14C illustrate the vertical-tracking unit and a loading gear for driving the magazine eject unit, in which FIG. 14A is a top view, FIG. 14B is a side view, and FIG. 14C is a bottom view;

FIGS. 20A to 20C illustrate a cam bear of the drive unit shown in FIG. 17 in which FIG. 20A is a top view, FIG. 20B is a side view, and FIG. 20C is a bottom view;

FIG. 29 is a partially transparent plan view showing a state in which the magazine shown in FIG. 1 is pulled in;

DESCRIPTION OF THE PREFERRED EMBODIMENTS

First Embodiment

A first embodiment of the present invention will now be described with reference to FIGS. 1 to 42.

(1) Configuration

1. Overall Configuration

Figure 1:
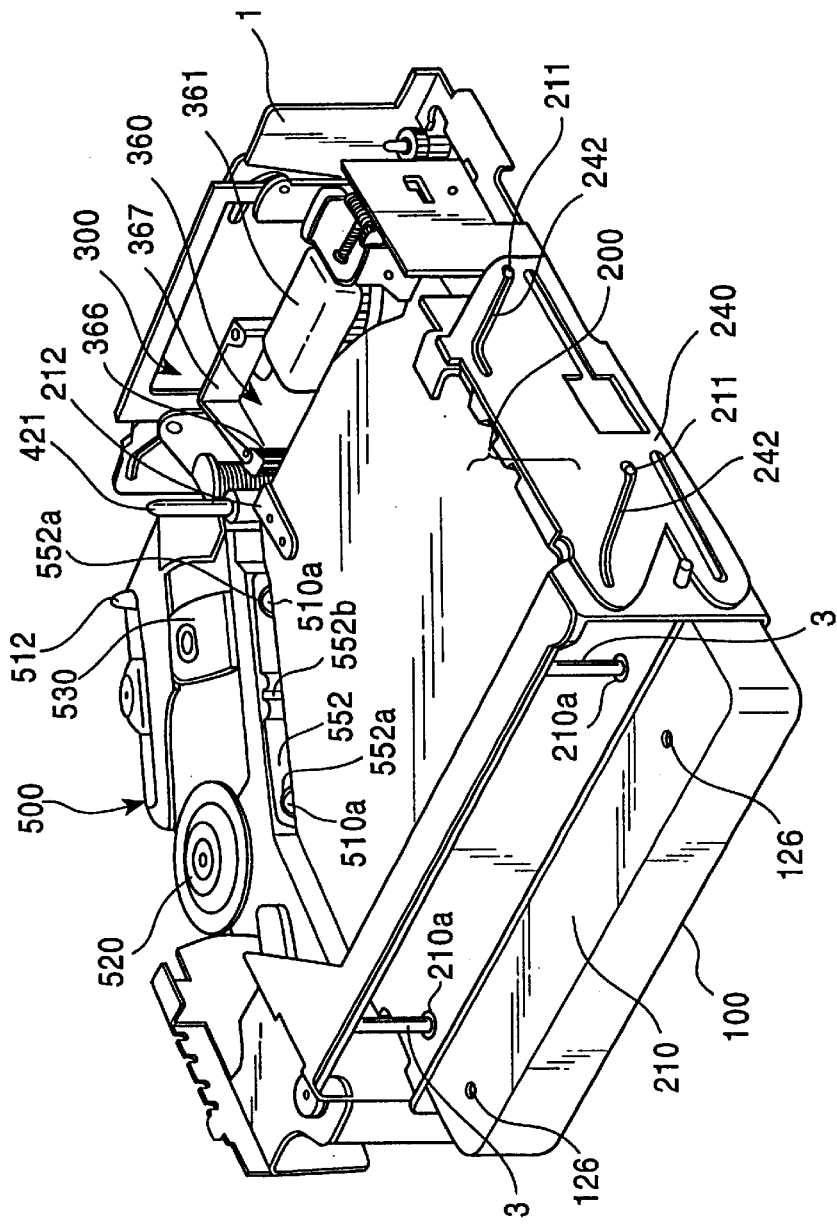
FIG. 1 is an external perspective view of a disk apparatus in accordance with a first embodiment of the present invention as viewed from the front.
Figure 2:
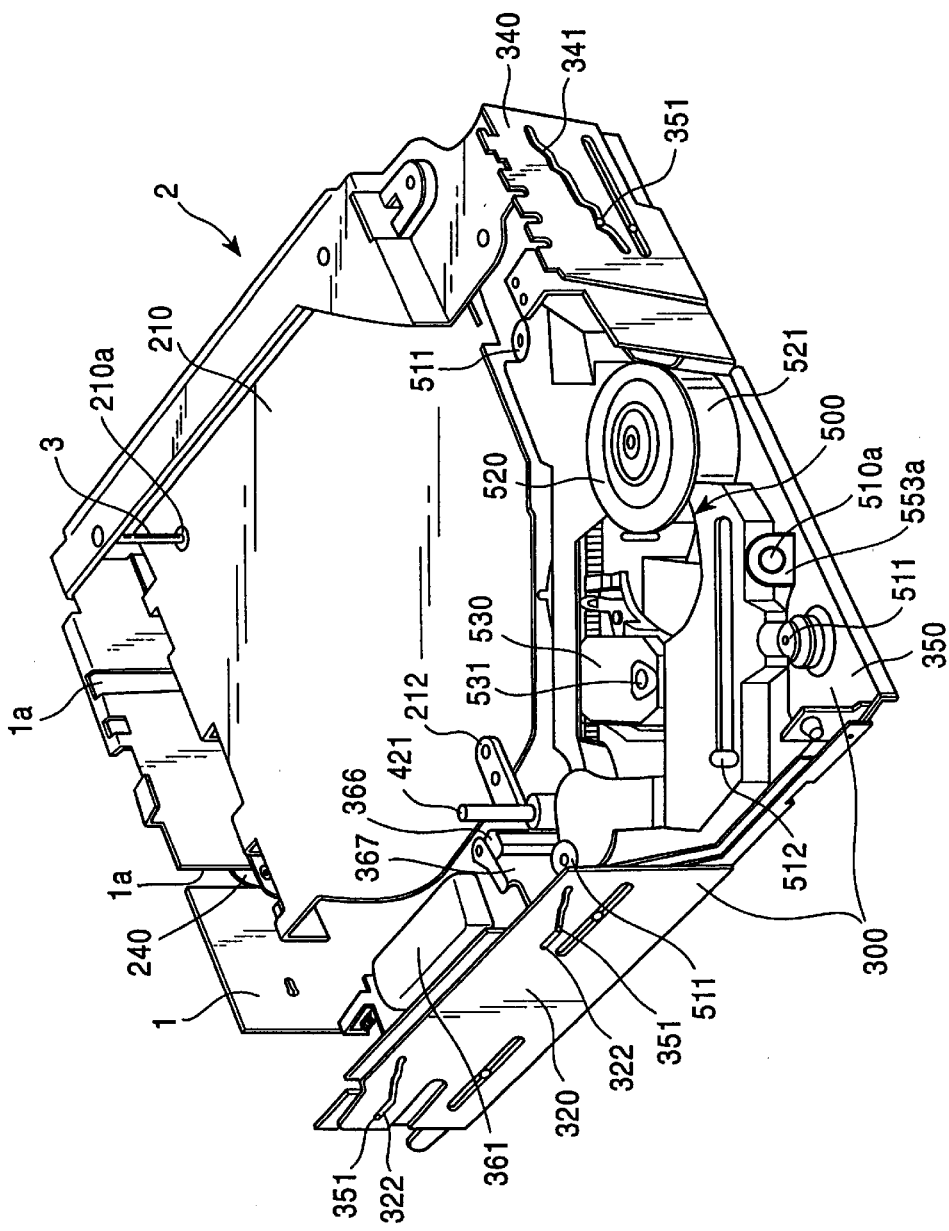
FIG. 2 is an external perspective view of a disk apparatus shown in FIG. 1 as viewed from the rear.

As shown in FIGS. 1 and 2, a disk apparatus of this embodiment is configured by the following units provided on a chassis unit 1 in which a casing 100 of a disk magazine is mounted.

(a) A magazine shift unit 200 for dividing the magazine casing 100 into upper and lower sections to conserve a playback space therebetween;

(b) a vertical-tracking unit 300 for selecting a target disk D;

(c) a swing unit 400 which is provided on the vertical-tracking unit 300, and transferred into the playback space formed between the divided magazine casing 100;

(d) a drive unit 500 which is provided on the swing unit 400, and includes an optical pickup; and (e) a magazine eject unit 600 (see FIG. 13) for ejecting the magazine casing 100.

Configurations of these units will be described below in detail.

2. Disk Magazine

Figure 3:
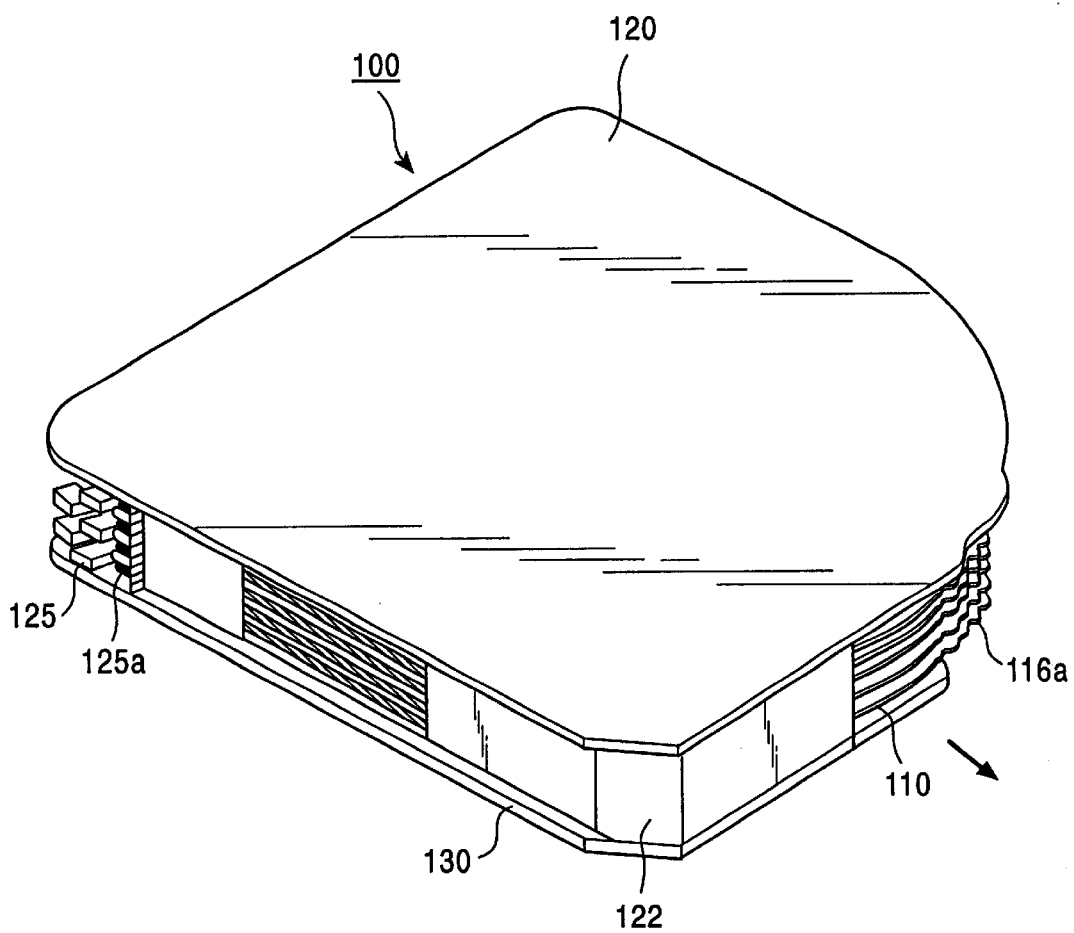
FIG. 3 is an external perspective view showing a disk magazine in accordance with the first embodiment of the present invention.

First, a configuration of a disk magazine will be described with reference to FIGS. 3 to 6. Bold arrows in FIGS. 3 to 6 indicate an insertion direction for the magazine casing 100 into a chassis unit 1. That is, as shown in FIG. 3, the inside of the magazine casing 100 is partitioned by five trays 110 for individually holding and accommodating a disk D. The magazine casing 100 is provided so as to be divided into a magazine upper section 120 and a magazine lower section 130. Configurations of these components are as follows.

(Trays 110)

Figure 4:
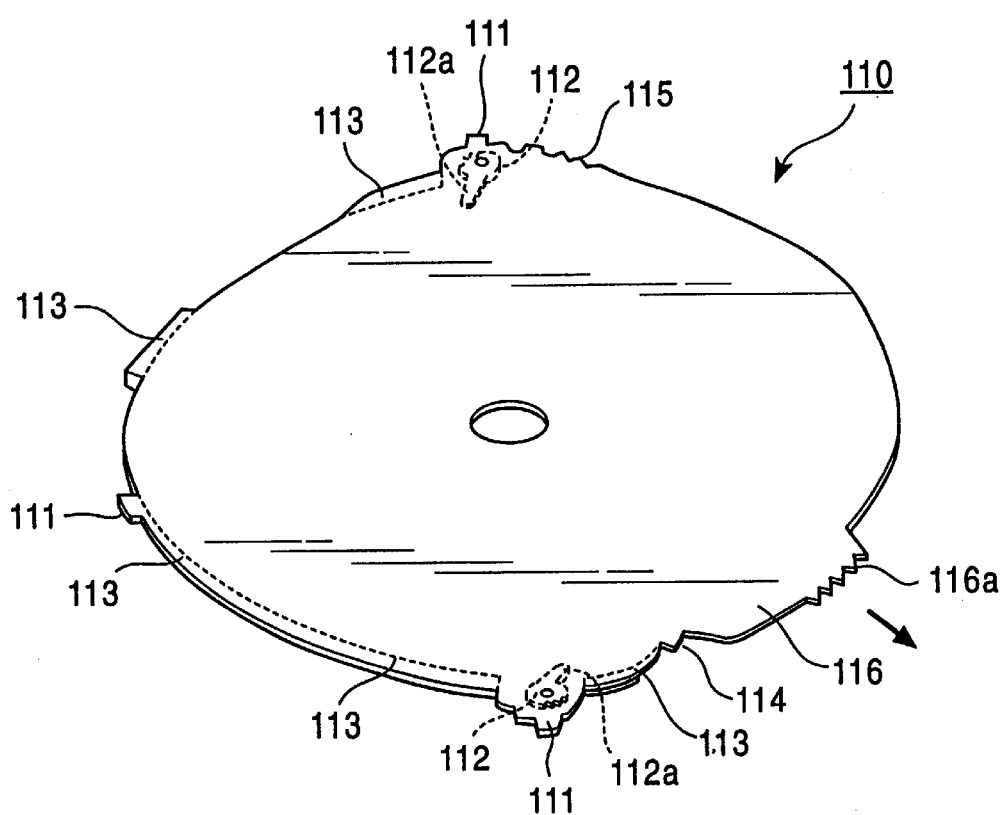
FIG. 4 is a perspective view of a tray accommodated in the disk magazine shown in FIG. 3, as viewed from the top surface thereof.

The trays 110 for partitioning the inside of the magazine casing 100 are thin-wall disc-shaped members, as shown in FIG. 4. Each tray 110 has two tray-supporting pawls formed at two opposite sections of the periphery thereof (upper and lower ends in the drawing) to project outwards. Two planetary gears 112 are rotatably mounted inside of the two tray-supporting pawls 111, respectively. Each of the two planet gears has a disk-supporting pawl 112a for supporting the lower surface of the disk D loaded on the tray 110.

A projection 116 is provided at an end of the tray 110 in the magazine insertion direction (the direction shown by the bold arrow in FIG. 4). A gear groove 116a is formed in a distal end of the projection 116. A wavelike first groove 114 is formed between the projection 116 and the tray-supporting pawl 111 near the projection 116. A wavelike second groove 115 is formed near the opposite tray-supporting pawl 111.

Furthermore, a circular control section 113 against which the periphery of the disk D abuts is formed at the left semicircular section of the tray 110 shown in FIG. 4. Another tray-supporting pawl 111 is formed near the intermediate section of the semicircular section.

(Magazine Upper Section 120)

Figure 5:
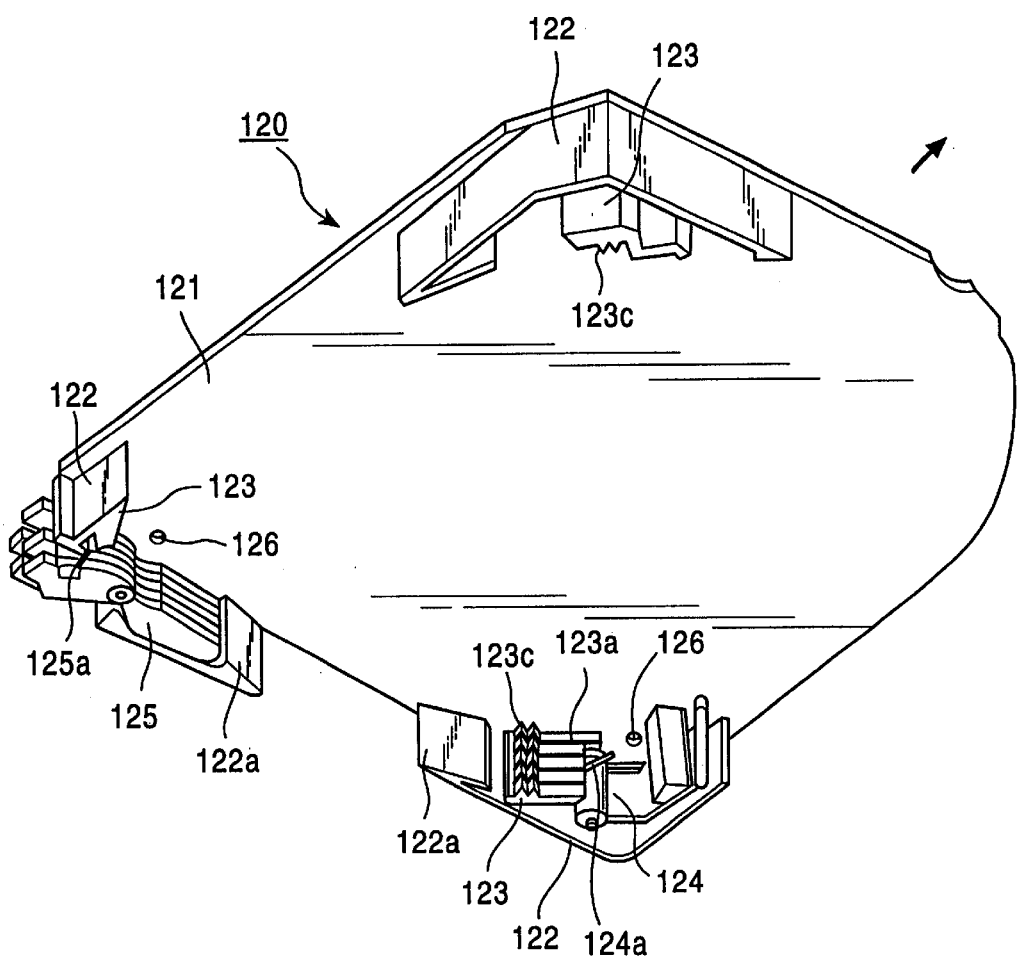
FIG. 5 is a perspective view of a magazine upper section constituting the disk magazine shown in FIG. 3, as viewed from the rear surface thereof.

The configuration of the magazine upper section 120 will be described with reference to FIG. 5. FIG. 5 is a perspective view of the magazine upper section 120 as viewed from the rear thereof. That is, the magazine upper section 120 consists of an upper plate 121 and a side plate 122. One of the substantially square corners of the upper plate 121 is formed into a circular shape. The side plate 122 has an L-shape in cross section, and is provided on three corners of the upper plate 121 except the circular corners. A curved side wall 122a against which the periphery of the tray 110 abuts is formed inside each of the three side plates 122.

An upper slit section 123 is provided on the upper plate 121 at a position corresponding to each of the three corners thereof for supporting the tray 110 on the side of the magazine upper section 120. Each of the upper slit sections 110 has a slit 123a through which each of the tray-supporting pawls 111 is inserted. The number of the slits 123a is the same as that of the trays 110. In this embodiment, five slits 123a are provided.

Of these slits 123a, the uppermost slit 123a is formed to be the longest. Gear grooves 123c with which the planet gear 112 is engaged are formed in each of partitions 123b of the opposing two upper slit sections 123. The gear grooves 123c are formed near the end opposite from the end of an opening into which the tray-supporting pawl 111 is inserted.

The upper plate 121 has a tray hold arm 124 rotatably provided inside one of the opposing side plates 122. The tray hold arm 124 is biased by a torsion coil spring 124a in the direction in which its terminal end engages with the first groove 114 of the tray 110.

Disk ejection levers 125 are provided on the opposite corner of the circular corner on the upper plate 121 for manually individually ejecting the disks D accommodated between the trays 110. The number of the disk ejection levers 125 is the same as that of the disks accommodated. In this embodiment, five disk ejection levers 125 are provided. Each disk ejection lever 125 is rotatably provided, and is biased by a helical extension spring 125a in the direction in which its terminal end moves away from the disk D.

Guide holes 126 are formed nearby the tray hold arm 124 and the disk ejection levers 125, respectively, through which guide shafts 3 to be described later are inserted.

(Magazine Lower Section 130)

Figure 6:
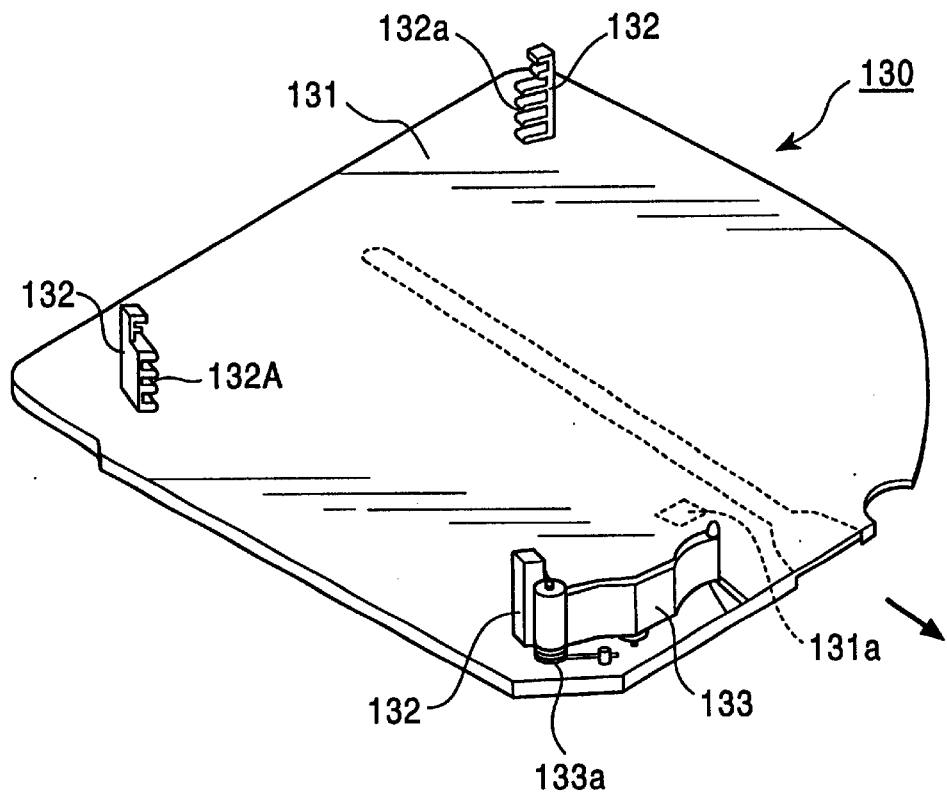
FIG. 6 is a perspective view of a magazine lower section constituting the disk magazine shown in FIG. 3, as viewed from the top surface thereof.

The magazine lower section 130 consists of a lower plate 131 having the same shape as the upper plate 121, as shown in FIG. 6. A lower slit section 132 for holding the tray 110 on the side of the magazine lower section 130 is provided on the lower plate 131 at a position corresponding to each of the three upper slit sections 123 of the magazine upper section. Each of the lower slit sections 132 has a slit 132 through which each of the tray-supporting pawls 111 is inserted. The number of the slits 132a is the same as that of the trays 110. In this embodiment, five slits 132a are provided. Of these slits 132a, the uppermost slit 132a is formed to be the shortest.

The five slits 132a of each of the lower slit sections 132 form a horizontally continuous five-stage slit together with the five slits 123a of each of the upper slit sections 123 when the magazine upper section 120 and the magazine lower section 130 are united.

A disk hold arm 133 is rotatably provided at a corner of the magazine lower section 130 in the magazine insertion direction indicated by the arrow in FIG. 6. The disk hold arm 133 is located on the opposite side of the tray hold arm 124 of the magazine upper section 120, and is urged by a torsion coil spring 133a in the direction in which its terminal end engages with the second groove 115 of the tray 110. A rectangular recess 131a is formed in the outer bottom surface of the lower plate 131.

3. Magazine Shift Unit 200

Figure 8:
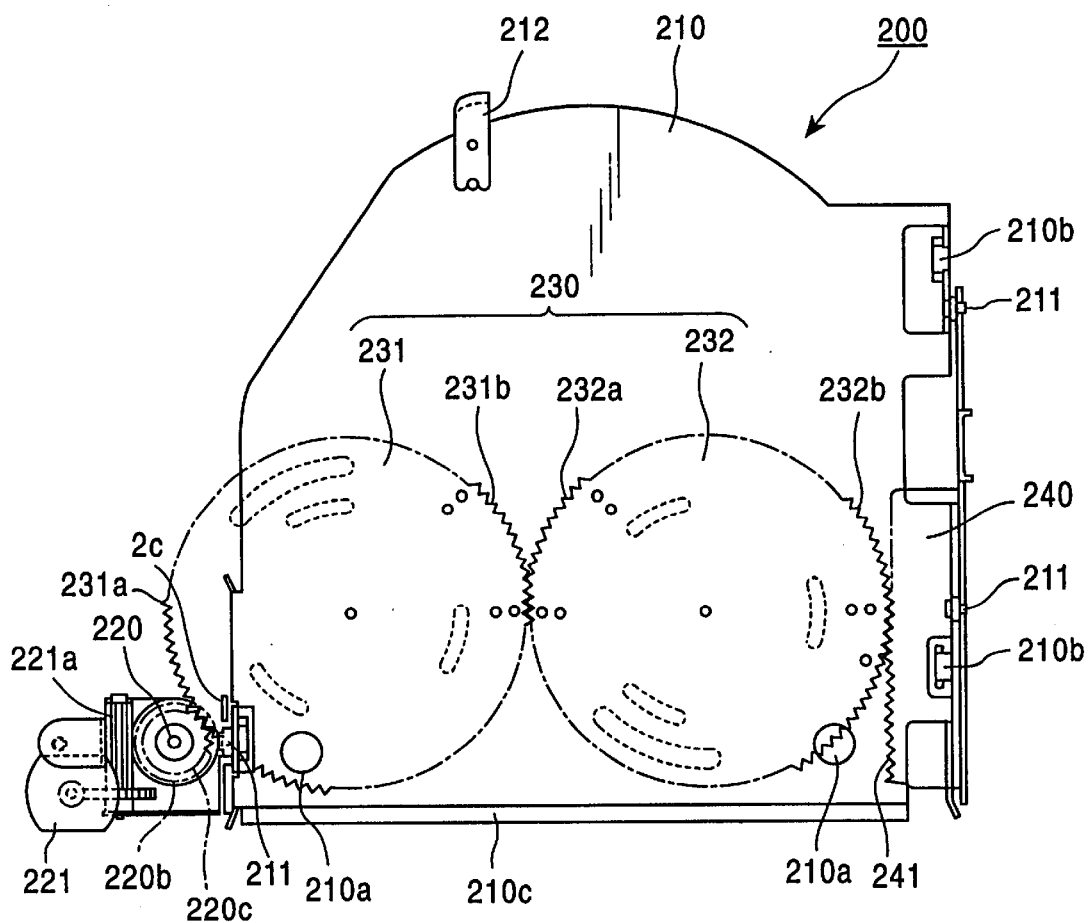
FIG. 8 is a partially transparent plan view showing a magazine shift unit of the first embodiment shown in FIG. 1.

A configuration of the magazine shift unit 200 for lifting the magazine upper section 120 to divide the magazine casing 100 will be described with reference to FIGS. 8 to 12. In FIG. 8, the upper side is regarded as the rear, and the downward side is regarded as the front. The magazine shift unit 200 comprises a magazine holder 210, a cylindrical cam 220, a synchronous gear 230, and a magazine shift plate 240. Configurations of these components are as follows.

(Magazine Holder 210)

Figure 11:
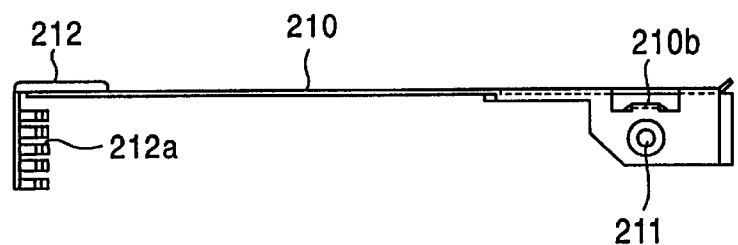
FIG. 11 is a left-hand side view showing the magazine holder of the magazine shift unit shown in FIG. 8.

The magazine holder 210 is a member obtained by bending a flat plate into a U-shape in cross section so as to cover the upper plate 121 of the magazine upper section 120 and both sides thereof, as shown in FIGS. 8 and 11, and the top surface thereof is formed into substantially the same shape as the magazine upper section 121. The magazine holder 210 is provided in the chassis unit 1 so as to slide up and down.

A frame-like magazine insertion opening 2 is provided in front of the chassis unit 1 so as to surround the front end of the magazine holder 210. Guide shafts 3, each projecting vertically downward, are fixed to the left and right of the ceiling part of the magazine insertion opening 2. Two insertion holes 210a are formed in the top plate of the magazine holder 210 through which the guide shafts 3 are inserted without contacting the holes 210a when the magazine holder 210 moves up and down. In addition, upper gripping pawls 210b for gripping the upper plate 121 of the inserted magazine upper section are provided inside of both side surfaces of the magazine holder 210.

On the other hand, lower gripping pawls 2a for gripping the lower plate 131 of the inserted magazine lower section 130 are provided on left and right inner surfaces of the magazine insertion opening of the chassis unit 1. Return sections 210c and 2b, each opening outside, are formed at the front end of the magazine holder 210 and the front end of the bottom surface of the magazine insertion opening 2, respectively.

Figure 12:
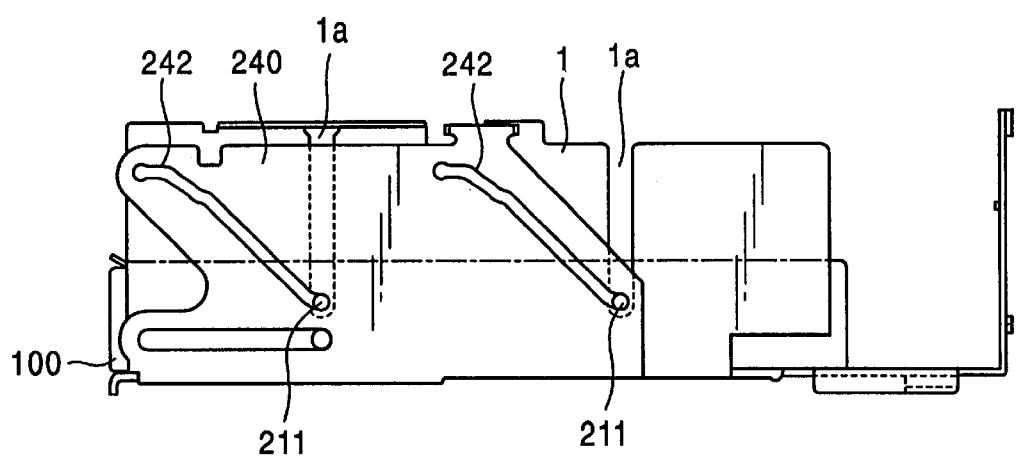
FIG. 12 is a right-hand side view showing a magazine shift plate of the magazine shift unit shown in FIG. 8.

As shown in FIGS. 12 and 8, two holder guide pins 211 are provided on the right side surface of the magazine holder 210, and one holder guide pin 211 are provided on the left side surface of the magazine holder 210. The right two holder guide pins 211 are slidably inserted into right-hand holder guide grooves 1a, respectively, formed in the chassis unit 1. The right-hand holder guide grooves 1a is formed in the right side surface of the chassis unit 1 in two rows in the vertical direction. The left holder guide pin 211 is slidably inserted into a left-hand holder guide groove 2c formed in the magazine insertion opening 2. The left-hand holder guide groove 2c is formed in the left side surface of the magazine insertion opening 2 in one row in the vertical direction.

Figure 9:
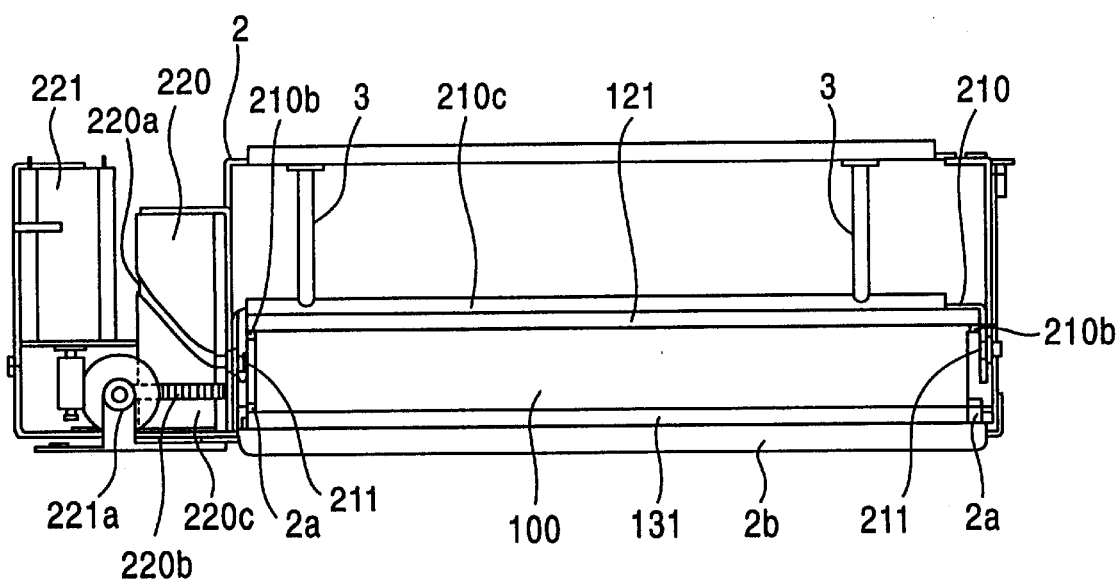
FIG. 9 is a front view of the magazine shift unit shown in FIG. 8.

In addition, a tray guide 212 is provided on the rear of the magazine holder 210, as shown in FIGS. 9 and 11. The tray guide 212 is an inverted L-shaped member, and a horizontal section thereof is fixed by screws to the top surface of the magazine holder 210. A number of slits 212a corresponding to the number of the trays 110 are formed on a vertical section of the tray guide 212, and the rotated projections 116 of the trays 110 enter into the slits 212a.

(Cylindrical Cam 220)

The cylindrical cam 220 is provided on the left side of the magazine insertion opening 2 of the chassis unit 1 so as to be rotatable around a vertical axis. A helical cam 220a is formed around the cylindrical cam 220, and engages with the holder guide pin 211 of the magazine holder 210. A worm wheel 220b is formed around the lower section of the cylindrical cam 220. The worm wheel 220b engages with a worm 221a for transmitting a driving force of a magazine shift motor 221 mounted to the chassis unit 1, thereby forming a worm gear. A disk-like gear 220c, which is a spur wheel, is formed at the lowermost end of the cylindrical cam 220.

(Synchronous Gear 230)

The synchronous gear 230 consists of a first disk section 232 and a second disk section 232 provided on the outer bottom surface of the chassis unit 1, as shown in FIG. 8. The first and second disk sections 231 and 232 are arranged adjacent to each other so as to be rotatable about the center axes thereof, respectively. The first disk section 231 has a circular gear 231 that engages with the disk-like gear 220c of the cylindrical cam 220, and a circular gear 231b formed at a position opposing the circular gear 231a.

The second disk section 232 has a circular gear 232a that engages with the circular gear 231b of the first disk section 231, and a circular gear 232b formed at a position opposed to the circular gear 232a. Degrees of rotation of the first and second disk sections 231 and 232 are controlled so that the circular gear 231b will not disengaged from the circular gear 232a.

(Magazine Shift Plate 240)

The magazine shift plate 240 is provided on the right side surface of the chassis unit 1 so as to slide back and forth. Two inclined cams 242 are formed in parallel with each other in a vertical surface of the magazine shift plate 240. Each of the inclined cams 242 has a inclined linear shape such that it gradually descends rearwards. The holder guide pins 211 of the magazine holder 210 are slidably inserted into the inclined cams 242.

The magazine shift plate 240 is bent at its lower end along a corner of the bottom surface of the chassis unit 1 to form a horizontal surface, as shown in FIG. 8, and a magazine-shifting rack 241 is formed on the left edge of the horizontal surface. The magazine-shifting rack 241 is engaged with the circular gear 232b of the second disk section 232.

4. Vertical-Tracking Unit 300

Figure 13:
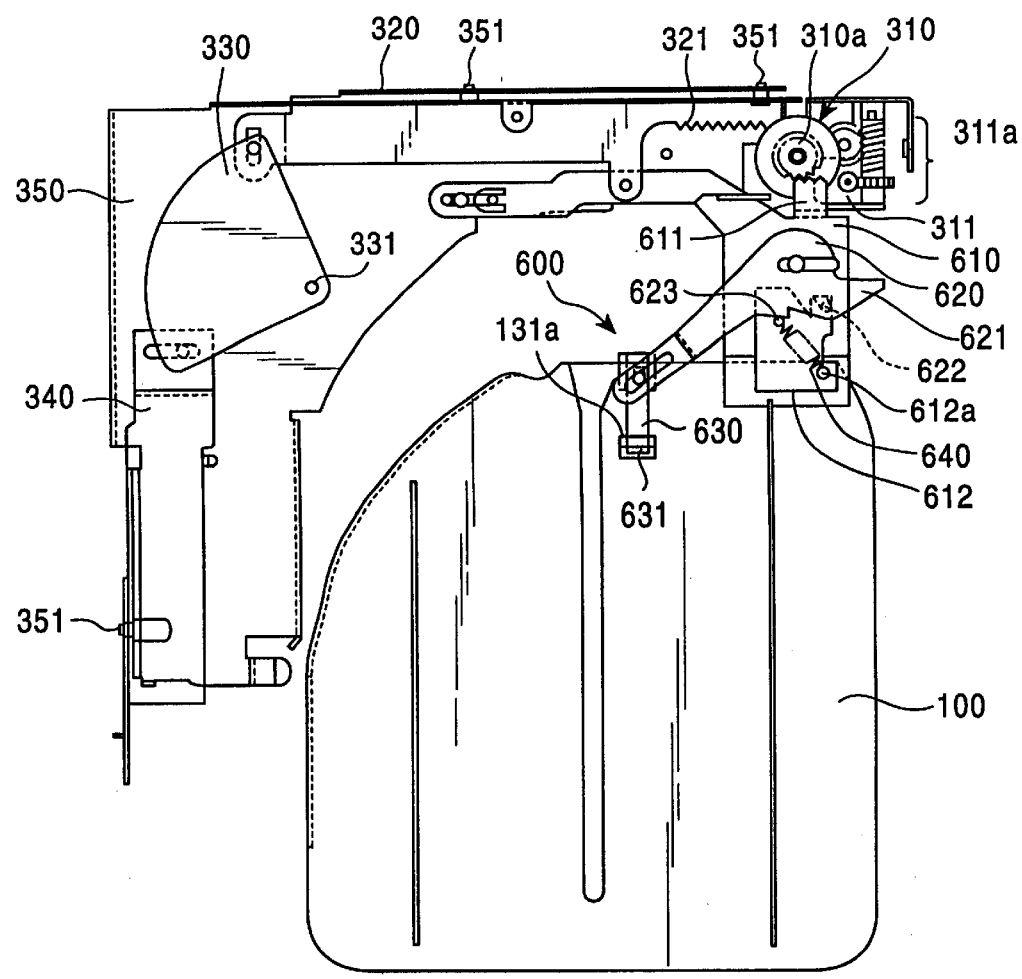
FIG. 13 is a partially transparent plan view showing a vertical-tacking unit and a magazine eject unit in a magazine ejected state of the first embodiment shown in FIG. 1.

The configuration of the vertical-tracking unit 300 for determining a divide position of the magazine casing 100 in order to select the disk D to be played back will be described with reference to FIGS. 13 to 20. In FIG. 13, the upside is regarded as the rear, and the downside is regarded as the front. The vertical-tracking unit 300 consists of a loading gear 310, a rear shift plate 320, a link plate 330, left shift plate 340, an vertical-tracking chassis 350, and a drive unit 360. Configurations of these components are as follows.

(Loading Gear 310)

Figure 14A:
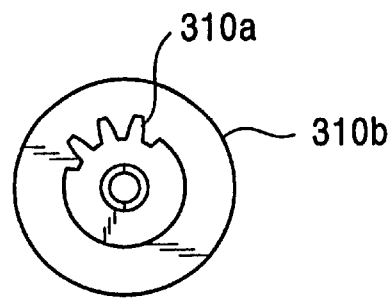
Figure 14B:
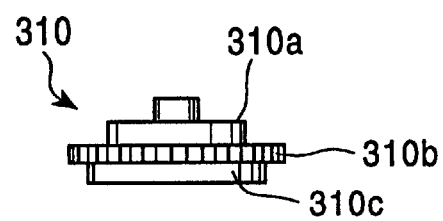
Figure 14C:
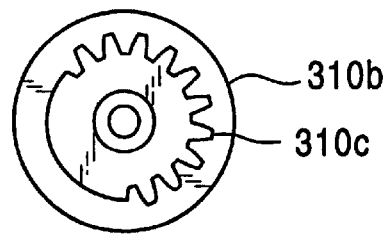

The loading gear 310 is provided at the rear right corner of the bottom surface of the chassis unit 1, as shown in FIG. 13. The loading gear 310 is of a three-stage construction, as shown in FIGS. 14A to 14C in which an upper gear 310a having a non-toothed portion of about a three-quarter circle, an intermediate gear 310b having a spur gear formed therearound, and a lower gear 310c having a non-toothed portion of about a half circle are formed in one piece. A driving force of a loading motor 311 mounted on the chassis unit 1 is transmitted to the intermediate gear 310b via transmission gears 311a.

(Rear Shift Plate 320)

Figure 15:
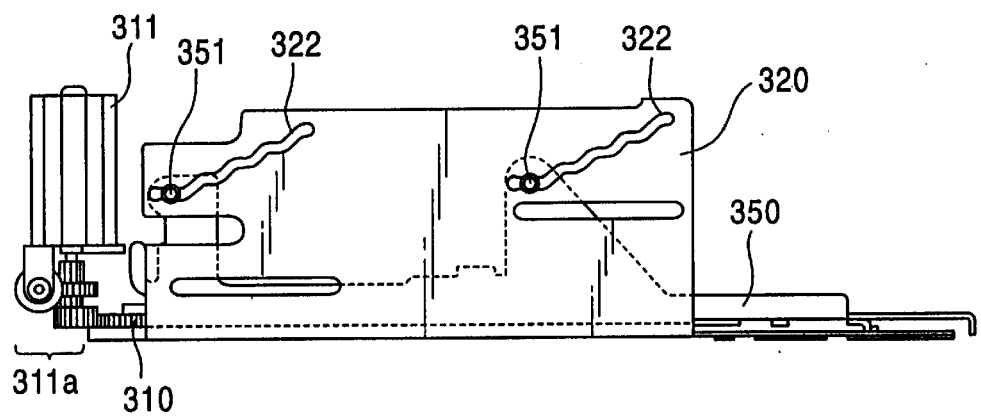
FIG. 15 is a rear elevation showing a rear shift plate of the vertical-tracking unit shown in FIG. 13.

The rear shift plate 320 is provided on the rear side surface of the chassis unit 1 so as to slide in a lateral direction, as shown in FIG. 13. The rear shift plate 320 is bent at its lower end along a corner of the bottom surface of the chassis unit 1 to form a horizontal surface, and a vertical-shifting rack 321 is formed on the front edge of the horizontal surface. The vertical-shifting rack 321 is provided at the height where it engages with the lower gear 310c of the loading gear 310. In addition, two rear stepped cams 322 gradually descending from the right to the left are formed on a vertical surface of the rear shift plate 320, as shown in FIG. 15.

(Link Plate 330)

The link plate 330 is a fan-shaped member, as shown in FIG. 13, and is rotatably provided at its peak 331 on the outer bottom surface of the chassis unit 1. In addition, the link plate 330 is rotatably connected at a rear end of its circular-arc section to the left end of the horizontal surface of the rear shift plate 320.

(Left Shift Plate 340)

The left sift plate 340 is provided on the left-hand side surface of the chassis unit 1 so as to slide back and forth, as shown in FIG. 13. The left shift plate 340 is bent along a corner of the bottom surface of the chassis unit 1 to form a horizontal surface, and a front end of the circular-arc section of the link plate 330 is rotatably connected to the rear end of the horizontal surface. A left stepped cam 341 descending rearwards is formed on a vertical surface of the left shift plate 340, as shown in FIG. 16.

(Vertical-Tracking Chassis 350)

The vertical-tracking chassis 350 is a substantially L-shaped horizontal plate extending from the rear side to the left side of the chassis unit 1. The vertical-tracking chassis 350 is provided in the chassis unit 1 so as to slide tip and down. As shown in FIG. 15, the arrangement is such that a vertical surface along the rear side surface of the chassis unit 1 is formed on the rear of the vertical-tracking chassis 350, two vertical-guiding pins 351 are provided on the vertical surface, and these vertical-guiding pins 351 are slidably inserted into the two rear stepped cams 322 formed in the rear shift plate 320, respectively.

Figure 16:
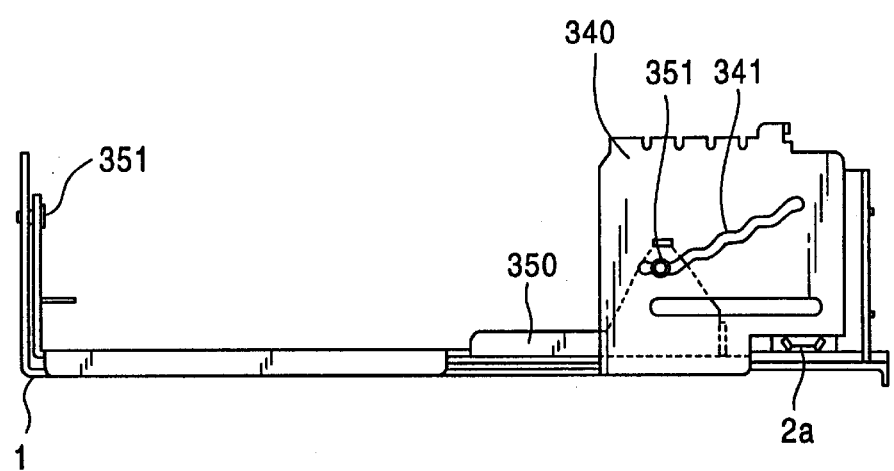
FIG. 16 is a left-hand side view showing a left shift plate of the vertical-tracking unit shown in FIG. 13.

In addition, a vertical surface along the left side surface of the chassis unit 1 is formed on the left of the vertical-tracking chassis 350, and one vertical-guiding pin 351 is provided on the vertical surface, as shown in FIG. 16. The vertical-guiding pin 351 is slidably inserted into a left stepped cam 341 formed in the left shift plate 340.

(Drive Unit 360)

Figure 17:
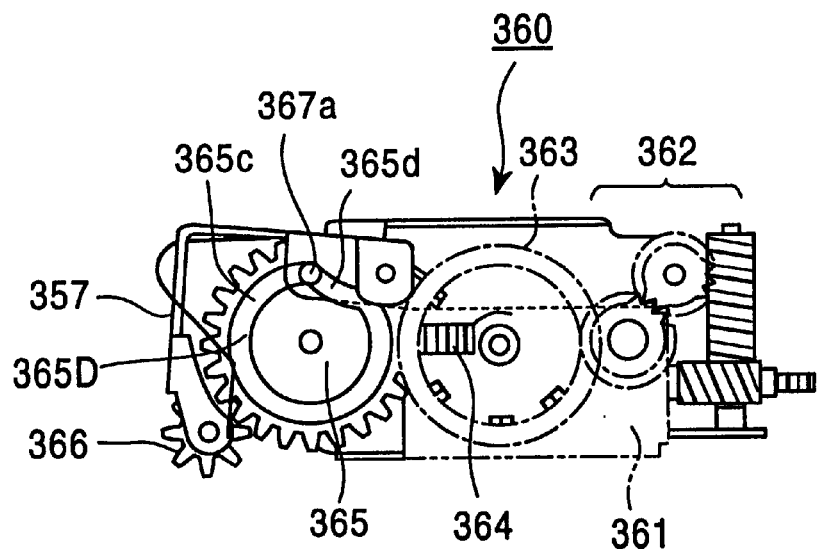
FIG. 17 is a partially transparent plan view showing a drive unit on the vertical-tracking unit shown in FIG. 13.
Figure 18:
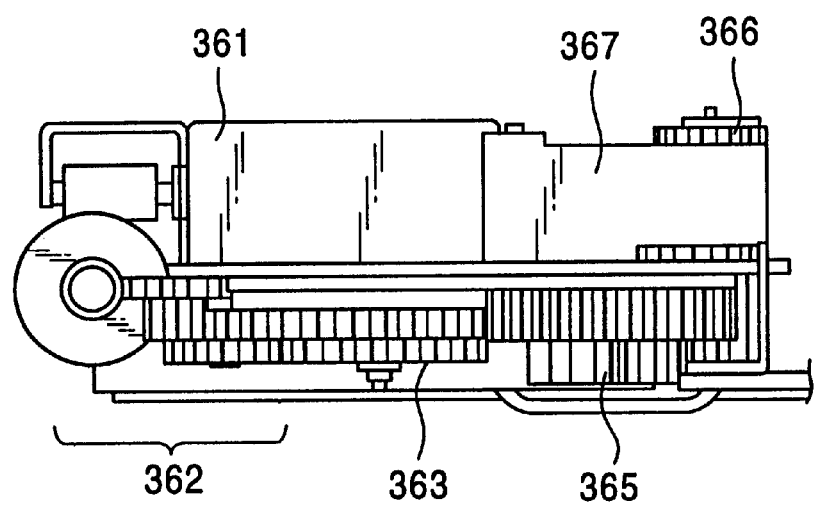
FIG. 18 is a rear elevation showing the drive unit shown in FIG. 17.

The drive unit 360 for rotating the tray 110 is provided on the vertical-tracking chassis 350, as shown in FIGS. 17 and 18. The drive unit 360 consists of a driving motor 361, transmission gears 362, a mode gear 363, a brush switch 364, a cam gear 365, a tray gear 366, and a tray gear arm 367.

Figure 19:
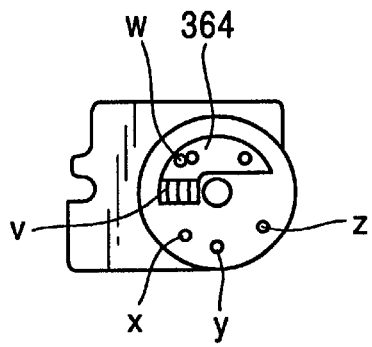
FIG. 19 is a plan view showing a brush switch of the drive unit shown in FIG. 17.

The transmission gears 362 comprise a plurality of gears for transmitting a driving force of the driving motor 361 to the mode gear 363. The mode gear 363 is a disk-like spur gear for transmitting the driving force from the transmission gears 362 to the cam gear 365. As shown in FIG. 19, the mode gear 363 is provided with the brush switch 364 that rotates coaxially and in synchronism with the mode gear 363. The brush switch 364 has contacts v to z that are set to detect an operation stage of the apparatus in accordance with the rotation position of the mode gear 363. More specifically, the contact v corresponds to a standby state of a swing chassis 420, w corresponds to the unlocking of the magazine casing 100, x corresponds to the completion of transferring of the swing chassis 420, y corresponds to the release of the disk D from the disk-supporting pawl 112a, and z corresponds to the release of a floating lock of a drive base 510.

Figure 20A:
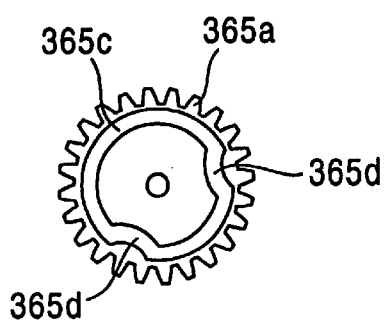
Figure 20B:
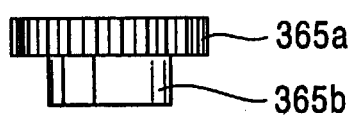
Figure 20C:
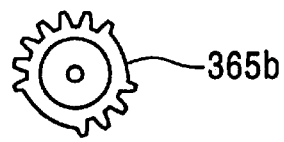

The cam gear 365 comprises an upper gear 365a that is a disk-like spur gear integrally formed with a lower gear 365b having two non-toothed portions, as shown in FIGS. 20A to 20C. The upper gear 365a engages with the mode gear 363. A ring-like operating cam groove 365c is formed in the top surface of the upper gear 365b. The operating cam groove 365c has two axially curved U-shaped sections 365d.

The tray gear 366 is a columnar gear having a height substantially equal to the thickness of the magazine casing 100, as shown in FIGS. 17 and 18. The tray gear 366 is provided on the front end of the L-shaped tray gear arm 367 so as to rotate about a vertical axis, and meshes with the upper gear 365a of the cam gear 365. The rear end of the tray gear arm 367 is rotatably provided on the drive unit 360. A tray gear arm-rotating pin 367a is attached near the rear end of the tray gear arm 367. The tray gear arm-rotating pin 367a is engaged with the operating cam groove 365c of the cam gear 365.

5. Swing Unit 400

Figure 21:
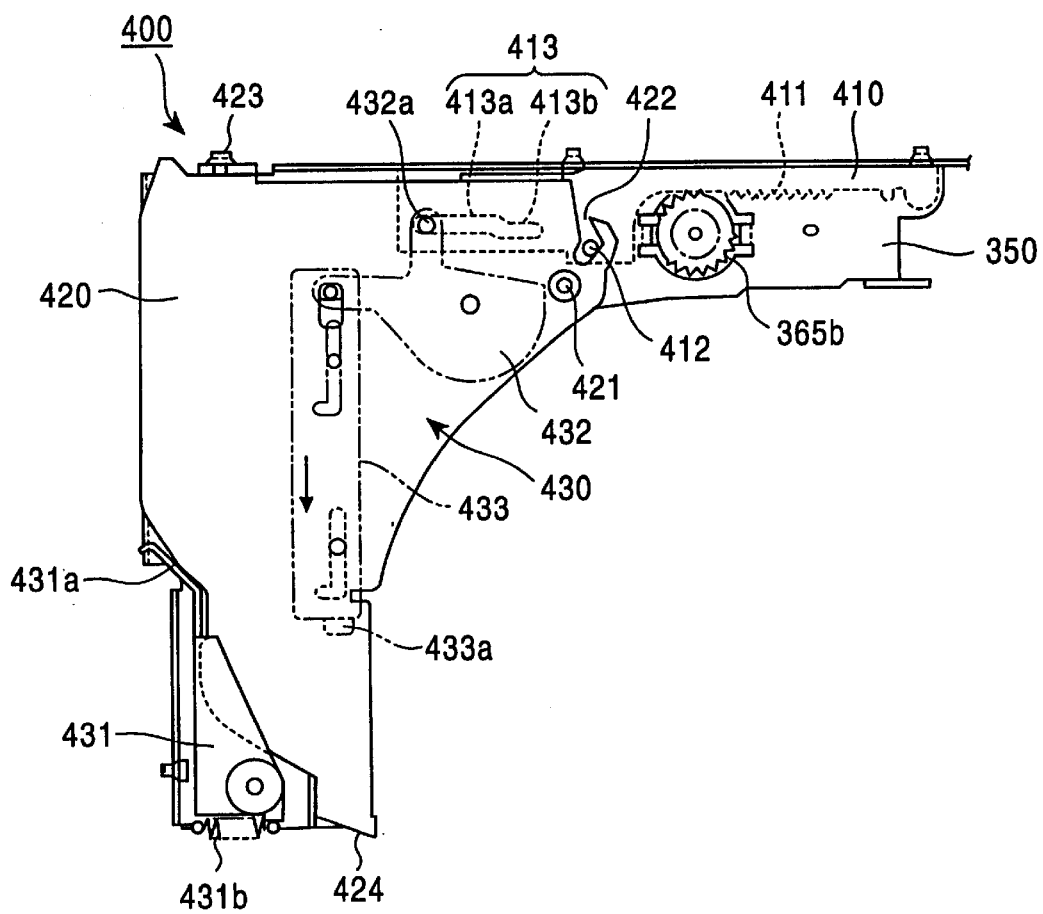
FIG. 21 is a partially transparent plan view showing a swing unit in the first embodiment shown in FIG. 1.

The swing unit 400 transferred into the space between the divided magazine casing 100 will now be described with reference to FIGS. 21 and 22. In FIG. 21, the upper side is regarded as the rear, and the downward side is regarded as the front. The swing unit 400 consists of a power plate 410, a swing chassis 420, and a holding mechanism 430. Configurations of these components are as follows.

(Power Plate 410)

The power plate 410 is provided on the outer bottom surface of the vertical-tracking chassis 350 so as to slide in a lateral direction. A transferring rack 411 that engages with the lower gear 365b of the cam gear 365 is formed on the front edge near the right end of the power plate 410. A columnar power roller 412 is fixed near the center of the power plate 410. A lateral holding cam 413 is formed near the left end of the power plate 410. The holding cam 413 has a stepped portion formed in the middle thereof including a rear horizontal section 413a and a front horizontal section 413b.

(Swing Chassis 420)

The swing chassis 420 is a substantially triangular plate provided on the vertical-tracking chassis 350. The swing chassis 420 is provided so that it can rotate around a transfer-rotation shaft 421 that is provided near the right end of thereof. A hook-like cutout 422 is formed at the right end of the swing chassis 420. The power roller 412 provided on the power plate 410 is engaged with the hook-like cutout 422. A holding projection 423 is provided near the left end portion of the rear surface of the swing chassis 420. An abutting pawl 424 is formed on the front end of the swing chassis 420.

Figure 22:
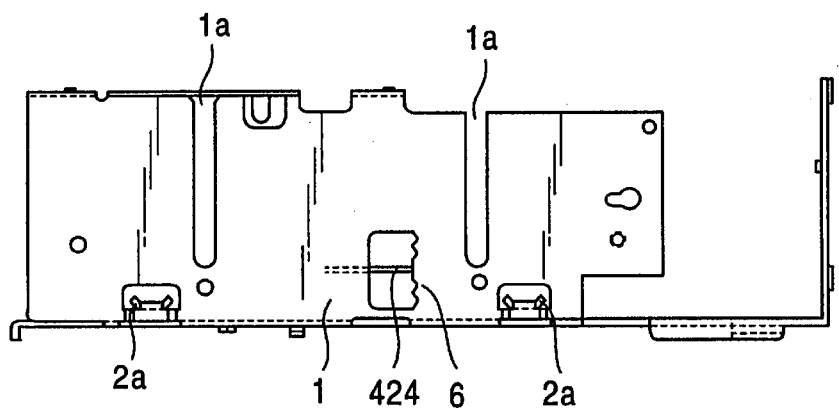
FIG. 22 is a right-hand side view showing a chassis unit in the first embodiment shown in FIG. 1.

On the other hand, a V-shaped slit 6 is formed in the right side surface of the chassis unit 1, as shown in FIG. 22, so as to be engaged with the abutting pawl 424 when the swing chassis 420 is transferred. A plurality of V-shaped slits 6 is formed in accordance with the change in height of the swing chassis 420.

(Hold Mechanism 430)

The hold mechanism 430 consists of a hold arm 431, a hold link 432, and a hold plate 433, as shown in FIG. 21. The hold arm 431 is an L-shaped plate, and its front end is rotatably provided near the front end section of the vertical-tracking chassis 350. A hold opening 431a, which engages with the holding projection 423 of the transferred swing chassis 420, is formed in the rear end of the hold arm 431. The hold arm 431 is biased by a helical extension spring 431b so that it can rotate clockwise. However, as shown in FIG. 21, since the hold arm 431 is pressed to the left side surface of the swing chassis 420 in the case of a standby state of the swing chassis 420, the hold arm 431 rotates counter-clockwise against the biasing force of the helical extension spring 431b so as to be held on the left side surface of the chassis unit 1.

The hold link 432 is rotatably mounted on the outer bottom surface of the vertical-tracking chassis 350. A hold link pin 432a is provided on the rear end of the hold link 432. The hold link pin 432a is inserted into the holding cam 413 of the power plate 410. The left end of the hold link 432 is rotatably coupled to the rear end of the hold plate 433.

The hold plate 433 is provided on the outer bottom surface of the vertical-tracking chassis 420 so that it can slide back and forth. A presser section 433a for abutting and pressing the rear end of the rotated hold arm 431 is provided on the front end of the hold plate 433.

6. Drive Unit 500

Figure 23:
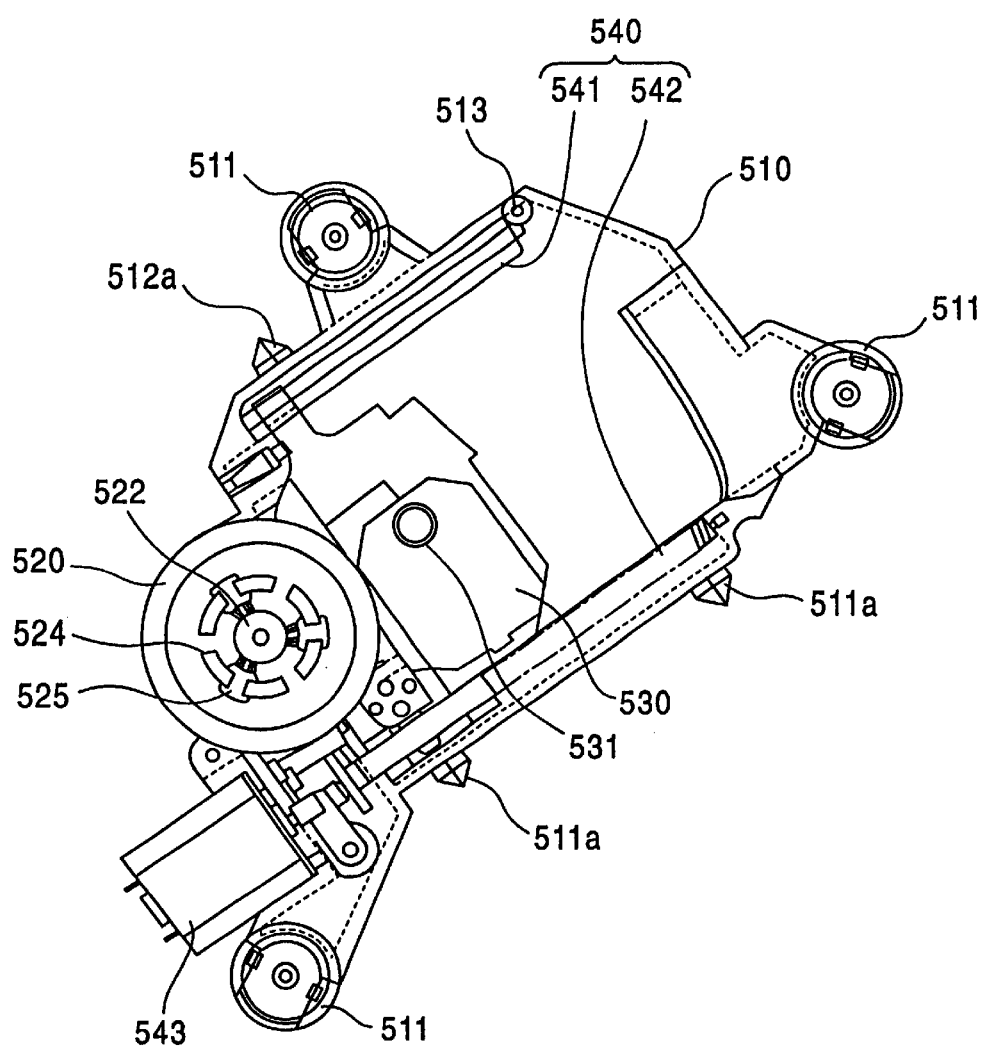
FIG. 23 is a plan view showing a drive unit in the first embodiment shown in FIG. 1.

The drive unit for playing back the selected disk D will now be described with reference to FIGS. 23 to 26. In FIGS. 23 and 25, the upper side is regarded as the rear, and the downward side is regarded as the front. The drive unit 500 consists of a drive base 510, a turntable 520, an optical pickup 530, a feed mechanism 540, and a floating lock mechanism 550. Configurations of these components are as follows.

(Drive Base 510)

The drive base 510 is supported by three dampers 511 on the swing chassis 420, as shown in FIG. 23. A conical projection 512a is formed on the left side surface, and two conical projections 512a are formed on the right side surface of the drive base 510. A tray guide projection 513, which abuts against an end of the tray 110 accommodated in the magazine upper section 120 when transferred into the divided magazine casing 100, is provided on the upper surface of the rear left corner of the drive base 510.

(Turntable 520)

Figure 24A:
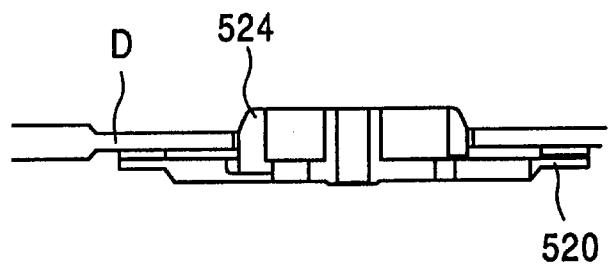
FIG. 24A is a vertical section showing a disk insertion section in the drive unit shown in FIG. 23.
Figure 24B:
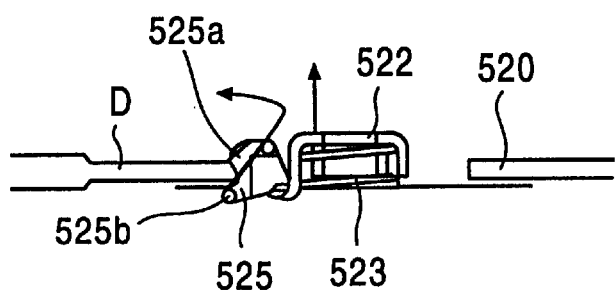
FIG. 24B is a vertical section showing rotation of a disk hook.
Figure 24C:
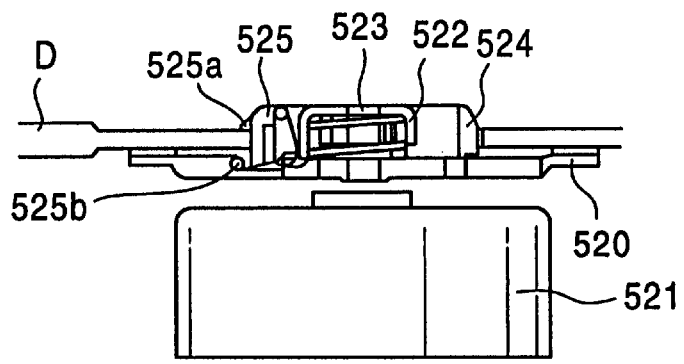
FIG. 24C is a vertical section showing the overall configuration of a turntable.
Figure 25:
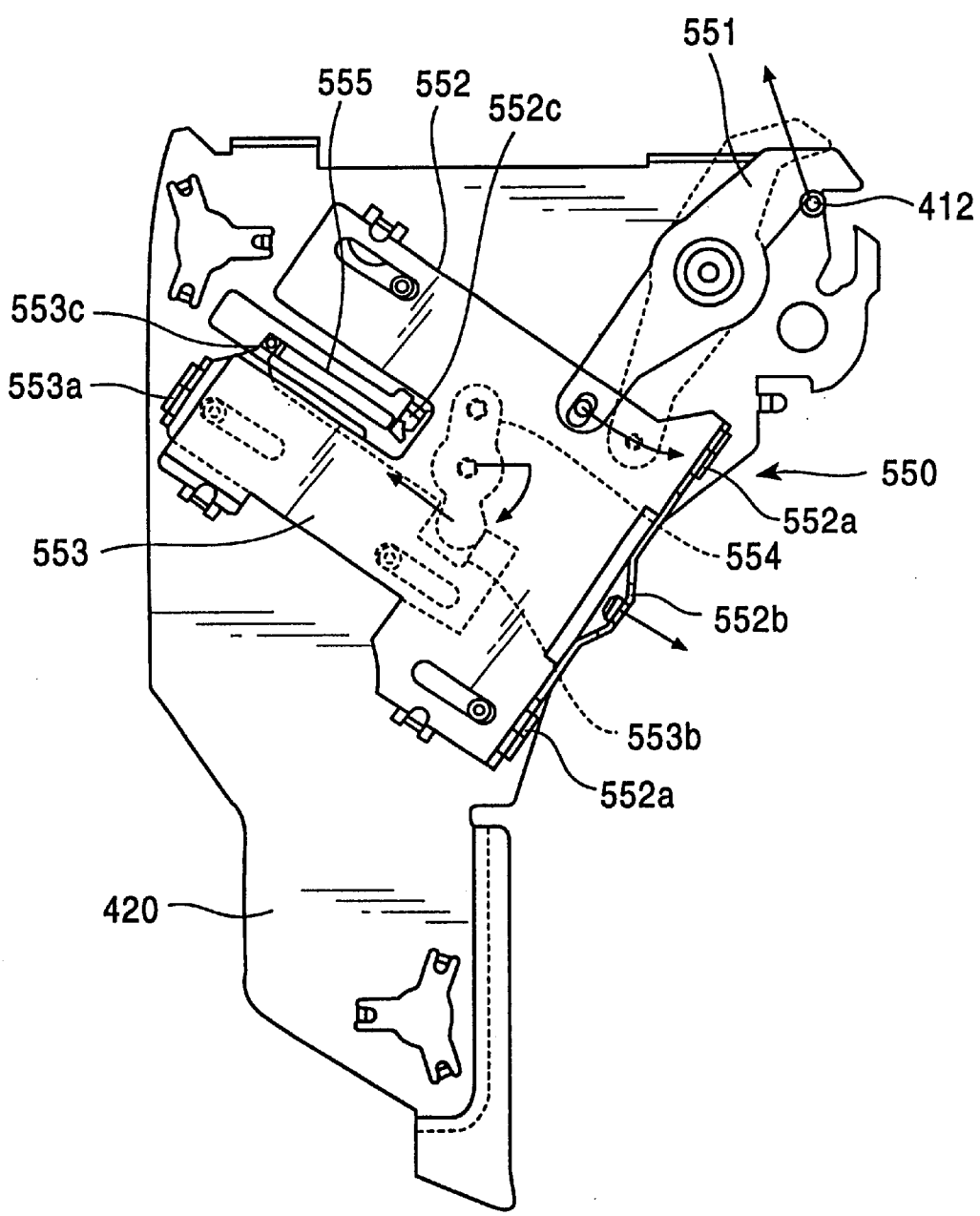
FIG. 25 is a partially transparent plan view showing a floating lock mechanism in the first embodiment shown in FIG. 1.

The turntable 520 is mounted to the drive base 510, as shown in FIGS. 23 and 24A. The turntable 520 is provided so as to be turned by a spindle motor 521. A convex cylindrical cross-section sleeve 522 is provided around the rotation shaft of the turntable 520, as shown in FIGS. 24B and 24C. The sleeve 522 is biased upward by a spring 523. A ring-like disk insertion section 524 to be inserted into a center hole of the disk D is provided around the sleeve 522.

Three disk hooks 525 are provided at equal intervals for hooking up to the hole of the inserted disk D and holding the disk D. A protruded hooking section 525a to be looked up to the hole of the disk D is formed on the outside of the upper end of each disk hook 525. Each disk hook 525 is rotatably provided using its outside of the lower end as a fulcrum 525b. Since the lower end of the sleeve 522 abuts against the inside of the lower end of each of the disk hook 525 from below, each disk hook 525 is biased by the spring 523 so that its hooking section 525a opens outside.

(Optical Pickup 530 and Feed Mechanism 540)

As shown in FIG. 23, the optical pickup 530 and the feed mechanism 540 therefor are mounted on the drive base 510. The optical pickup 530 is an optical head including a lens for optically reading information recorded in the disk D. The feed mechanism 540 is a mechanism for slidably moving the optical pickup 530 in a radial direction of the disk D on the turntable 520. That is, the optical pickup 530 is slidably provided on the guide rail 541 and a feed screw 542 arranged in parallel with each other. The feed screw 52 is constructed to rotate in accordance with the operation of a feed motor 543.

(Floating Lock Mechanism 550)

The floating lock mechanism 550 is a mechanism for locking a floating state of the drive base 510 supported by the dampers 511, as shown in FIG. 25. The floating lock mechanism 550 consists of a lock link 551, a first lock plate 552, a second lock plate 553, a reverse link 554, and a helical extension spring 555.

The lock link 551 is a plate rotatably provided near the hook-like cutout 422 of the swing chassis 420. The rear right end of the lock link 551 is located at a position to abut against the power roller 412 of the power plate 410. The front end of the lock link 551 is rotatably coupled to the right end section of the first lock plate 552.

The first lock plate 552 is a plate provided on the swing chassis 420 so as to slide in a lateral direction. A vertical surface is formed on the right-hand end of the first lock plate 552. Two locking holes 552a into which the two conical projections 511a are inserted are formed in the vertical surface. A tray guide surface 552b, which abuts against an end of the tray 110 at the time of rotation of the tray 110 in the magazine casing 100, is provided between the two locking holes 552a.

On the other hand, the second lock plate 553 is provided on the swing chassis 420 so as to slide in a direction parallel to the first lock plate 552. A vertical surface is formed on the left-hand end of the second lock plate 553. A locking hole 553a into which the conical projection 512a formed on the left of the drive base 510 is inserted is formed in the vertical surface.

The reverse link 554 is rotatably provided between the first and second lock plates 552 and 553 of the swing chassis 420. The rear end of the reverse link 554 is rotatably coupled to the first lock plate 552. The front end of the reverse link 554 is inserted into a concave cutout 553b formed in the second lock plate 553. Accordingly, since the action of the first lock plate 552 is transmitted as an action in the reverse direction to the second lock plate 553 via the reverse link 554, the lock plates 552 and 553 are operatively associated with each other to slide in the reverse direction.

Furthermore, hooks 552c and 553c are provided on the swing chassis 420 and the second lock plate 553, respectively, and both ends of a helical extension spring 555 engage with the hooks 552c and 553c, so that the second lock plate 553 is biased in a direction to approach the first lock plate 552.

The floating lock mechanism 550 and the drive base 510 in a floating locked state are arranged as follows. The drive base 510 is arranged between the vertical surfaces of the first lock plate 552 and the second lock plate 553 on the swing chassis 420. Since these vertical surfaces are biased by the biasing force of the helical extension spring 555 in a direction to approach each other, the conical projections 510a of the drive base 511a and 512a are inserted into the locking holes 552a and 553a formed in the vertical surfaces. Accordingly, the drive base 510 is gripped from both sides by the vertical surfaces of the first and second lock plates 552 and 553, and its action is restricted by the locking holes 552a and 553a into which the conical projections 510a are inserted.

7. Magazine Eject Unit 600

The magazine eject unit 600 for ejecting the magazine casing 100 from the chassis unit 1 will now be described with reference to FIG. 13. In FIG. 13, the upper side is regarded as the rear, and the downward side is regarded as the front. The magazine eject unit 600 consists of a loading plate 610, a loading arm 620, and an ejecting member 630. Configurations of these components are as follows.

(Loading Plate 610)

The loading plate 610 is a substantially L-shaped plate provided on the outer bottom surface of the chassis unit 1 so as to slide in a lateral direction. A small rack 611 that engages with the upper gear 310a of the loading gear 310 is formed near the rear right end section of the loading plate 610. In addition, a substantially rectangular cut-out section 612 is formed in the front of the loading plate 610. A recess 612a is formed at the rear right corner, and a hook 612b is formed at the front right corner in the cut-out section 612.

(Loading Arm 620)

The loading arm 620 is rotatable mounted at a position to overlap the loading plate 610 on the outer bottom surface of the chassis unit 1. A presser pawl 621 is formed on the right end of the loading arm 620. A projection 622 is provided near the rotation shaft of the loading arm 620 so as to be engaged with the recess 612a of the loading plate 610. A hook 623 is provided on the left of the projection 622 of the loading arm 620. Both ends of the helical extension spring 640 are engaged with the hook 612b of the loading plate 610 and the hook 623 of the loading arm 620. The left end of the loading plate 610 is rotatably coupled to the rear end of the ejecting member 630.

(Ejecting Member 630)

The ejecting member 630 is provided on the chassis unit 1 so as to slide back and forth. A catching section 631 is provided on the front end section of the ejecting member 630 so that it engages with the recess 131a formed in the outer bottom surface of the magazine lower section 130 when the magazine casing 100 is inserted.

8. Arrangement of Switches

On the chassis unit 1, switches and sensors for switching the start of the magazine shift motor 221, loading motor 311, driving motor 361, spindle motor 521, and feed motor 543 are arranged as follows.

Figure 27:
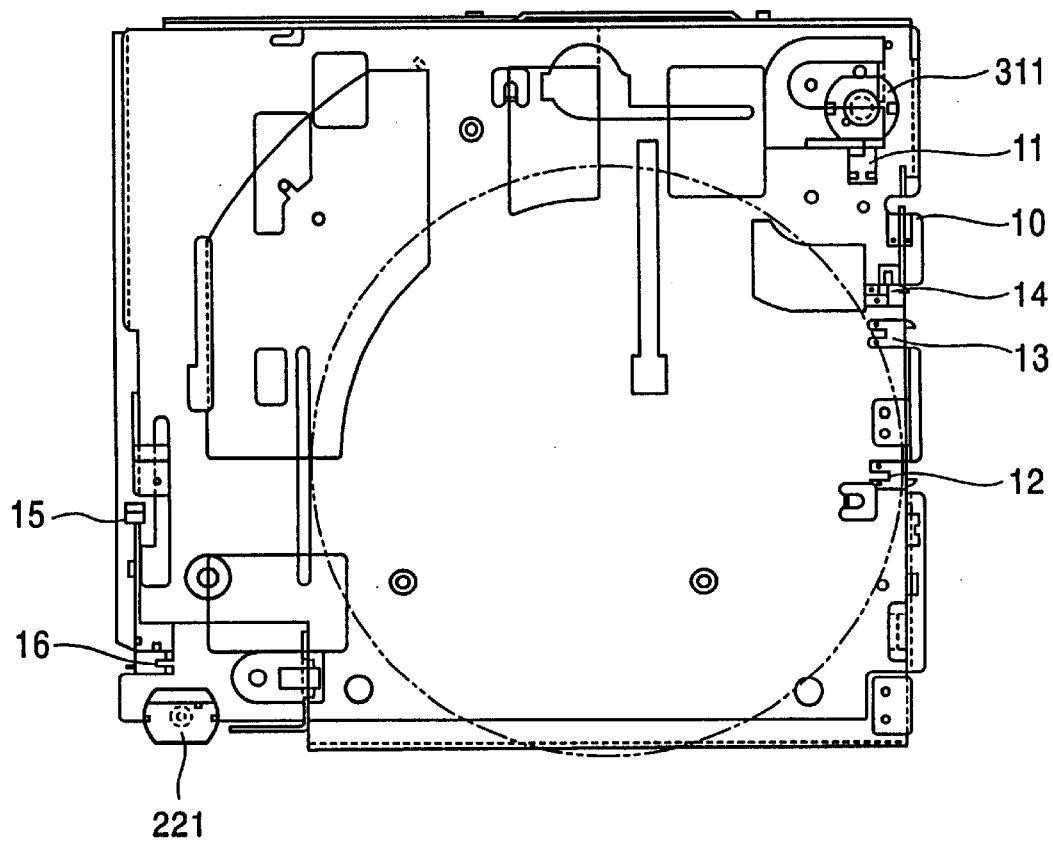
FIG. 27 is a plan view showing the arrangement of switches in the first embodiment shown in FIG. 1.

As shown in FIG. 27, a loading start switch 10 is provided at the rear of the right side surface of the chassis unit 1. The loading start switch 10 abuts against the presser pawl 621 of the loading arm 620, thereby detecting arrival of the inserted magazine casing 100 at a pulling-in start position. An ejection end switch 11 is provided on the chassis unit 1 at the rear of the loading start switch 10. The ejection end switch 11 abuts against the presser pawl 621, thereby detecting the completion of ejection of the magazine casing 100.

In addition, a magazine close switch 12, a chucking switch 13, and a magazine open switch 14 are provided on the right side surface of the chassis unit 1, in that order, from the front. These switches detect the height of the magazine holder 210 from the position of the magazine shift plate 240. That is, the height of the magazine holder 210 is set to three levels: a magazine insertion-ejection position (the lowest position), a disk chucking position (an intermediate position), and a magazine full-open position (the highest position). The above-described switches are arranged so that they can detect the positions of the magazine shift plate 240 in accordance with the positions of the magazine holder 210. More specifically, the magazine close switch 12 detects the lowest position, the chucking switch 13 detects the intermediate position, and the magazine open switch 14 detects the highest position.

A photodetector 15 for detecting vertical movement of the vertical-tracking chassis 350, and a standby switch 16 for detecting a standby condition of the swing unit 400 are provided on the left side of the chassis unit 1, in that order, from the rear thereof.

(2) Operation

The first embodiment includes the following operations.

(a) Magazine Loading Operation

When the user inserts the magazine casing 100 from the magazine insertion opening 2 of the chassis unit 1, the magazine casing 100 is pulled into the chassis unit 1 by the magazine eject unit 600.

(b) Disk Selecting Operation

The vertical-tracking chassis 350 is moved upward by the vertical-tracking unit 300 to select the dividing position of the magazine casing 100.

(c) Magazine Unlocking Operation

The tray 110 is rotated by the tray gear 366 of the drive unit 360 to unlock the magazine upper section 120 and the magazine lower section 130.

(d) Magazine Dividing Operation

The magazine holder 210 is moved upward by the magazine shift unit 200 to lift the magazine upper section 120, and the disk magazine is divided into the magazine upper section 120 and the magazine lower section 130 to conserve a transfer space for the swing unit 400.

(e) Swing Unit Transferring Operation

The swing chassis 420 is transferred into a space between the magazine upper section 120 and the magazine lower section 130 by the swing unit 400.

(f) Disk Chucking Operation

The magazine holder 210 is moved downward by the magazine shift unit 200 to set the disk D held at the lowermost tray 110 in the magazine upper section 120 onto the turntable 520.

(g) Magazine Retracting Operation

The magazine holder 210 is moved upward by the magazine shift unit 200 to conserve playback space of the disk D.

(h) Floating Lock-Releasing Operation

The floating lock made by the floating lock mechanism 550 is released to place the drive base 510 in a floating state.

(i) Disk Playback Operation

The disk D on the turntable 520 is played back by the optical pickup 530.

(j) Disk Re-Accommodating Operation

The magazine holder 210 is moved downward by the magazine shift unit 200 to hold the disk D on the turntable 520 by the tray 110, and then the magazine holder 210 is moved upward to release the tray 110 from the turntable 520.

(k) Swing Unit Drawing Operation

The swing chassis 420 is drawn out by the swing unit 400 from the space between the magazine upper section 120 and the magazine lower section 130.

(l) Magazine Uniting Operation

The magazine holder 210 is moved downward by the magazine shift unit 200 to unite the magazine upper section 120 and the magazine lower section 130.

(m) Vertical-Tracking Chassis Moving-Down Operation

The vertical-tracking chassis 350 is moved downward so as to be returned to the initial position.

(n) Disk Ejecting Operation

The magazine casing 100 is ejected from the magazine insertion opening 2 by the magazine eject unit 600.

These operations will now be described in detail.

1. Magazine Loading Operation (Magazine United State)

Figure 7:
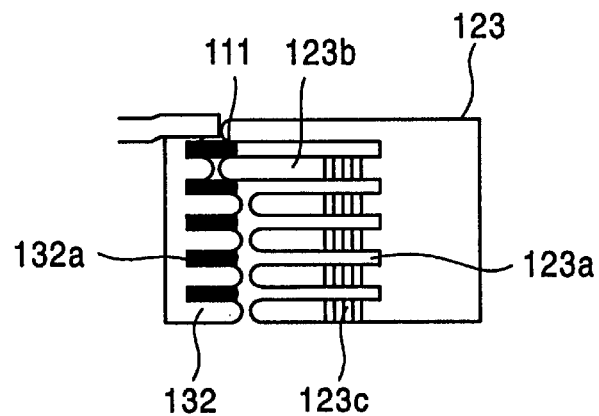
FIG. 7 is a vertical section showing a united state of an upper slit section and a lower slit section in the disk magazine shown in FIG. 3.
Figure 28:
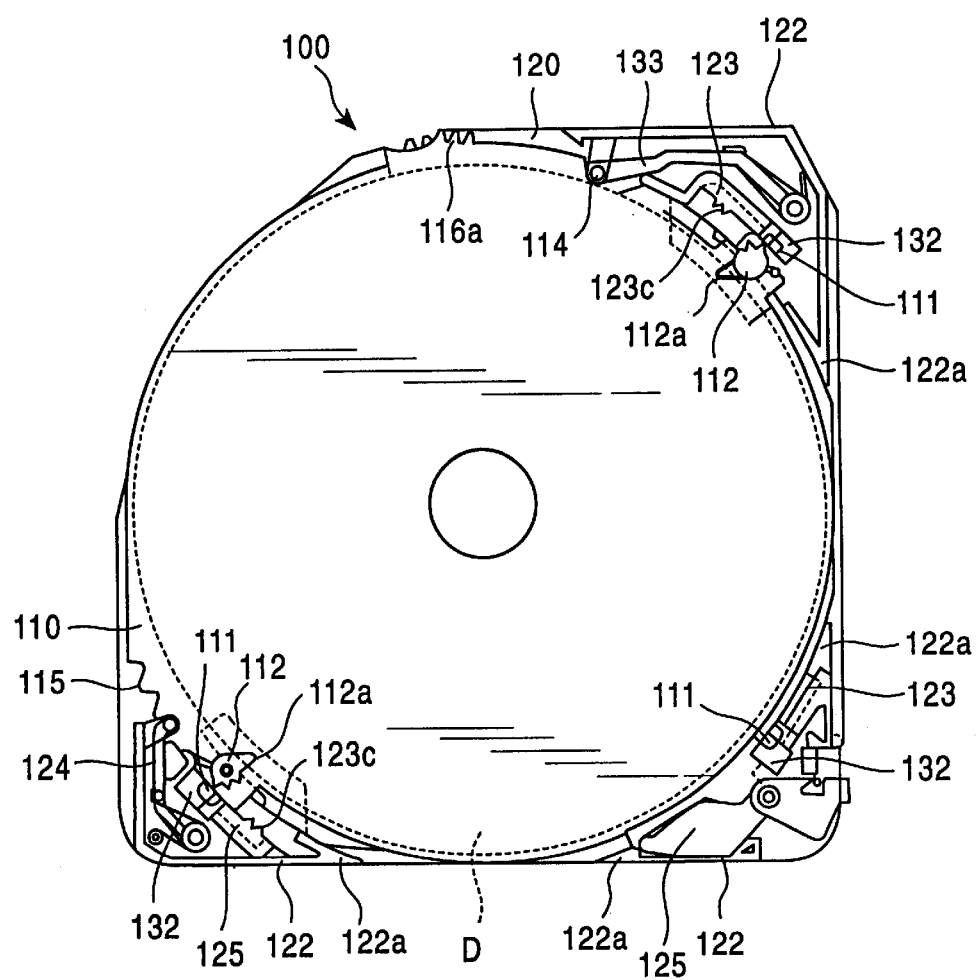
FIG. 28 is a transparent plan view of the disk magazine shown in FIG. 3.

The magazine casing 100 mounted in the chassis unit 1 is in a locked state in which the division of the magazine upper section 120 and the magazine lower section 130 is restricted, as shown in FIG. 28. That is, the partition 123b constituting the uppermost slit section 123 is formed to be the longest, and the partition 132b constituting the corresponding lower slit section 132 is formed to be the shortest of other slits 123a, as shown in FIG. 7. Therefore, the uppermost slit 123b shifts toward the lower slit section 132 at the boundary of the upper slit section 123 and the lower slit section 132.

Due to the above configuration, in a state before rotating the tray 110, i.e., in a state where all of the tray-supporting pawls 111 are drawn toward the lower slit section 132, only the uppermost tray-supporting pawl 111 is located over the boundary of the upper slit section 123 and the lower slit section 132, and the lower tray-supporting pawls 111 completely enter into the lower slit section 132. This allows vertical shift of the slit sections 123 and 132 to be restricted, so that the magazine upper section 120 and the magazine lower section 132 are placed in the locked state.

In addition, since the terminal end of the disk hold arm 133 engages with the first groove 114 of each tray 110, and the terminal end of the tray hold arm 124 engages with the second groove 115, the rotation of the tray 110 is restricted and the locked state is maintained. The disks D are inserted into the magazine casing 100 in accordance with trays 110, and the lower surfaces of the disks D are held by the disk-supporting pawls 112a of the planetary gears 112. Since the terminal end of the disk hold arm 133 abuts against the end of each disk D, accidental popping of the disk D is prevented.

The disks D are removed from the disk magazine as follows. The user urges the end sections of the disk ejection levers 125 (the right end sections in FIG. 28) toward the user's side by fingers to rotate the disk ejection levers 125 clockwise. Then, since the corresponding disk D is ejected by the end sections of the disk ejection levers 125 (the left end sections in FIG. 28) from the magazine casing 100, the user pulls out the disk D.

(Initial State)

First, in the initial state in which the magazine casing 100 is not inserted, the ejecting member 630 is located at the front, and the small rack 611 of the loading plate 610 is meshed with the upper gear 310a of the loading gear 310, as shown in FIG. 13. The vertical-shifting rack 321 of the rear shift plate 310 is located at the non-toothed portion of the lower gear 310c of the loading gear 310 and is not engaged therewith.

(Insertion of the Magazine Casing 100)

Figure 10:
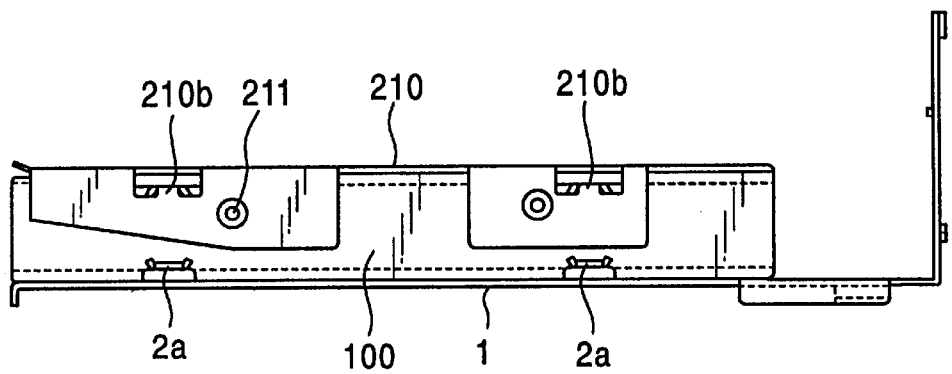
FIG. 10 is a right-hand side view showing a magazine holder of the magazine shift unit shown in FIG. 8.

In this state, when the magazine casing 100 is inserted from the magazine insertion opening 2 of the chassis unit 1 in a direction in which its circular corner be the left rearward, as shown in FIG. 13, the catching section 631 of the ejecting member 630 engages with the recess 131a formed in the lower plate 131 of the magazine lower section 130. In addition, as shown in FIGS. 10 and 11, both left and right ends of the magazine upper section 120 are inserted between the magazine holder 210 and the upper gripping pawl 210b, and both left and right ends of the magazine lower section 130 are inserted between the chassis unit 1 and the lower gripping pawl 2a.

(Start of Loading)

When the magazine casing 100 is further pressed rearward, the ejecting member 630 slides rearward to press the left end of the loading arm 620 rearward, so that the loading arm 620 is rotated clockwise. Then, the presser pawl 621 on the right end of the loading arm 620 presses the loading start switch 10 provided on the right side surface of the chassis unit 1, so that the loading motor 311 is started. Since a driving force of the loading motor 311 is transmitted to the intermediate gear 310b via the transmission gears 311a, the loading gear 310 is rotated clockwise.

Figure 29:
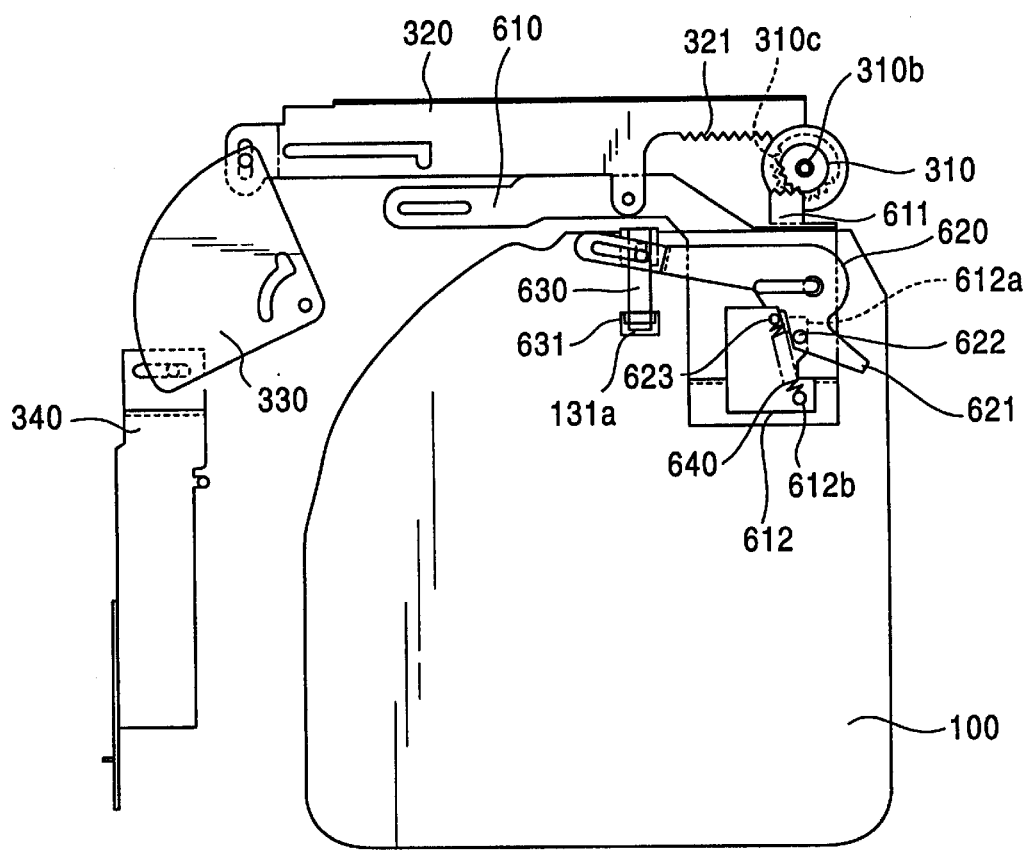

As described above, since the upper gear 310a engages with the small rack 611, the clockwise rotation of the loading gear 310 allows the loading plate 610 to slide leftward. Then, the recess 612a of the loading plate 610 urges the projection 622 of the loading arm 620 leftward, so that the loading arm 620 further rotates clockwise to move the ejecting member 630 rearward. Accordingly, as shown in FIG. 29, the catching section 631 engaged with the recess 131a further pulls the magazine casing 100 rearward.

(Completion of Loading)

At the point when the ejecting member 630 reaches the rearmost end, the upper gear 310a of the loading gear 310 faces the small rack 611 of the loading plate 610 at its non-toothed portion. Thus, the loading plate 610 stops sliding, and the loading arm 620 stays at a loading completion position.

Figure 30:
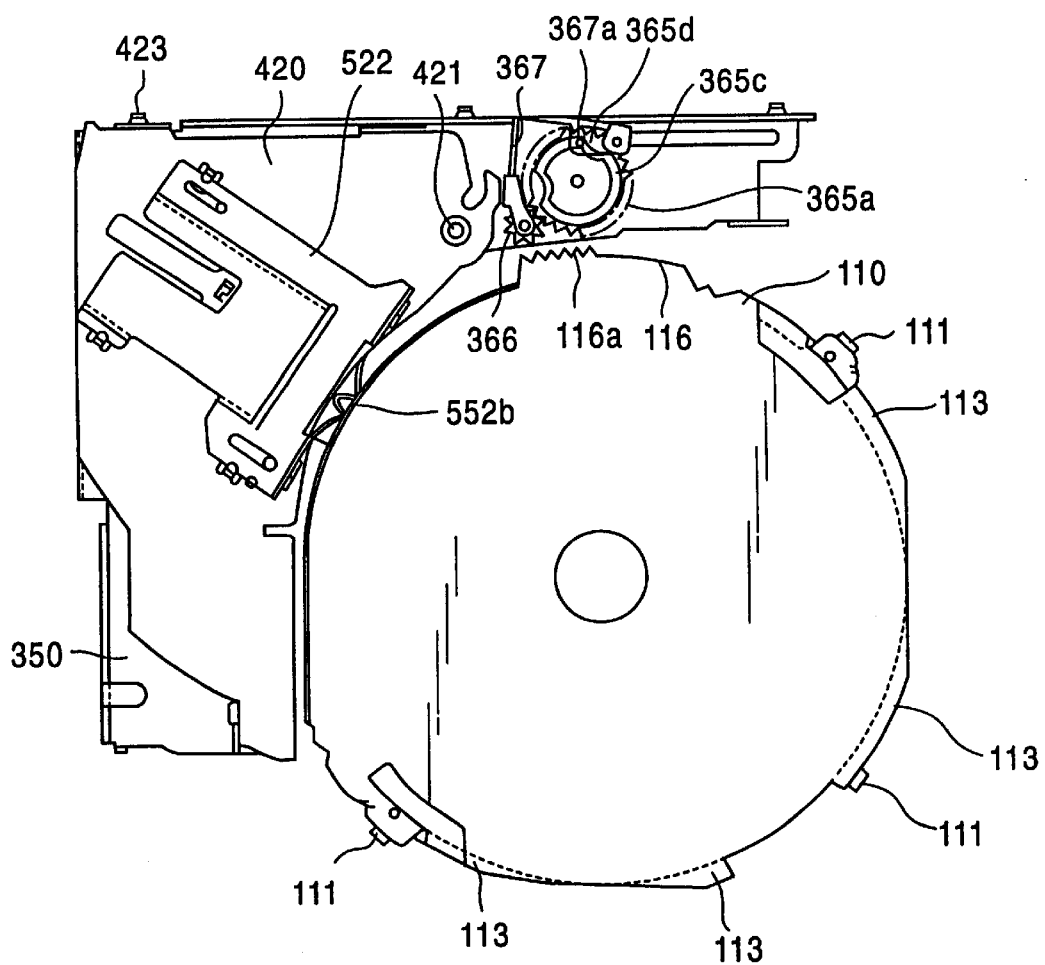
FIG. 30 is a plan view showing the positional relationship between the tray and the swing unit when the magazine is mounted in the first embodiment shown in FIG. 1.
Figure 31:
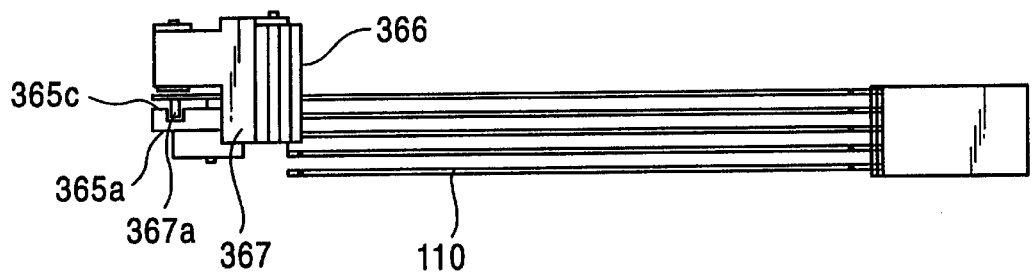
FIG. 31 is a left-hand side view showing the positional relationship between the tray and the swing unit when the magazine is mounted in the first embodiment shown in FIG. 1.

When the magazine casing 100 is mounted in the chassis unit 1 as described above, an end of the tray 110 in the magazine casing 100 abuts against the tray guide surface 552b provided on the first lock plate 552 of the drive unit 500, as shown in FIG. 30.

2. Disk Selecting Operation (Actuation of the Rear Shift Plate 320)

When the loading gear 310 further rotates clockwise following the pulling-in operation of the magazine casing 100 as described above, the toothed portion of the lower gear 310c engages with the vertical-shifting rack 321 of the rear shift plate 320, as shown in FIG. 29. Then, since the rear shift plate 320 slides rightward, the vertical-guiding pins 351 formed on the rear of the vertical-tracking chassis 350 are urged upward by the two rear stepped cams 322 shown in FIG. 15.

(Actuation of the Left Shift Plate 340)

Simultaneously, the rear end of the link plate 330 coupled to the left end of the rear shift plate 320 is urged rightward, so that the link plate 330 rotates clockwise. The left shift plate 340 coupled to the front end of the link plate 330 is urged rearward to slide. Accordingly, the vertical-guiding pin 351 formed on the left of the vertical-tracking chassis 350 is urged upward by the left stepped cam 341 of the left shift plate 340 shown in FIG. 16.

(Upward Movement and Stop of the Vertical-Tracking Chassis 350)

Since the vertical-guiding pins 351 are urged upward as described above, the vertical-tracking chassis 350 gradually moves upward from the position of the lowermost tray 110. When the arrival of the vertical-tracking chassis 350 at a position corresponding to that of a desired tray 110 (here, the third tray 110 from above) is detected by the photodetector 15, a stop signal is transmitted to the loading motor 311 to stop the loading gear 311. Accordingly, the rear shift plate 320 is stopped, and the vertical-tracking chassis 350 is stopped.

3. Magazine Unlocking Operation (Initial State)

In the initial state of the drive unit 360, the tray gear arm-rotating pin 367a of the tray gear 367 is in a position disengaged from the U-shaped section 365d of the operating cam groove 365c, as shown in FIG. 30. Accordingly, the tray gear arm 367 rotates clockwise, and the tray gear 366 is separated from the gear groove 116a formed in the tray 110 in the magazine casing 100. In addition, as shown in FIG. 21, since the non-toothed portion of the lower gear 365b of the cam gear 365 faces the transferring rack 411 of the power plate 410, the power plate 420 is stopped.

(Upward Movement of the Drive Unit 360)

When the disk selecting operation is performed by the upward movement of the vertical-tracking chassis 350 from the initial state, the drive unit 360 is also moves upward.

Then, the gear groove 116a of the desired tray 110 (here, the third tray 110 from above) and the gear grooves 116a of the higher trays 110 face the tray gear 366 without contacting each other.

(Rotation of the Tray 110)

Figure 32:
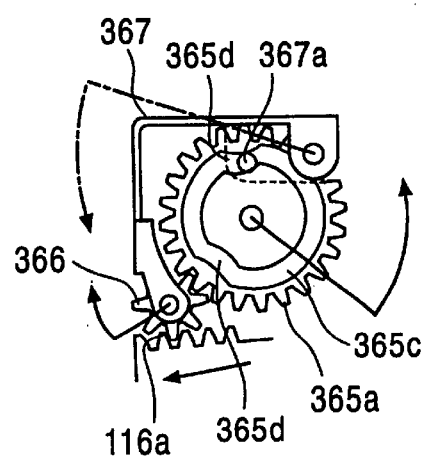
FIG. 32 is a plan view showing a position of a tray gear during a magazine unlocking operation in the first embodiment shown in FIG. 1.

Next, the driving motor 361 is started to rotate the cam gear 365 counterclockwise, as shown in FIG. 32. Then, since the tray gear arm-rotating pin 367a enters the U-shaped section 365d of the operating cam groove 365c, the tray gear arm 367 rotates counterclockwise. The tray gear 366 moves forward to mesh with gear grooves 116a of the three trays 110 facing the tray gear 366. The tray gear 366 meshes with the upper gear 365a of the cam gear 365, so that the tray gear 366 rotates clockwise with the counterclockwise rotation of the cam gear 365.

Therefore, the three trays 110 rotate counterclockwise simultaneously. The periphery of the trays 110 abuts against the side walls 122a (FIG. 28) and the tray guide surface 552b (FIG. 30), so that stable rotation is achieved. When the trays 110 are rotated as described above, the projections 116 each having the gear groove 116a enter the corresponding slits 212a (FIGS. 8 and 11) of the tray guide 212.

(Unlocking)

Figure 33:
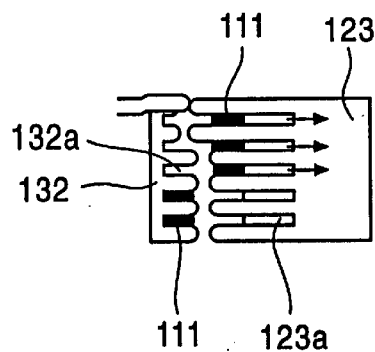
FIG. 33 is a vertical section showing positions of tray-supporting pawls during a magazine unlocking operation in the first embodiment shown in FIG. 1.
Figure 34:
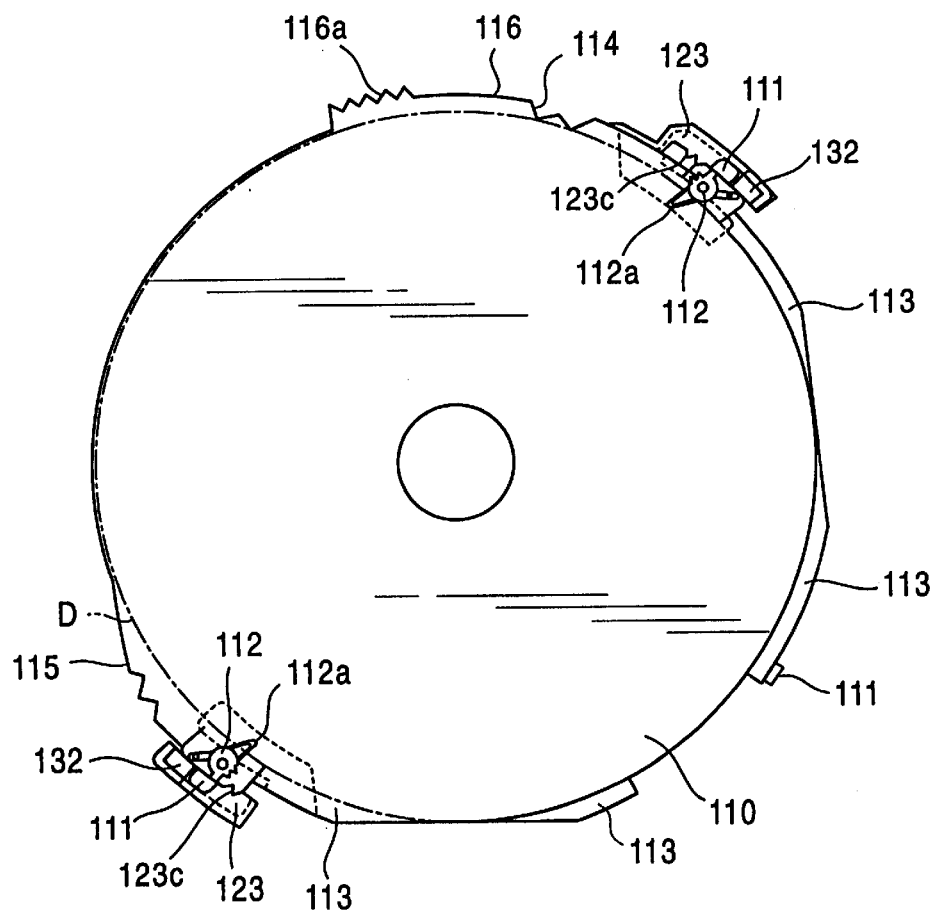
FIG. 34 is a vertical section showing the tray during the magazine unlocking operation in the first embodiment shown in FIG. 1.

When the upper three trays 110 are rotated, the tray-supporting pawls 111 therearound enter the slits 123a of the upper slit section 123, as shown in FIGS. 33 and 34. At this time, the uppermost tray-supporting pawl 111 moves from the uppermost boundary of the upper slit section 123 and the lower slit section 132 to the upper slit section 123, so that there is no member for restricting the vertical shifts of the slit sections 123 and 132. Accordingly, the magazine upper section 120 and the magazine lower section 130 are placed in an unlocked state. Since the tray-supporting pawls 111 of the rotated three trays 111 are supported only by the upper slit section 123, the trays 110 are released from the magazine lower section 130 so as to be lifted together with the magazine upper section 120.

(Stop of the Tray Gear 366)

Figure 35:
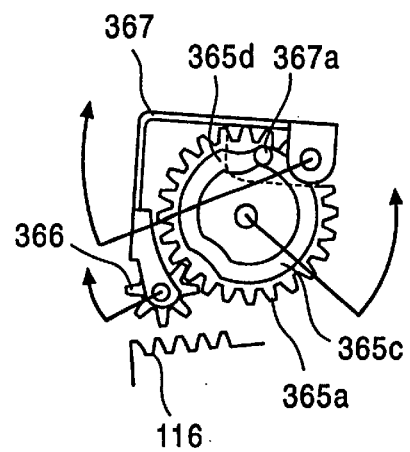
FIG. 35 is a plan view showing a position of the tray gear upon completion of the magazine unlocking operation in the first embodiment shown in FIG. 1.

When the trays 110 are rotated by predetermined degrees as described above, the tray gear arm-rotating pin 367a is disengaged from the U-shaped section 365d of the operating cam groove 365c, as shown in FIG. 35. Accordingly, the tray gear arm 367 rotates clockwise and the tray gear 366 moves rearward, so that the tray gear 366 is separated from the gear groove 116a. At this time, the brush switch 364 shown in FIG. 19 reaches the contact w to detect the unlocking of the magazine casing 100, whereby the driving motor 361 is stopped.

4. Magazine Dividing Operation (Upward Movement of the Magazine Holder 210)

The magazine shift motor 221 is started to rotate the cylindrical cam 220 after unlocking the magazine casing 100 as described above. Then, as shown in FIG. 9, the left holder guide pin 211 of the magazine holder 210 is urged upward by the helical cam 220a. Simultaneously, the disk-like gear 220c of the cylindrical cam 220 rotates the second disk section 232 via the first disk section 231. Since the magazine-shifting rack 241 of the magazine shift plate 240 engages with the circular gear 232b of the second disk section 232, the magazine shift plate 240 slides rearward with the rotation of the second disk section 232. Accordingly, as shown in FIG. 12, the right holder guide pins 211 of the magazine holder 210 are urged upward by the inclined cams 242 formed in the magazine shift plate 240.

When the holder guide pins 211 are urged upward as described above, the magazine holder 210 moves upward to the magazine full-open position. The position of the magazine shift plate 240 at this time is detected by the magazine open switch 14, and the magazine shift motor 221 is stopped.

(Division of the Magazine)

Figure 36:
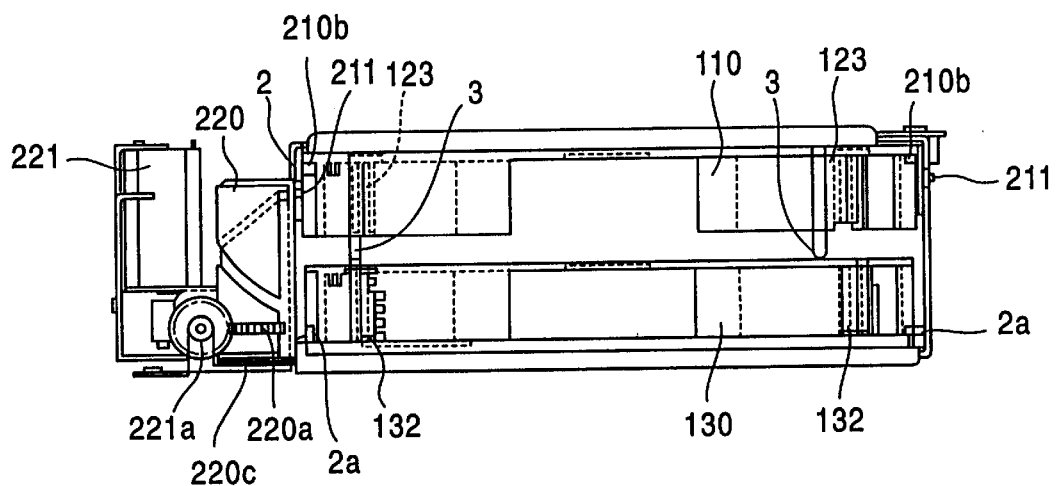
FIG. 36 is a front view showing a magazine divided state in the first embodiment shown in FIG. 1.
Figure 37:
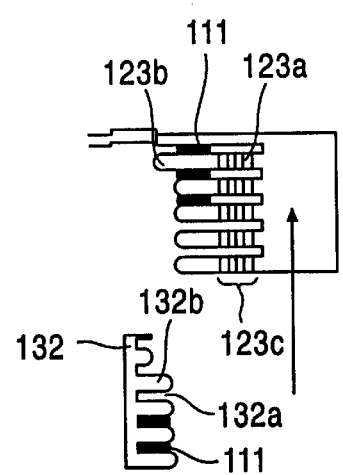
FIG. 37 is a vertical section showing the upper slit section and the lower slit section in the magazine divided state in the first embodiment shown in FIG. 1.

By the upward movement of the magazine holder 210 as described above, the magazine upper section 120 gripped by the upper gripping pawls 210b is lifted together with the three trays 110, as shown in FIGS. 36 and 37. The magazine lower section 130, however, stays downward together with the two trays 110 because it is gripped by the lower gripping pawls 2a. Accordingly, the magazine casing 100 is divided into upper and lower sections in the chassis unit 1.

At this time, the guide shaft 3 are inserted into the insertion holes 210a of the magazine holder 210, and are further inserted into the guide holes 126, so that the forward and backward movements of the magazine upper section 120 are restricted. The projections 116 of the three trays 110 enter the slits 212a of the tray guide 212. Accordingly, the trays 110 are supported by a total of four points including the three tray-supporting pawls 111, and do not hang down in a specific direction.

5. Swing Unit Transferring Operation (Rotation of the Swing Chassis 420)

The driving motor 361 of the drive unit 360 is restarted after the completion of division of the magazine casing 100 to rotate the cam gear 365 counterclockwise. Then, as shown in FIG. 21, the gear groove of the lower gear 365b of the cam gear 365 meshes with the transferring rack 411 of the power plate 410, so that the power plate 410 slides leftward. Since the power roller 412 engages with the hook-like cutout 422 of the swing chassis 420, the swing chassis 420 is urged by the power roller 412 moving leftward together with the power plate 410, and starts to rotate counterclockwise about the transfer-rotation shaft 421.

Figure 38:
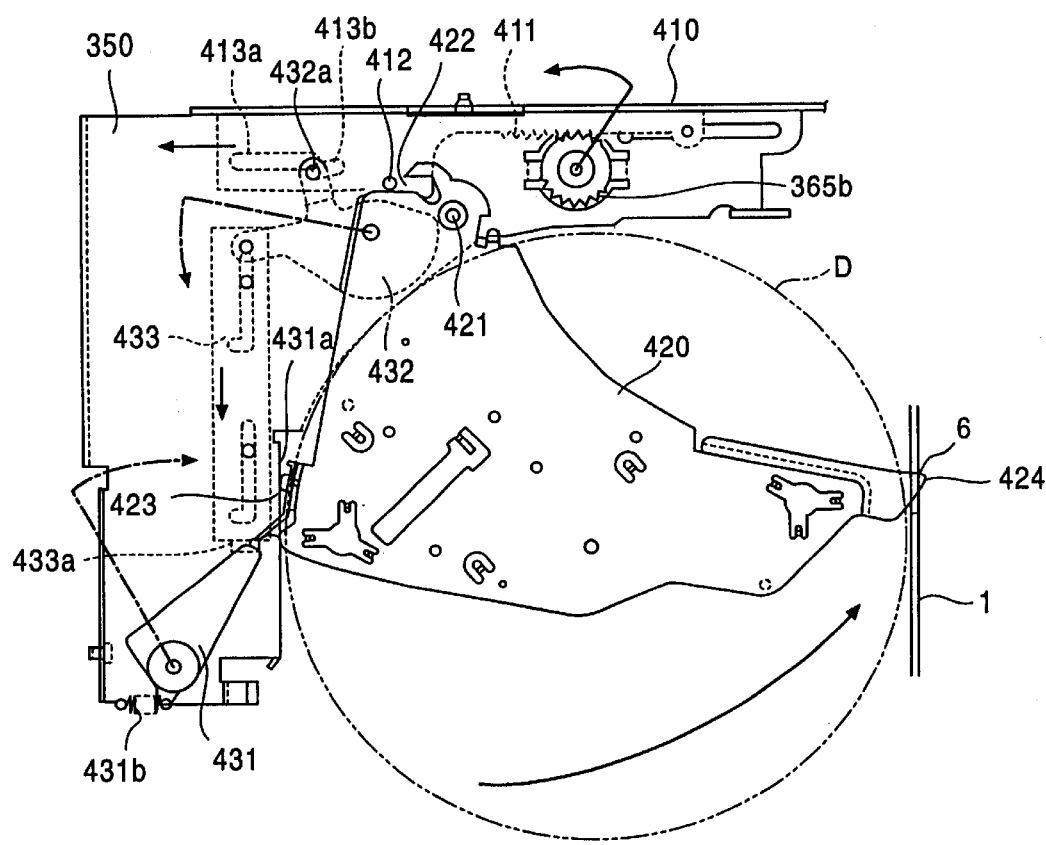
FIG. 38 is a partially transparent plan view showing the transferred swing unit in the first embodiment shown in FIG. 1.

When the swing chassis 420 is continuously rotated, the overall swing unit 400 is transferred into the space between the divided magazine upper section 120 and the magazine lower section 130, as shown in FIG. 38. The abutting pawl 424 formed at the terminal end of the swing chassis 420 engages with the V-shaped slit 6 of the chassis unit 1 (see FIG. 22), so that the rotation of the swing chassis 420 is stopped.

(Holding of the Swing Chassis 420)

Figure 39:
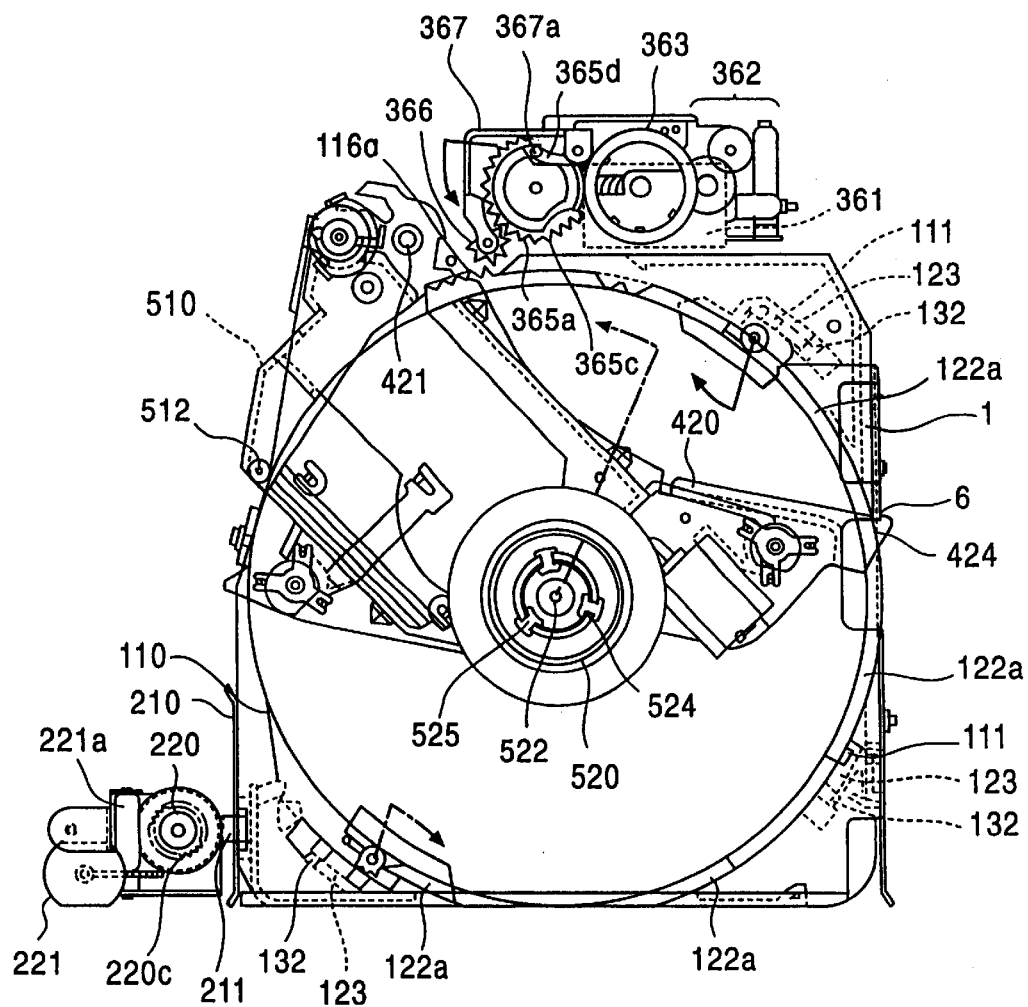
FIG. 39 is a vertical section showing a disk released state in the first embodiment shown in FIG. 1.

As shown in FIG. 38, the hold arm 431 biased by the helical extension spring 431b rotates clockwise in synchronism with the rotation of the swing chassis 420. When the rotation of the swing chassis 420 is stopped, the holding projection 423 of the swing chassis 420 engages with the holding hole 431a formed in the terminal end of the hold arm 431. As shown in FIG. 39, the tray guide projection 512 on the drive base 510 abuts against ends of the three trays 110 accommodated in the magazine upper section 120.

Furthermore, as shown in FIG. 38, the power plate 410 slides leftward, and the power roller 410 is disengaged from the hook-like cutout 422 even after the rotation of the swing chassis 420 has been stopped. The leftward slide of the power plate 410 allows the hold link pin 432a of the hold link 432 to enter the right-hand front horizontal section 413b of the holding cam 413. Then, the hold link 432 rotates counterclockwise, so that the hold plate 433 is urged to slide forward.

The hold arm 431 rotates clockwise to press an end of the swing chassis 420 as described above. The presser section 433a of the hold plate 433, however, presses the rear end of the holding arm 431. Accordingly, counterclockwise return of the hold arm 431 is restricted and the swing chassis 420 is held more firmly, so that rattling of the swing chassis 420 is prevented. At this time, the brush switch 364 shown in FIG. 19 reaches the contact x to detect the completion of transferring, whereby the driving motor 361 is stopped.

6. Disk Chucking Operation

Figure 40:
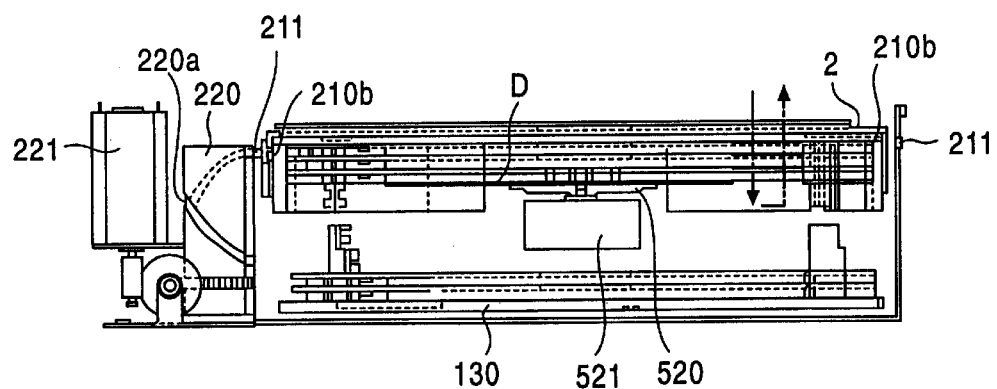
FIG. 40 is a front view showing a disk chucked state in the first embodiment shown in FIG. 1.

The drive unit 500 formed on the swing unit 400 that has been transferred as described above is in a floating locked state, and the turntable 520 reaches a position corresponding to the center hole of the disk D, as shown in FIG. 39. In this state, when the magazine shift motor 221 is started to move the magazine holder 210 to the disk chucking position, as shown in FIG. 40, the position of the magazine shift plate 240 at this time is detected by the chucking switch 13, and the magazine shift motor 221 is stopped.

When the magazine holder 210 moves downward to the intermediate position as described above, the magazine upper section 120 held by the magazine holder 210 also moves downward. Then, the disk D held in the third tray 110 in the magazine upper section 120 is pressed onto the turntable 520, and the disk insertion section 524 is inserted into the center hole of the disk D. At this time, as shown in FIGS. 24B and 24C, the disk hook 525 provided on the disk insertion section 524 rotates inward about the fulcrum 525b against the biasing force of the spring 523, so that the hooking section 525a is inserted into the center hole of the disk D.

Figure 41:
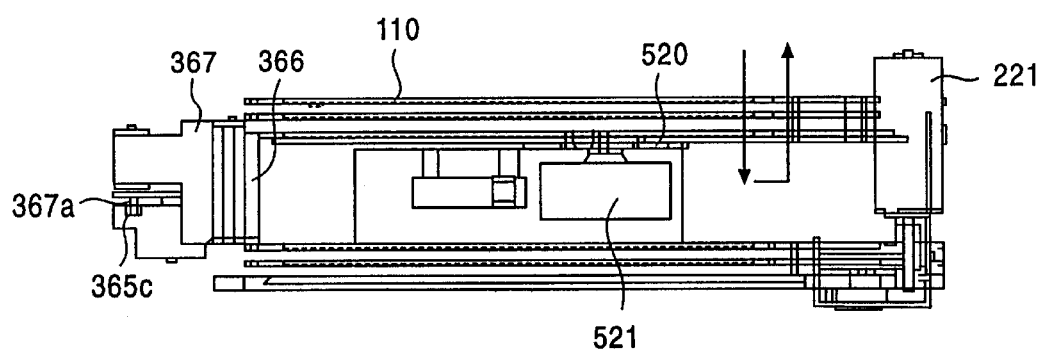
FIG. 41 is a left-hand side view showing the positions of the drive unit and the tray when the disk is chucked in the first embodiment shown in FIG. 1.

When the hooking section 525a passes through the center hole, the disk hook 525 is rotated outward by the biasing force of the spring 523 and the hooking section 525a engages with the upper end of the center hole of the disk D, so that the disk D is held on the turntable 520. At this time, as shown in FIG. 41, only the third tray 110 faces the tray gear 366.

7. Disk Releasing Operation (Rotation of the Tray 110)

After the completion of disk chucking, the driving motor 361 is restarted to rotate the cam gear 365 counterclockwise. Then, as shown in FIG. 39, the tray gear arm-rotating pin 367a enters the U-shaped section 365d of the operating cam groove 365c of the upper gear 365a, so that the tray gear arm 367 rotates counterclockwise. This allows the tray gear 366 to move forward so as to mesh with the gear groove 116a of the third tray 110 again. The tray gear 366 is rotated clockwise by the mesh with the upper gear 365a, the tray 110 further rotates counterclockwise. The periphery of the tray 110 abuts against the side wall 122a of the magazine upper section 120 and the tray guide projection 512 of the drive base 510, so that stable rotation can be achieved.

(Release of the Disk D)

When the third tray 110 rotates counterclockwise as described above, the planetary gears 112 on both ends of the tray 110 engage with the gear grooves 123c of the upper slit section 123, as shown in FIG. 39, so that the planetary gears 112 rotate clockwise. The disk supporting pawls 112a of the planetary gears 112 supporting the disk D retract outside the disk D. Accordingly, the periphery of the disk D chucked on the turntable 520 is released. At this time, the non-toothed portion of the lower gear 365b of the cam gear 365 faces the transferring rack 411 of the power plate 410, so that the power plate 410 is stopped.

(Retraction of the Tray Gear 366)

Figure 42:
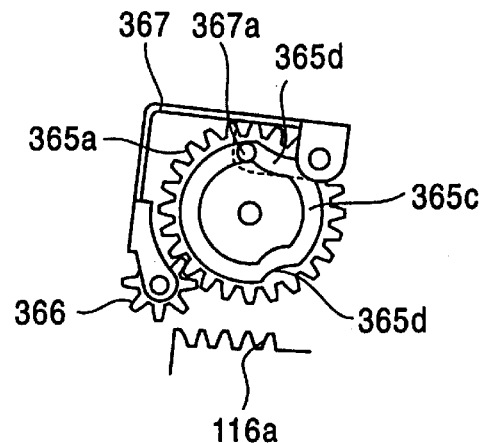
FIG. 42 is a plan view showing a position of the tray gear upon completion of release of the disk in the first embodiment shown in FIG. 1.

Furthermore, the counterclockwise rotation of the cam gear 365 allows the tray gear arm-rotating pin 367a to be disengaged from the U-shaped section 365d of the operating cam groove 365c, as shown in FIG. 42, so that the tray gear arm 367 rotates clockwise. Then, the tray gear 366 moves rearward to be separated from the gear groove 116a of the tray 110. At this time, the brush switch 364 reaches the contact y to detect the disk release position, whereby the driving motor 361 is stopped.

8. Magazine Retracting Operation

When the magazine shift motor 221 is started after the disk D has been released as described above to move the magazine holder 210 upward to the magazine full-open position, the position of the magazine shift plate 240 at this time is detected by the magazine open switch 14, and the magazine shift motor 221 is stopped.

When the magazine holder 210 moves upward to the magazine full-open position again, the magazine upper section 120 held by the magazine holder 210 also moves upward. Accordingly, three trays 110 in the magazine upper section 120 are lifted except one disk D chucked on the turntable 520, whereby a clearance required for the playback of the disk D is conserved.

9. Floating Lock Releasing Operation

When the driving motor 361 is started to rotate the cam gear 365 counterclockwise after the completion of the magazine retracting operation, the gear portion of the lower gear 365b engages with the transferring rack 411 of the power plate 410, so that the power plate 410 slides leftward. Then, as shown in FIG. 25, the power roller 412 of the power plate 410 abuts against the rear right end of the lock link 551, so that the lock link 551 is rotated counterclockwise. Since the front end of the lock link 551 urges the first lock plate 552, the first lock plate 552 slides rightward against the biasing force of the helical extension spring 555. Accordingly, the conical projections 510a formed on the right side surface of the drive base are released from the locking holes 552a formed in the right vertical surface of the first lock plate 552.

The rear end of the reverse link 554 is urged rightward simultaneously with the rightward movement of the first lock plate 552, so that the reverse link 554 is rotated clockwise. Since the reverse link 554 engages with the concave cutout 553b of the second lock plate 553 at its front end, the second lock plate 553 slides leftward against the biasing force of the helical extension spring 555. Accordingly, the conical projection 510a formed on the left side surface of the drive base 510 is released from the locking hole 553a formed in the left vertical surface of the second lock plate 553. As a result, the drive base 510 is placed in a floating state in which the drive base 510 is supported only by three dampers 511. At this time, the brush switch 354 shown in FIG. 19 reaches the contact z to detect the release of the floating lock, whereby the driving motor 361 is stopped.

10. Disk Playback Operation

After placing the drive base 510 in the floating state as described above, the spindle motor 521 is started to rotate the disk D on the turntable 520. The feed motor 543 is started to rotate the feed screw 542, and the optical pickup 530 is moved along the guide rail 541, whereby the information of the disk D is read and played back.

Since the drive base 510 is in the floating state supported only by the dampers 511, external vibrations are absorbed by the dampers 511, and the turntable 520 and the optical pickup 530 are not affected by the vibrations, so that information of the disk D can be read accurately.

11. Disk Re-Accommodating Operation

An operation for re-accommodating the playback-completed disk D in the tray 110 of the magazine casing 100 will now be described.

(Floating Re-Locking Operation)

Figure 26A:
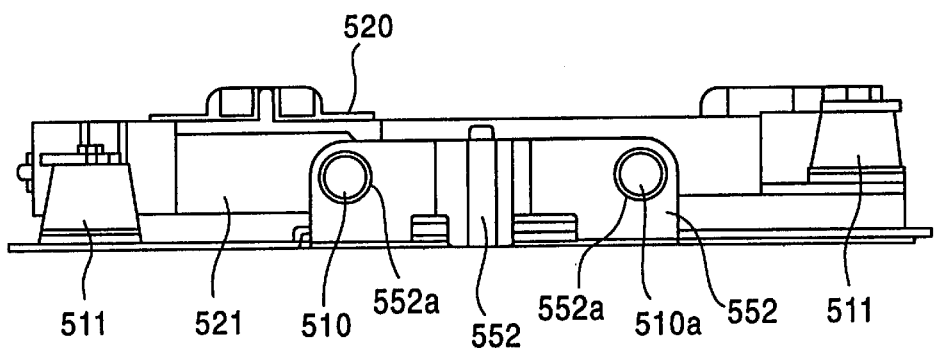
FIG. 26A is a right-hand side view and FIG. 26B is a left-hand side view each showing a floating locked state of the drive unit shown in FIG. 23.

When the driving motor 361 is started to rotate the cam gear 365 clockwise after stopping the rotation of the turntable 520, the power plate 410 is slid rightward by the lower gear 365b engaged with the transferring rack 411. Then, as shown in FIG. 25, the power roller 412 of the power plate 410 moves rightward, so that the lock link 551 is released from pressing by the power roller 412. The first lock plate 552 is slid leftward by the biasing force of the helical extension spring 555. Accordingly, as shown in FIG. 26A, the conical projections 510a formed on the right surface of the drive base 510 are locked by the locking holes 552a formed in the right vertical surface of the first lock plate 552.

Figure 26B:
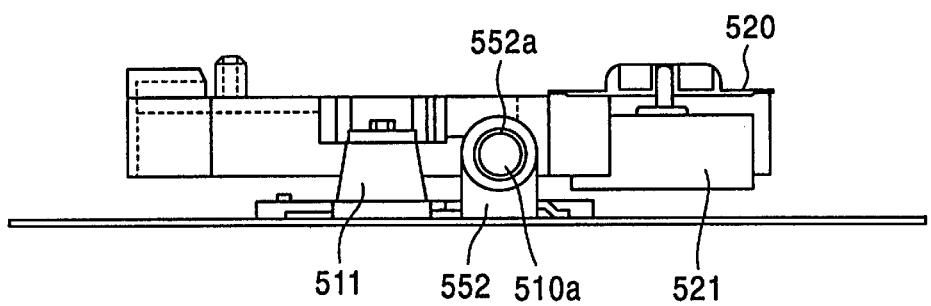

Simultaneously, since the rear end of the reverse link 554 is biased leftward, the reverse link 554 rotates counterclockwise. Then, the biasing force of the front end of the reverse link 554 and the biasing force of the helical extension coil 555 are exerted, so that the second lock plate 553 is slid rightward. Accordingly, as shown in FIG. 26B, the conical projection 510a formed on the left surface of the drive base 510 is locked by the locking hole 553a formed in the left vertical surface of the second lock plate 553.

(Disk Re-Gripping Operation)

When the magazine shift motor 221 is started to move the magazine holder 210 downward to the disk chucking position in a state where the drive base 510 is floating locked to restrict displacement thereof, the position of the magazine shift plate 240 at this time is detected by the chucking switch 13, and the magazine shift motor 221 is stopped. When the magazine holder 210 moves downward to the disk chucking position again as described above, the third tray 110 in the magazine upper section 120 comes into contact with the disk D on the turntable 520.

When the driving motor 361 is continuously driven to rotate the cam gear 365 clockwise, the tray gear arm-rotating pin 367a enters the U-shaped section 365d of the operating cam groove 365c, so that the tray gear ram 367 rotates counterclockwise. This allows the tray gear 366 to move forward to mesh with the gear groove 116a of the third tray 110. The tray gear 366 meshes with the upper gear 365a to rotate counterclockwise, thereby rotating the three trays 110 clockwise. Since the periphery of the trays 110 abuts against the side wall 122a and the tray guide projection 512, the stable rotation of the trays 110 is achieved.

When the tray 110 rotates clockwise as described above, the planetary gears 112 rotate counterclockwise because they engage with the gear grooves 123c of the upper slit section 123, as shown in FIG. 34. Then, the disk supporting pawls 112a get under the disk D to support the disk D. Accordingly, the periphery of the disk D chucked on the turntable 520 is held. At this time, since the non-toothed portion of the lower gear 365b faces the transferring rack 411, the power plate 410 is stopped.

When the cam gear 365 further rotates clockwise, the tray gear arm-rotating pin 367a is disengaged from the U-shaped section 365d of the operating cam groove 365c, so that the tray gear arm 367a rotates clockwise. Then, the tray gear 366 moves rearward to be separated from the gear groove 116a of the third tray 110.

(Disk Chucking Releasing Operation)

When the magazine shift motor 221 is started to move the magazine holder upward to the magazine full-open position under the above-described state, the position of the magazine shift plate 240 at this time is detected by the magazine open switch 14, and the magazine shift motor 221 is stopped.

When the magazine holder 210 moves upward to the magazine full-open position as described above, the magazine upper section 120 held by the magazine holder 210 also moves upward. Accordingly, the disk D held by the tray-supporting pawl 111 of the third tray 110 falls out of the disk insertion section 524 at its center hole, and moves upward together with the magazine upper section 120.

12. Swing Unit Drawing Operation

When the cam gear rotates clockwise after releasing the chucking of the disk D, the gear groove of the lower gear 365b meshes with the transferring rack 411, so that the power plate 420 slides rightward. Then, the power roller 421 re-engages with the hook-like cutout 422 of the swing chassis 420 so as to be biased rightward, so that the swing chassis 420 start to rotate clockwise about the transfer-rotation shaft 421.

When the swing chassis 420 continues to rotate, the overall swing unit 400 is drawn out of the space between the magazine upper section 120 and the magazine lower section 130 to return to the initial position of the left rearward of the chassis unit 1, as shown in FIG. 21.

Simultaneously, the hold link pin 432a of the hold link 432 enters the rear horizontal section 413a on the left of the holding cam 413. Then, the hold link 432 rotates clockwise, so that the hold plate 433 is biased to slide rearward.

Since the front end of the hold plate 433 is disengaged from the hold arm 431 pressing an end of the swing chassis 420, the hold arm 431 gradually rotates counterclockwise together with the clockwise rotating swing unit 400 against the biasing force of the helical extension spring 431b, and finally returns to the position to contact the left end portion of the chassis unit 1.

13. Magazine Uniting Operation (Downward Movement of the Magazine Holder 210)

When the magazine shift motor 221 is started to move the magazine holder 210 downward to the magazine insertion-ejection position after the swing unit 400 has been drawn out as described above, the position of the magazine shift plate 240 is detected by the magazine close switch 12, and the magazine shift motor 221 is stopped.

The magazine upper section 120 gripped by the magazine holder 210 moves downward together with the three trays 110 to be united with the magazine lower section 130 that has been stayed downward together with the two trays 110. At this time, since the guide shafts 3 are inserted into the insertion holes 210a of the magazine holder 210, the forward and backward movement of the magazine upper section 120 is restricted and the magazine upper and lower sections 120 and 130 are united accurately.

(Magazine Locking Operation)

When the cam gear 365 further rotates clockwise, the tray gear arm-rotating pin 367a enters the U-shaped section 365d of the operating cam groove 365c, so that the tray gear arm 367 rotates counterclockwise. Then, the tray gear 366 moves forward to mesh with the gear grooves 116a of the three trays 110 that facing the tray gear 366. The tray gear 366 is rotated counterclockwise by the clockwise rotation of the cam gear 365, whereby the three trays 110 rotate clockwise. Since the periphery of the trays 110 abuts against the side wall 122a of the magazine upper section 120 and the tray guide surface 552b of the drive unit 550, so that stable rotation can be achieved.

When the trays 110 rotate as described above, the tray-supporting pawls 111 enter the slits 132a of the lower slit section 132, as shown in FIG. 28. At this time, as shown in FIG. 7, only the uppermost tray-supporting pawl 111 is located over the boundary of the upper slit section 123 and the lower slit section 132, and the lower tray-supporting pawls 111 completely enters into the lower slit section 132. Accordingly, the magazine upper section 120 and the magazine lower section 130 are placed in the locked state.

When the cam gear 365 continuously rotates clockwise after the magazine casing 100 has been placed in the locked state, the tray gear arm-rotating pin 367a is disengaged from the U-shaped section 365d of the operating cam groove 365c, so that the tray gear arm 367 rotates clockwise. Then, the tray gear 366 moves rearward to be separated from the three trays 110 facing the tray gear 366. At this time, the brush switch 364 shown in FIG. 19 reaches the contact v to detect the standby state, whereby the driving motor 361 is stopped.

14. Vertical-Tracking Chassis Moving-Down Operation

The loading motor 311 is started to rotate the loading gear 310 counterclockwise after the completion of uniting and locking of the magazine casing 100. Then, the toothed portion of the lower gear 310c engages with the vertical-shifting rack 321 of the rear shift plate 320. Since the rear shift plate 320 slides leftward, the vertical-guiding pin 351 of the vertical-tracking chassis 350 is urged downward by the rear stepped cams 322.

Simultaneously, the link plate 330 coupled to the left end of the rear shift plate 320 rotates counterclockwise, and the left shift plate 340 coupled to the front end of the link plate 330 slides forward. Accordingly, the vertical-guiding pin 351 is urged downward by the left stepped cam 341 of the left shift plate 340.

Since the vertical-guiding pins 351 are urged downward as described above, the vertical-tracking chassis 350 moves downward to return to the initial lowermost position. The lower gear 310c of the loading gear 310 faces the vertical-shifting rack 321 at its non-toothed portion, so that the rear shift plate 320 is stopped.

15. Magazine Ejecting Operation

When the loading gear 310 continuously rotates counterclockwise, the upper gear 310a engages with the small rack 611 of the loading plate 610, as shown in FIG. 13, so that the loading plate 610 slides rightward. Then, the recess 612a of the loading plate 610 biases the projection 622 of the loading arm 620, so that loading arm 620 rotates counterclockwise to move the ejecting member 630 forward.

Since the catching section 631 of the ejecting member 630 engages with the recess 131a of the magazine lower section 130, the magazine casing 100 is ejected with the forward movement of the ejecting member 630. When the magazine casing 100 is ejected from the magazine insertion opening 2 by a predetermined amount, the presser pawl 621 formed on the right end of the loading arm 620 presses the eject end switch 11 of the chassis unit 1, so that the loading motor 311 is stopped, and the loading arm 620 stays at the ejecting completion position. In this state, the user pulls the magazine casing 100 out of the magazine insertion opening 2.

(3) Effects

The first embodiment described above offers the following advantageous effects. That is, since the magazine casing 100 can be locked and the trays 110 can be held by the upper and lower slit sections 123 and 132, and by the tray-supporting pawls 111 that move in accordance with the rotation of the trays 110, only the drive unit 360 for rotating the trays 110 and the vertical-tracking unit 300 may be provided in order to realize these functions. Accordingly, locking and unlocking of the magazine casing 100, selection of the disk, and supporting of the trays 110 can be effected by a simple mechanism, and the size and cost of the disk apparatus can be reduced. In particular, since the trays 110 are rotated by rotating the tray gear 366 that is engaged with and disengaged from the gears grooves 123c of the trays 110, a positive operation can be realized by a simple mechanism.

In a state where the swing unit 400 is not transferred, ends of the trays 110 in the magazine casing 100 abuts against the tray guide surface 552a of the first lock plate 552, so that a stable rotation of the trays 110 when locking and unlocking the magazine casing 100 is achieved, and reliability is improved.

When lifting the magazine upper section 120, the projections 116 of the trays 110 enter the slit 212a of the tray guide 212, so that the periphery of the trays 110 are supported by a total of four points including the three tray-supporting pawls 111 and do not hang down in a specific direction.

In a state where the swing unit 400 is transferred, the ends of the trays 110 in the magazine upper section 120 abut against the tray guide projection 512 of the drive base 510, so that stable rotation of the trays 110 when releasing or holding the disk D is achieved, and reliability is improved.

Since the disk D is held by the disk-supporting pawls 112a of the planetary gears 112, the disk D can be held and released by a simple mechanism.

Since the terminal end of the tray hold arm 124 engages with the first groove 114 of the tray 110, the rotation of the tray 110 is restricted, the rotation and unlocking of the tray 110 during transport can be prevented. In particular, both slit sections 123 and 132 are provided at three sections around the tray 110, the tray 110 can be positively locked.

Since the terminal end of the disk hold arm 133 engages with the second groove 115 of the tray 110 to abut against the disk D mounted on the tray 110, so that accidental popping of the disk D is prevented.

When the magazine upper section 120 is lifted together with the magazine holder 210, the guide shafts 3 are inserted into the guide holes 126 to guide the lifting. Therefore, the magazine upper section 120 causes no positional deviation, and operation failure caused when dividing and uniting the magazine upper and lower sections 120 and 130 is prevented.

The cylindrical cam 220 is relatively small in its depth and width dimensions, thereby allowing easily a reduction in size of the overall apparatus. In particular, the cylindrical cam 220 is used on the side of the swing unit 400 where the depth stroke is hardly conserved, and the magazine shift plate 240 that is small in its depth dimension is used on the opposite side of the swing unit 400 where the depth stroke is easily conserved, thereby allowing the members to be arranged with a space efficiency, and a substantial reduction in size of the overall apparatus can be achieved.

When the swing chassis 420 is transferred, its abutting pawl 424 is held by the V-shaped slit 6, and the opposite side thereof is held by the hold arm 431. Thus, the swing chassis 420 is supported by the transfer-rotation shaft 425a, the V-shaped slit 6, and the hold arm 431, and is hardly affected by vibrations. Furthermore, since the presser section 433a of the hold plate 433 presses the rear end of the hold arm 431, the return of the hold arm 431 is prevented, and the swing chassis 420 is held more firmly.

The disk D can be easily chucked onto and released from the turntable 520 by lifting the magazine holder 210 to allow the disk hook 525 to be engaged with and disengaged from the center hole of the disk D, so that a special member for holding the disk D from above is not required and the configuration of the apparatus can be simplified.

Second Embodiment

A second embodiment of the present invention will now be described with reference to FIGS. 43 to 60. In these drawings, the same members as those in the first embodiment are indicated by the same reference numerals, and description of such members is partially omitted.

(1) Configuration

1. Disk Magazine

Figure 43:
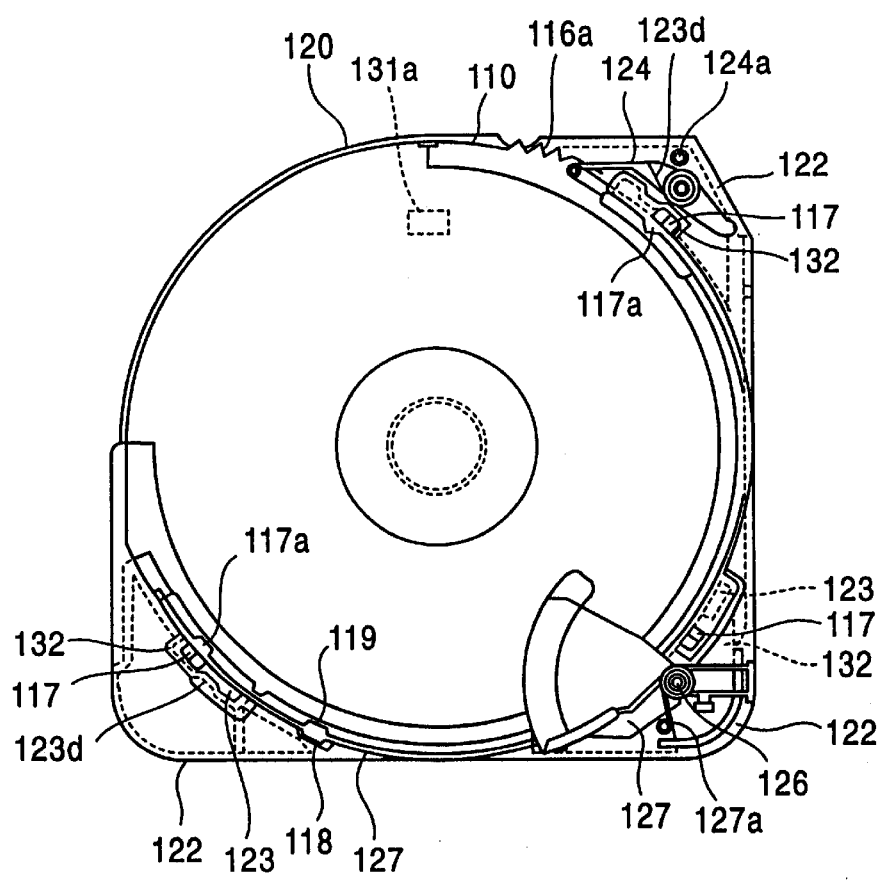
FIG. 43 is a transparent plan view showing a disk magazine in accordance with a second embodiment of the present invention.
Figure 44:
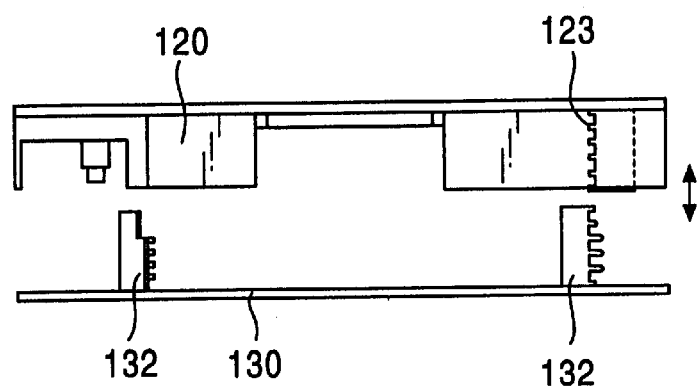
FIG. 44 is a front view showing a divided state of the disk magazine shown in FIG. 43.

As shown in FIGS. 43 and 44, a magazine casing 100 is provided so as to be divided into a magazine upper section 120 and a magazine lower section 130, and the inside thereof is partitioned by five trays 110. Configuration of these components are as follows.

(Trays 110)

Figure 45:
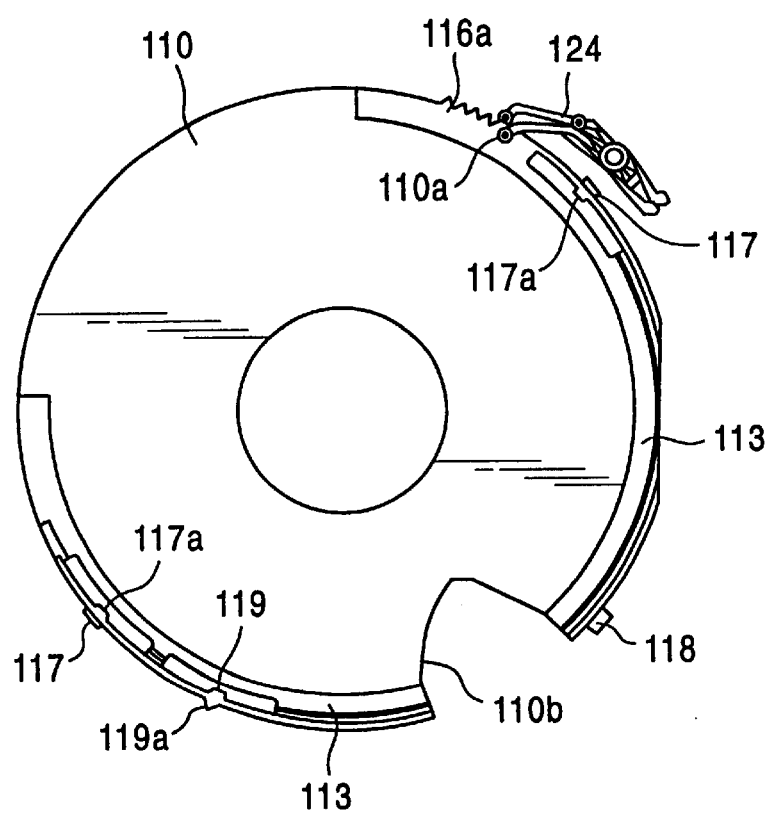
FIG. 45 is a plan view showing a tray to be accommodated in the disk magazine shown in FIG. 43.

As shown in FIG. 45, two tray-supporting projections 117 formed at two opposite sections of the periphery of each thin-wall disc-shaped tray 110 to project outwards. Two disk-holding projections 117a are formed inside of the two tray-supporting projections 117, respectively. Sections between the tray-supporting projections and the disk-holding projections 117a can be elastically deformed so that the disk-holding projections 117a project inward to hold the disk D when the tray-supporting projections are pressed, and the disk-holding projections 117a retract outward to release the disk D when the tray-supporting projections 117 is not pressed. Another tray-supporting projection 118 is formed in the middle of the two tray-supporting projections 117.

In addition, another disk-holding projection 119 is formed between one of the tray-supporting projections 117 (the lower tray-supporting projection in FIG. 45) and the intermediate tray-supporting projection 118. A pressed section 119a is formed outside of the disk-holding projection 119. A section between the disk-holding projection 119 and the pressed section 119a can be elastically deformed so that the disk-holding projection 119 projects inward to hold the disk D when the pressed section 119a is pressed inward, and the disk-holding projection 119 retracts outward to release the disk D when the pressed section 119a is not pressed.

A gear groove 116a is formed on the opposite side of the disk-holding projection 119. A rotational locking groove 110a is formed between the gear groove 116a and the tray-supporting projection 117 near the gear groove 116a. The tray 110 has a control section 113 against which the periphery of the disk D abuts formed at the circular section between the intermediate tray-supporting projection 118 and the two tray-supporting projections 117. Furthermore, a fan-like cutout 110b is formed between the tray-supporting projection 117 and the disk-holding projection 119.

(Magazine Upper Section 120)

Figure 46:
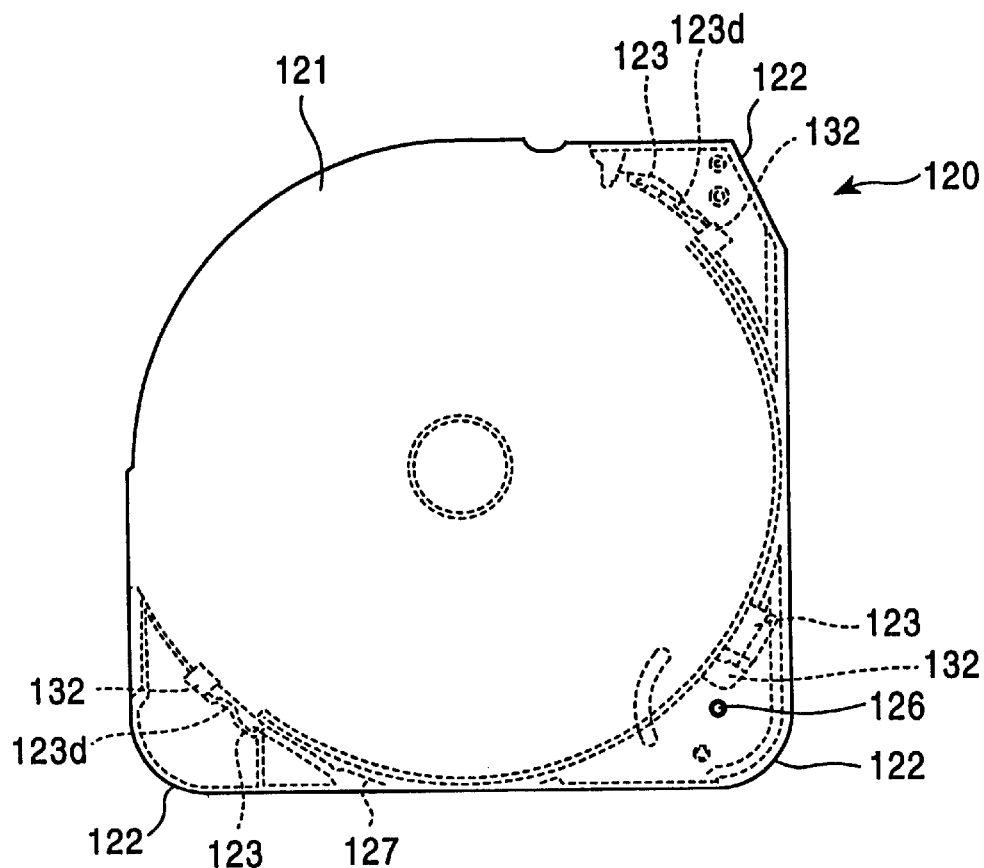
FIG. 46 is a transparent plan view of a magazine upper section constituting the disk magazine shown in FIG. 43.
Figure 47:
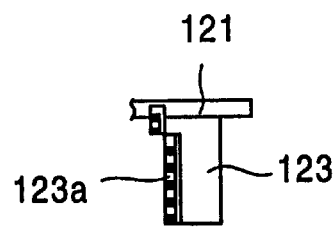
FIG. 47 is a front view showing an upper slit section of the magazine upper section shown in FIG. 46.

The magazine upper section 120 consists of an upper plate 121 and three side plates 122, as shown in FIG. 46. Side walls 122a and upper slit sections 123 are provided inside each of the three side plates 122. As shown in FIG. 47, five slits 123a are formed in the upper slit section 123, and the uppermost slit 123a is formed to be the longest.

A protuberance 123d protruding toward the center of the disk D is formed on the inner surfaces of each of the slits 123a between the opposing two upper slit sections 123. Furthermore, a presser surface 127, which abuts against the pressed section 119a of the tray 110, is formed inside the left side plate 122 of the lower side plates 122 shown in FIGS. 43 and 46.

A tray hold arm 124 provided on the magazine upper section 120 is biased by a tension coil spring 124a in the direction in which its terminal end engages with the rotational locking groove 110a of the tray, as shown in FIGS. 43 and 45. A disk ejection lever 128 is rotatably provided at a position corresponding to the fan-like cutout 110b of the tray 110 in the magazine upper section 120, and is biased by a tension coil spring 128a in the direction in which its terminal end moves away from the disk D.

Figure 48:
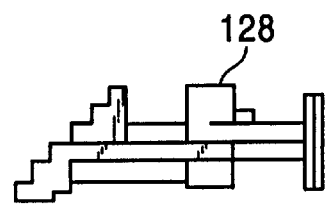
FIG. 48 is a side view showing a disk ejection lever of the magazine upper section shown in FIG. 46.

As shown in FIG. 48, the terminal end of the disk ejection lever 128 is stepped so as to correspond with the height of each tray 110, as shown in FIG. 48. A guide hole 126a into which a guide shaft 3 is inserted is formed at a position corresponding to the shaft of the disk ejection lever 128 of the upper plate 121.

(Magazine Lower Section 130)

Figure 49:
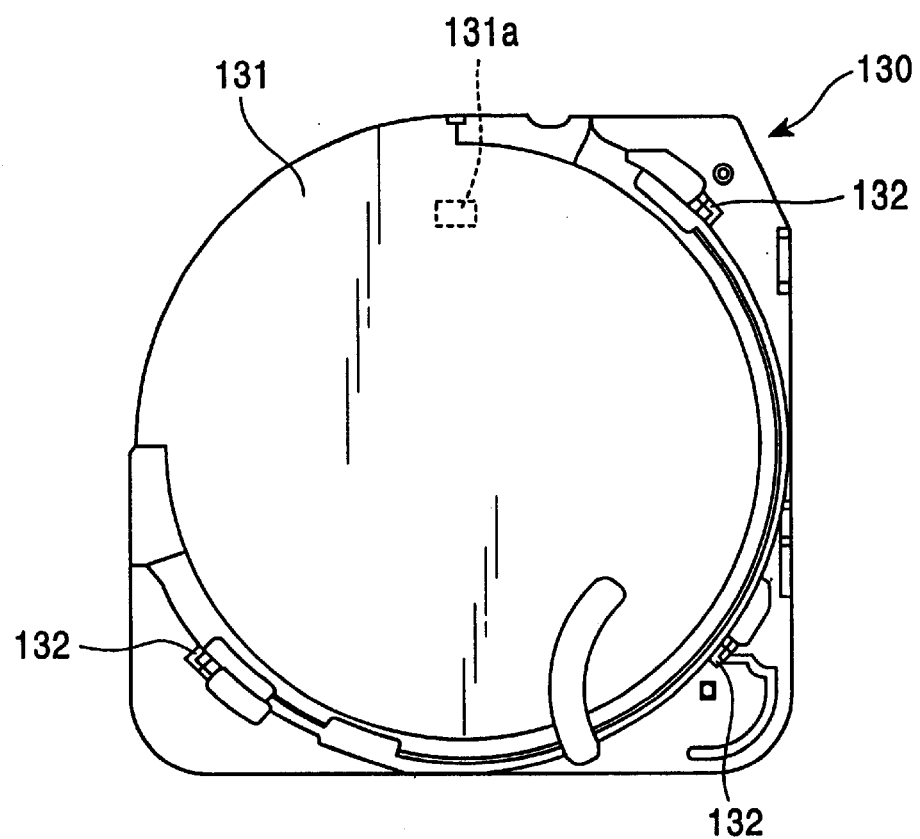
FIG. 49 is a perspective view of magazine lower section constituting the disk magazine shown in FIG. 43, as viewed from the top surface thereof.
Figure 50:
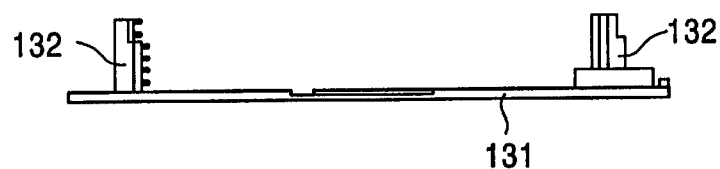
FIG. 50 is a front view showing a lower slit section of the magazine lower section shown in FIG. 49.

As shown in FIG. 49, a lower surface 131 of the magazine lower section 131 is provided with three lower slit sections 132, as shown in FIG. 49. Of five slits 132a of each lower slit section 132, the uppermost slit 132a is formed to be the shortest, as shown in FIG. 50.

2. Magazine Shift Unit 200

The magazine shift unit 200 consists of a magazine holder 210, a left magazine shift plate 250, a magazine shift link 260, and a right magazine shift plate 270, as shown in FIGS. 51 to 54. Configurations of these components are as follows.

(Magazine Holder 210)

Figure 51:
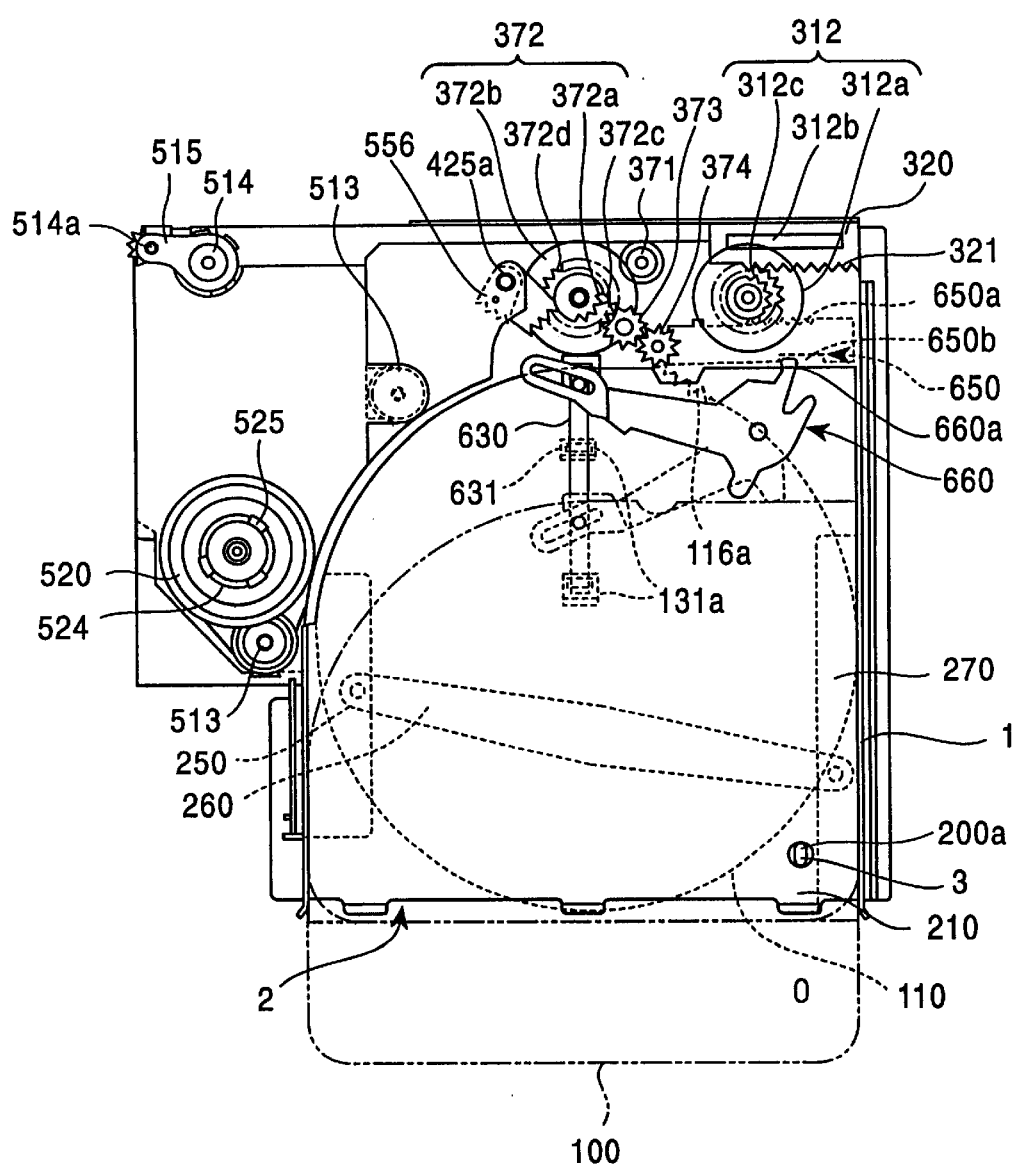
FIG. 51 is a partially transparent plan view showing the second embodiment of the present invention.

The configuration of the magazine holder 210 is substantially the same as that of the first embodiment. However, as shown in FIG. 51, an insertion hole 210a through which one guide shaft 3 is inserted without contacting each other is formed in the top surface of the magazine holder 210.

(Left Magazine Shift Plate 250)

Figure 52:
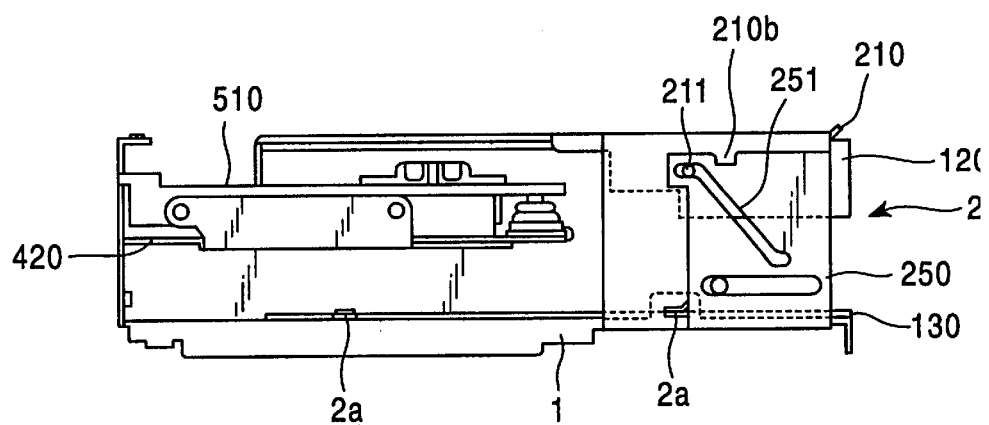
FIG. 52 is a transparent left-hand side view showing a magazine shift unit in the second embodiment shown in FIG. 51.

The left magazine shift plate 250 is provided on the left side of the magazine insertion opening 2 so as to slide back and forth, as shown in FIG. 52. An inclined cam 251 is formed in the vertical surface of the left magazine shift plate 251. The inclined cam 251 has a inclined linear shape such that it gradually ascends rearward. The holder guide pin 211 of the magazine holder 210 is slidably inserted into the inclined cam 251.

The lower end of the left magazine shift plate 250 is bent around the corner of the bottom surface of the chassis unit 1 to form a horizontal surface, and an end of the magazine shift link 260 is rotatably coupled to the horizontal surface.

(Magazine Shift Link 260)

The magazine shift link 260 is a rectangular plate having the length of about the width of the magazine insertion opening 2, as shown in FIG. 51, and is mounted on the outer bottom surface of the chassis unit 1 so as to rotate about the center thereof. An end of the magazine shift link 260 is rotatably coupled to the left magazine shift plate 250 as described above, and the other end is rotatably coupled to the right magazine shift plate 270 as described below.

(Right Magazine Shift Plate 270)

Figure 53:
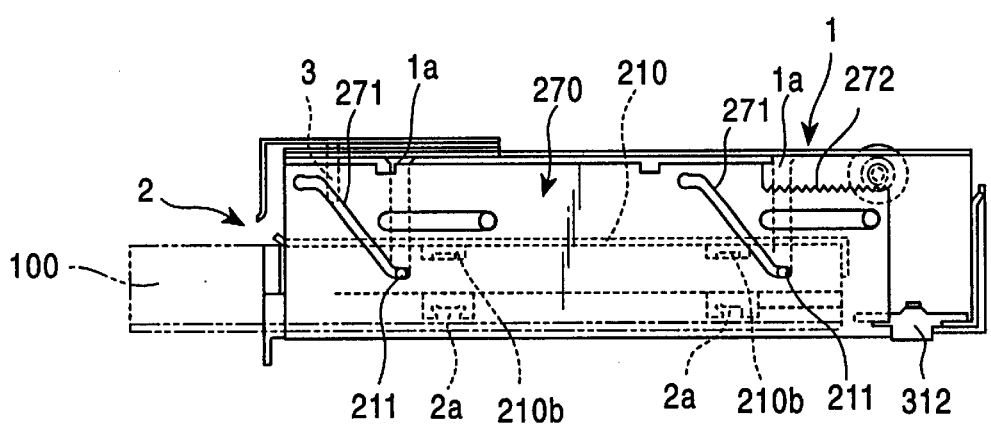
FIG. 53 is a transparent right-hand side view showing the magazine shift unit in the second embodiment shown in FIG. 51.
Figure 54:
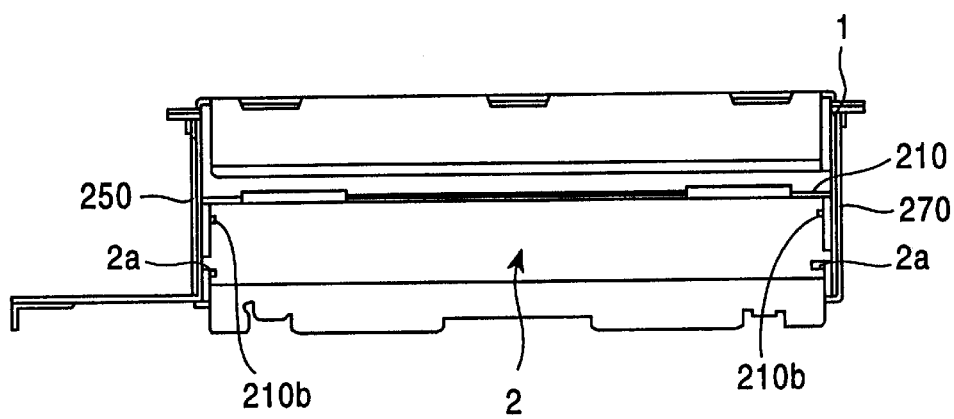
FIG. 54 is a front view showing the magazine shift unit in the second embodiment shown in FIG. 51.

The right magazine shift plate 270 is provided on the right side surface of the chassis unit 1 so as to slide back and forth, as shown in FIGS. 51 and 53. The lower end of the right magazine shift plate 270 is bent along the corner of the bottom surface of the chassis unit 1 to form a horizontal surface, and the other end of the magazine shift link 260 is rotatably coupled to the horizontal surface, as described above.

In addition, two inclined cams 271 are formed in parallel with each other in the vertical surface of the right magazine shift plate 270. Each of the inclined cams 271 has a inclined linear shape such that it gradually descends rearwards. The holder guide pins 211 of the magazine holder 210 are slidably inserted into the inclined cams 271.

Furthermore, a magazine shifting rack 272 is horizontally formed on the rear lower end of the right magazine shift plate 270. The magazine shifting rack 272 engages with a pinion driven by a magazine shift motor (not shown).

3. Vertical-Tracking Unit 300

The configuration of the vertical-tracking unit 300 in this embodiment is substantially the same as that of the first embodiment except the following differences.

(Shift Cam Gear 312)

A shift cam gear 312 has a similar function of the loading gear 310 in the first embodiment, and is provided on the rear right corner of the bottom surface of the chassis unit 1, as shown in FIG. 51. The shift cam gear 312 is of a three-stage construction in which an upper gear 312a having a large diameter and spur gear formed therearound, an intermediate gear 312b having the diameter smaller than that of the upper gear 312a, and a lower gear 312c having the diameter smaller than that of the intermediate gear 312b are formed in one piece.

The upper gear 312a can transmit a driving force of a loading motor (not shown). The intermediate gear 312b is provided at the height corresponding to the vertical-shifting rack 321 of a rear shift plate 320.

(Drive Unit 370)

Figure 56:
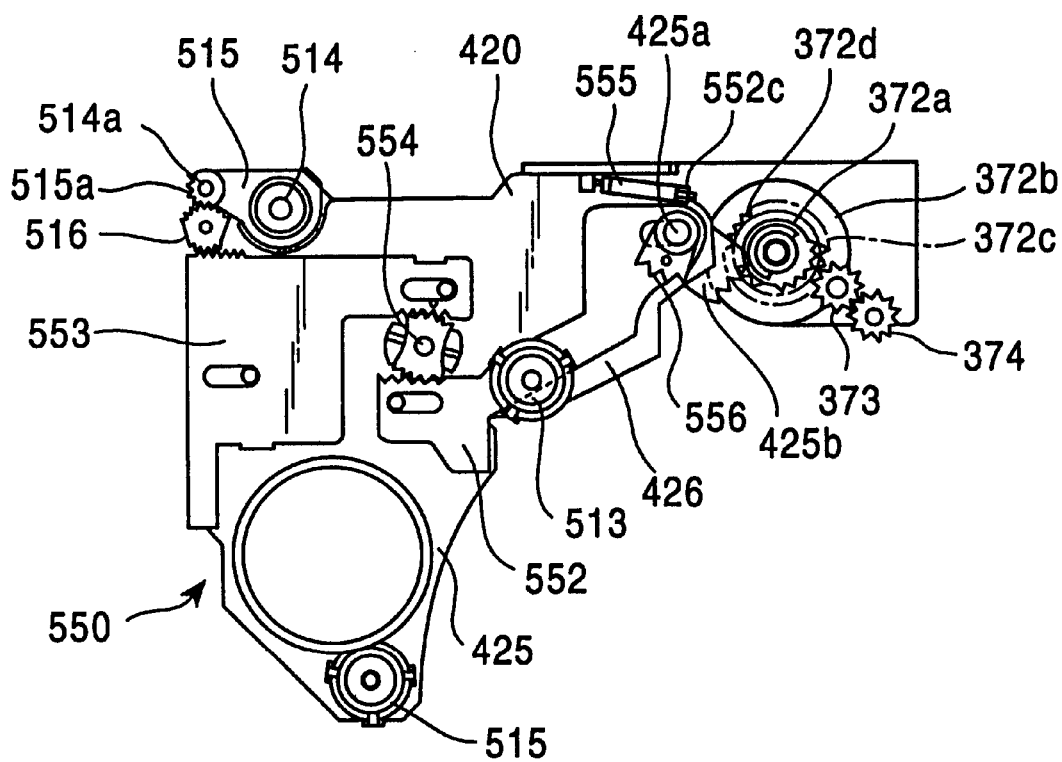
FIG. 56 is a partially transparent plan view showing a swing unit in the second embodiment shown in FIG. 51.

A drive unit 370 consists of a driving motor 361, a transmission gear 371, a large cam gear 372, an intermediate gear 373, and a tray gear 374, as shown in FIGS. 51 and 56.

The transmission gear 371 transmits the driving force of the driving motor 361 to the large cam gear 372. The large cam gear 372 has integrally formed four disk-like gears. The uppermost gear is a transferring gear 372a, the second gear is a drive source gear 372b, the third gear is a tray driving gear 372c, and the fourth gear is a floating lock-actuating gear 372d. The drive source gear 372b is a spur gear having the diameter larger than that of other gears, and engages with the transmission gear 371.

The transferring gear 372a and the floating lock-actuating gear 372d are intermittent gears each having a circular gear section on a part of the circumference thereof. The tray driving gear 372c is an intermittent gear having short gear sections on two section of its circumference, and is provided so that the rotation thereof can be transmitted to the tray gear 374 via the intermediate gear 373. Furthermore, the large cam gear 372 is provided with a brush switch (not shown) that coaxially and synchronism with the large cam gear 372.

4. Swing Unit 400

A swing chassis 425 of the swing unit 400 is a substantially triangular plate provided on the vertical-tracking chassis 350, as shown in FIGS. 51 and 56. The swing chassis 425 is provided so as to rotate about a transfer-rotation shaft 425a formed near the right end thereof.

As shown in FIG. 56, a transfer-rotation gear 425b is provided coaxially with the transfer-rotation shaft 425a so as to rotate together with the swing chassis 425. The transfer-rotation gear 425b is a partial gear having a gear groove formed in a brush-like end thereof, and is provided at the height where it can engage with the transferring gear 372 of the large cam gear 372.

5. Drive Unit 500

The configuration of the drive unit 500 in this embodiment is substantially the same as that of the first embodiment except the following differences.

(Drive Base 510)

A drive base 510 on the swing chassis 420 is supported by fixed dampers 513 at the front and right sections thereof, and is supported by a movable damper 514 at the rear left corner thereof, as shown in FIGS. 51 and 56. The movable damper 514 is provided within a moving range of an optical pickup (not shown), and is placed on the swing chassis 420 without being fixed. A damper arm 515 is mounted on the movable damper 514 via a damper shaft 514a. One end of the damper arm 515 is provided on the movable damper 514, and the other end is rotatably coupled to the corner of the drive base 510. A damper arm gear 515a is formed around the other end of the damper arm 515.

(Floating Lock Mechanism 550)

A floating lock mechanism 550 consists of a floating lock gear 556, a first lock plate 552, a second lock plate 553, a reverse link gear 554 and a helical extension spring 555, as shown in FIG. 56. The floating lock gear 556 is a gear provided coaxially with the transfer-rotation shaft 425a of the swing chassis 420 so as to rotate independently of the swing chassis 420.

The floating lock gear 556 is a partial gear having a gear groove formed in a brush-like end thereof, and is provided at a height where it can engage with the floating lock gear 372d of the large cam gear 372. Furthermore, the floating lock gear 556 is partially rotatably coupled to the left end section of the first lock plate 552.

The reverse link gear 554 is rotatably provided between the first lock plate 552 and the second lock plate 553 of the swing chassis 420. Both ends of the reverse link gear 554 engage with racks provided on the first and second lock plates 552 and 553. Since the action of the first lock plate 552 is transmitted as an action in the reverse direction to the second lock plate 553 via the reverse link gear 554, the lock plates 552 and 553 are operatively associated with each other to slide in the reverse direction.

Furthermore, the first lock plate 552 is provided with a hook 552c, and both ends of the helical extension spring 555 are engaged with the hook 552c and the swing chassis 420, so that both lock plates 552 and 553 are urged in a direction to approach each other.

In addition, a damper rotating gear 516 is provided at the rear left end section of the drive base 510. Both ends of the damper rotating gear 516 engage with a rack provided on the second lock plate 552 and the damper arm gear 515a, respectively. Accordingly, the action of the second lock plate 552 is transmitted to the damper arm gear 515a via the damper rotating gear 516, thereby rotating the damper arm 515.

6. Magazine Eject Unit 600

A magazine eject unit 600 consists of a rack plate 650, a catching arm 660, and an ejecting member 630, as shown in FIG. 51.

(Rack Plate 650)

The rack plate 650 is a plate provided in front of the shift cam gear 312 formed on the bottom surface of the chassis unit 1 so as to slide in a lateral direction. A loading rack 650a is formed on the rear section of the rack plate 650 at a position corresponding to the lower gear 312c of the shift cam gear 312. A U-shaped cutout 650a is formed in the front section of the rack plate 650.

(Catching Arm 660)

The catching arm 660 is a plate provided in front of the rack plate 650 formed on the bottom surface of the chassis unit 1. The right end of the catching arm 660 is rotatably mounted to the chassis unit 1. A projection 660a that engages with the cutout 650b of the rack plate 650 is formed at rear end of the catching arm 660.

Furthermore, the left end of the catching arm 660 is rotatably coupled to the rear end of the ejecting member 630. The configuration of the ejecting member 630 of this embodiment is the same as that of the first embodiment. Similarly to the first embodiment, a loading start switch 10 and an eject end switch 11 are provided for detecting the rotation position of the catching arm 660.

(2) Operation

Operations of the second embodiment are as follows.

1. Magazine Loading Operation (Magazine United State)

The magazine casing 100 mounted in the chassis unit 1 is in a locked state in which the division of the magazine upper section 120 and the magazine lower section 130 is restricted. That is, similarly to the first embodiment, the partition 123b constituting the uppermost slit 123 is formed to be the longest, and the partition 132b constituting the corresponding lower slit section 132 is formed to be the shortest of other slits 123a. Therefore, the uppermost slit 123b shifts toward the lower slit section 132 at the boundary of the upper slit section 123 and the lower slit section 132.

Figure 57A:
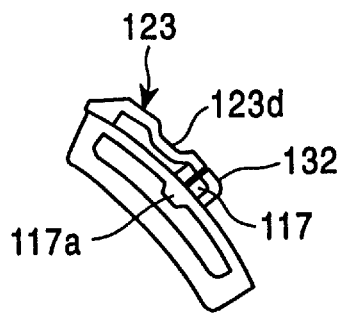
FIG. 57A is a transparent plan view showing a magazine locked state.

Due to the above configuration, in a state before rotating the tray 110, i.e., in a state where all of the tray-supporting projections 117 and 118 are drawn toward the lower slit section 132, only the uppermost tray-supporting projections 117 and 118 are located over the boundary of the upper slit section 123 and the lower slit section 132, and the lower tray-supporting projections 117 and 118 completely enter into the lower slit section 132, as shown in FIG. 57A. This allows vertical shift of the slit sections 123 and 132 to be restricted, so that the magazine upper section 120 and the magazine lower section 130 are in the locked state.

(Initial State)

As shown in FIG. 51, in the initial state in which the magazine casing 100 is not inserted, the ejecting member 630 is located at the front together with the left end of the catching arm 660. In this state, when the magazine casing 100 is inserted from the magazine insertion opening 2 of the chassis unit 1 in a direction in which its circular corner be the left rearward, a catching section 631 of the ejecting member 630 is engaged with the recess 131a formed in the outer bottom surface of the lower plate of the magazine lower section 130.

When the magazine casing 100 is further pressed rearward, the ejecting member 630 slides rearward to press the left end of the catching arm 660 rearward, so that the catching arm 660 is rotated clockwise. Then, the loading motor 311 is started by the loading start switch 10 to rotate the shift cam gear 312 counterclockwise.

As described above, since the lower gear 312c of the shift cam gear 312 engages with the loading rack 650a of the rack plate 650, the counterclockwise rotation of the shift cam gear 312 allows the rack plate 650 to slide rightward. Then, the cutout 650a of the rack plate 650 urges the projection 660a of the catching arm 660 rightward, so that the catching arm 660 further rotates clockwise to move the ejecting member 630 rearward. Accordingly, the catching section 631 engaged with the recess 131a further pulls the magazine casing 100 rearward.

At the point when the ejecting member 630 reaches the rearmost end, the lower gear 312c of the shift cam gear 312 faces the loading lack 650a of the rack plate 650 at its non-toothed portion. Thus, the rack plate 650 stops sliding, and the catching arm 660 stays at a loading completion position. When the magazine casing 100 is mounted in the chassis unit 1, similarly to the first embodiment, both ends of the magazine upper section 120 are gripped by the upper gripping pawls 210a of the magazine holder 210, and both ends of the magazine lower section 130 are gripped by the lower gripping pawls 2a of the chassis unit 1.

2. Disk Selecting Operation

Figure 55:
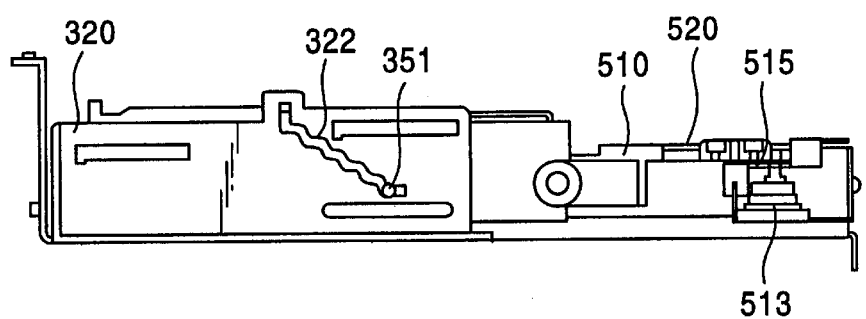
FIG. 55 is a rear elevation showing a vertical-tracking unit in the second embodiment shown in FIG. 51.

When the shift cam gear 312 further rotates counterclockwise following the placement of the magazine casing 100 as described above, the toothed portion of the intermediate gear 312b engages with the vertical-shifting rack 321 of the rear shift plate 320. Then, the rear shift plate 320 slides leftward, so that the vertical-guiding pin 351 formed on the rear of the vertical-tracking chassis 350 is urged upward by the rear stepped cam 322, as shown in FIG. 55.

Simultaneously, similarly to the first embodiment, the link plate 330 urged by the rear shift plate 320 rotates, and the left shift plate 340 slides forward, so that the vertical-guiding pin 351 formed on the left of the vertical-tracking chassis 350 is urged upward by the left stepped cam 341 of the left shift plate 340.

Accordingly, the vertical-guiding pins 351 are urged upward, and the vertical-tracking chassis 350 moves upward. When the arrival of the vertical-tracking chassis 350 at a position corresponding to a desired tray 110 (the third tray 110 from above) is detected by the photodetector 15, a stop signal is transmitted to the loading motor 311 to stop the loading gear 310. Thus, the rear shift plate 320 is stopped, and the vertical-tracking chassis 350 is stopped.

3. Magazine Unlocking Operation (Initial State)

The tray gear 374 corresponds to the gear groove 116a formed in the tray 110 in the magazine casing 100, as shown in FIG. 51. The intermediate gear 373 faces the non-toothed portion of the tray driving gear 372c of the large cam gear 372, so that the intermediate gear 373 and the tray gear 374 are stopped.

(Upward Movement of the Drive Unit 370)

When the disk selecting operation is effected by the upward movement of the vertical-tracking chassis 350 from the initial state as described above, the drive unit 370 also moves upward. Then, the gear groove 116a of the desired tray 110 (the third tray 110 from above) and the gear grooves 116a of the higher trays 110 engage with the tray gear 374.

(Rotation of the Tray 110)

Next, the driving motor 361 is started to rotate the large cam gear 372 clockwise. Then, the toothed portion of the tray driving gear 372c meshes with the intermediate gear 373, and the intermediate gear 373 rotates counterclockwise, so that the tray gear 374 rotates clockwise. Therefore, the three trays engaged with the tray gear 374 by the gear grooves 116a thereof rotate counterclockwise simultaneously. At this time, the periphery of the trays 110 are guided by the side walls 122a provided on the magazine upper section 120.

(Unlocking)

Figure 57B:
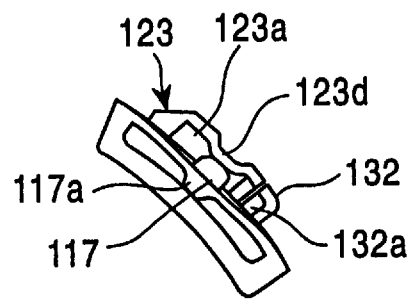
FIG. 57B is a transparent plan view showing a magazine released state and a disk holding state.

When the trays 110 are rotated, the tray-supporting projections 117 and 118 formed on the periphery of the trays 110 enter into the slits 123a of the upper slit section 123, as shown in FIG. 57B. At this time, the uppermost tray-supporting projections 117 and 118 also moves toward the upper slit section 123 from the uppermost boundary of the upper slit section 123 and the lower slit section 132, so that there is no member for restricting the vertical shift of the slit sections 123 and 132. Accordingly, the magazine upper section 120 and the magazine lower section 130 are placed in an unlocked state.

Since the tray-supporting projections 117 and 118 of the rotated three trays 110 are supported only be the upper slit section 123, the trays 110 are released from the magazine lower section 130 so as to be lifted together with the magazine upper section 120. In addition, the tray-supporting projection 117 is pressed inward by the protuberance 123d formed in the slit 123a, and the pressed section 119a is pressed by the presser surface 127 formed on the magazine upper section 120, so that the disk holding projections 117a and 119 projects inward to hold the disk D.

(Stop of the Tray Gear 374)

When the large cam gear 372 further rotates clockwise after the trays 110 have been rotated by predetermined degrees, the toothed portion of the tray driving gear 372 is disengaged from the intermediate gear 373 and the non-toothed portions thereof face each other, so that the tray gear 374 is stopped together with the intermediate gear 373. Accordingly, the rotation of the trays 110 is stopped in the disk holding state as described above.

4. Magazine Dividing Operation (Upward Movement of the Magazine Holder 210)

Figure 58:
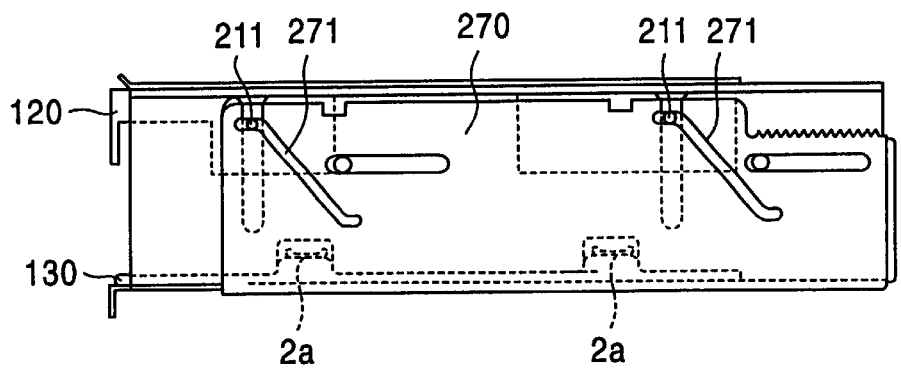
FIG. 58 is a transparent right-hand side view showing a magazine divided state in FIG. 53.

When the magazine shift motor is started after unlocking the magazine casing 100 as described above, the right magazine shift plate 270 slides rearward. Accordingly, as shown in FIG. 58, the inclined cams 271 formed in the right magazine shift plate 270 urges the right holder guide pins 211 upward.

Simultaneously, as shown in FIG. 51, the right end of the magazine shift link 260 coupled to the right magazine shift plate 270 is urged rearward, so that the magazine shift link 260 rotates counterclockwise. Then, as shown in FIG. 52, the left magazine shift plate 250 coupled to the left end of the magazine shift link 260 is biased to slide forward. Accordingly, the inclined cam 251 formed in the left magazine shift plate 250 urges the left holder guide pin 211 upward.

When the holder guide pins 211 are biased upward as described above, the magazine holder 210 moves upward to the magazine full-open position, and the position of the magazine shift plates 240 is detected by the magazine open switch 14, and the magazine shift motor 221 is stopped.

(Division of the Magazine)

By the upward movement of the magazine holder 210, the magazine upper section 120 gripped by the upper gripping pawls 210b is lifted together with the three trays 110, similarly to FIG. 36. The magazine lower section 130, however, stays downward together with the two trays 210 because it is gripped by the lower gripping pawls 2a. Accordingly, the magazine casing 100 is divided into upper and lower sections in the chassis unit 1. In addition, the disk D on the magazine upper section 120 is held by the disk-holding projections 117a and 119 of the tray 110, it moves upward together with the tray 110 without dropping.

5. Swing Unit Transferring Operation (Rotation of the Swing Chassis 420)

Figure 59:
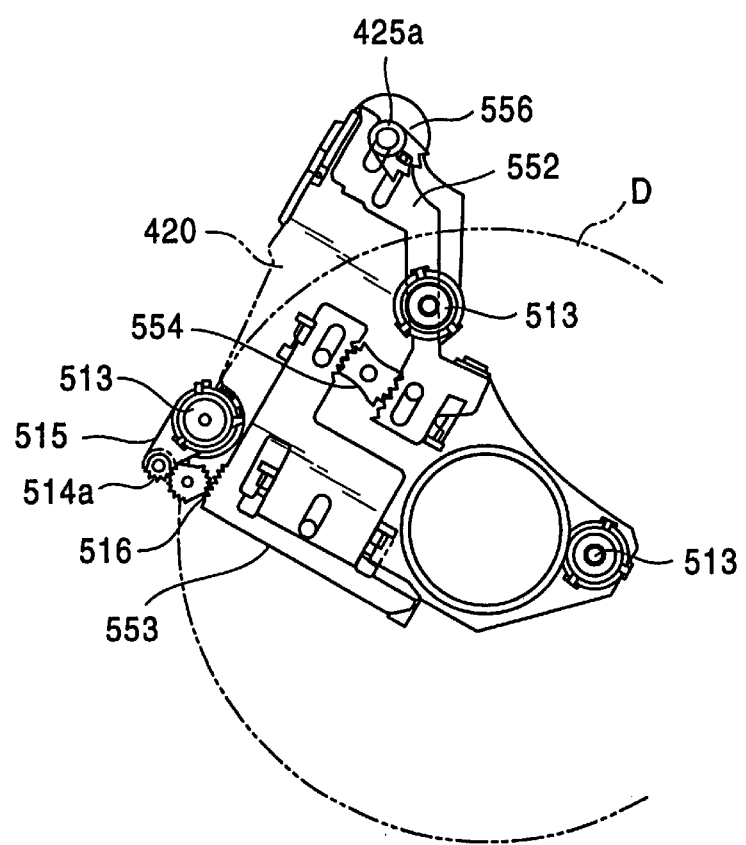
FIG. 59 is a partially transparent plan view showing the transferred swing unit in the second embodiment shown in FIG. 51.

The driving motor 361 is driven to further rotate the large cam gear 372 clockwise after the completion of the division of the magazine casing 100. Then, as shown in FIG. 59, the toothed portion of the transferring gear 372a meshes with the transfer-rotation gear 425b, so that the swing chassis 420 starts to rotate clockwise about the transfer-rotation shaft 425a.

When the swing chassis 420 is continuously rotated, the overall swing unit 400 is transferred into the space between the divided magazine upper section 120 and the magazine lower section 130. When the turntable 520 reaches the center of the disk D, an end of the swing chassis 420 abuts against a control section (not shown) provided on the vertical-tracking chassis 350 to stop. When such a completion of transferring of the swing chassis 420 is detected by the brush switch 364, the driving motor 361 is stopped.

6. Disk Chucking Operation

The drive unit 500 formed on the swing unit 400 that has been transferred as described above is in a floating locked position, and the turntable 520 is located at a position corresponding to the center hole of the disk D. In this state, when the magazine shift motor 221 is started to move the magazine holder 210 to the disk chucking position, the position of the magazine shift plate 240 is detected by the chucking switch 13, and the magazine shift motor 221 is stopped.

When the magazine holder 210 moves downward to the intermediate position, the magazine upper section 120 held by the magazine holder 210 also moves downward. Then, the disk D held in the third tray 110 is pressed onto the turntable 520, and the disk insertion section 524 is inserted into the center hole of the disk D, and the hooking section 525a of the disk hook 525 engages with the upper end of the center hole of the disk D, so that the disk D is held on the turntable 520.

7. Disk Releasing Operation (Rotation of the Tray 110)

The driving motor 361 is driven to further rotate the large cam gear 372 clockwise after the completion of the disk chucking operation. Then, the toothed portion of the tray driving gear 37c meshes with the intermediate gear 373, and the intermediate gear 373 is rotated counterclockwise, so that the tray gear 374 is rotated clockwise. Therefore, the three trays 110 engaged with the tray gear 374 by the gear grooves 116a thereof are further rotated counterclockwise.

(Release of the Disk D)

Figure 57C:
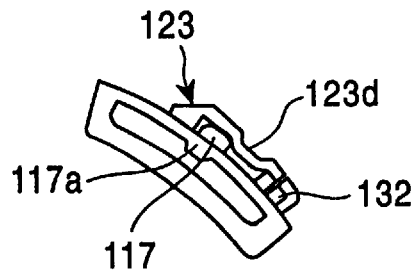
FIG. 57C is a transparent plan view showing a disk releasing state.

At this time, the tray-supporting projection 117 is disengaged from the protuberance 123d formed in the slit 123a, as shown in FIG. 57C, and the pressed section 119a is allowed to come off the presser surface 127 provided on the magazine upper section 120. Thus, the disk-holding projections 117a and 119 return outside to release the disk D.

8. Magazine Retracting Operation

When the magazine shift motor 221 is started to move the magazine holder 210 upward to the magazine full-open position after releasing the periphery of the disk D as described above, the position of the magazine shift plate 240 at this time is detected by the magazine open switch 14, and the magazine shift motor 221 is stopped.

When the magazine holder 210 moves upward to the magazine full-open position again as described above, the magazine upper section 120 held by the magazine holder 210 also moves upward. Accordingly, three trays 110 in the magazine upper section 120 are lifted except one disk D chucked on the turntable 520, whereby a clearance required for the playback of the disk D is conserved.

9. Floating Lock Releasing Operation

Figure 60:
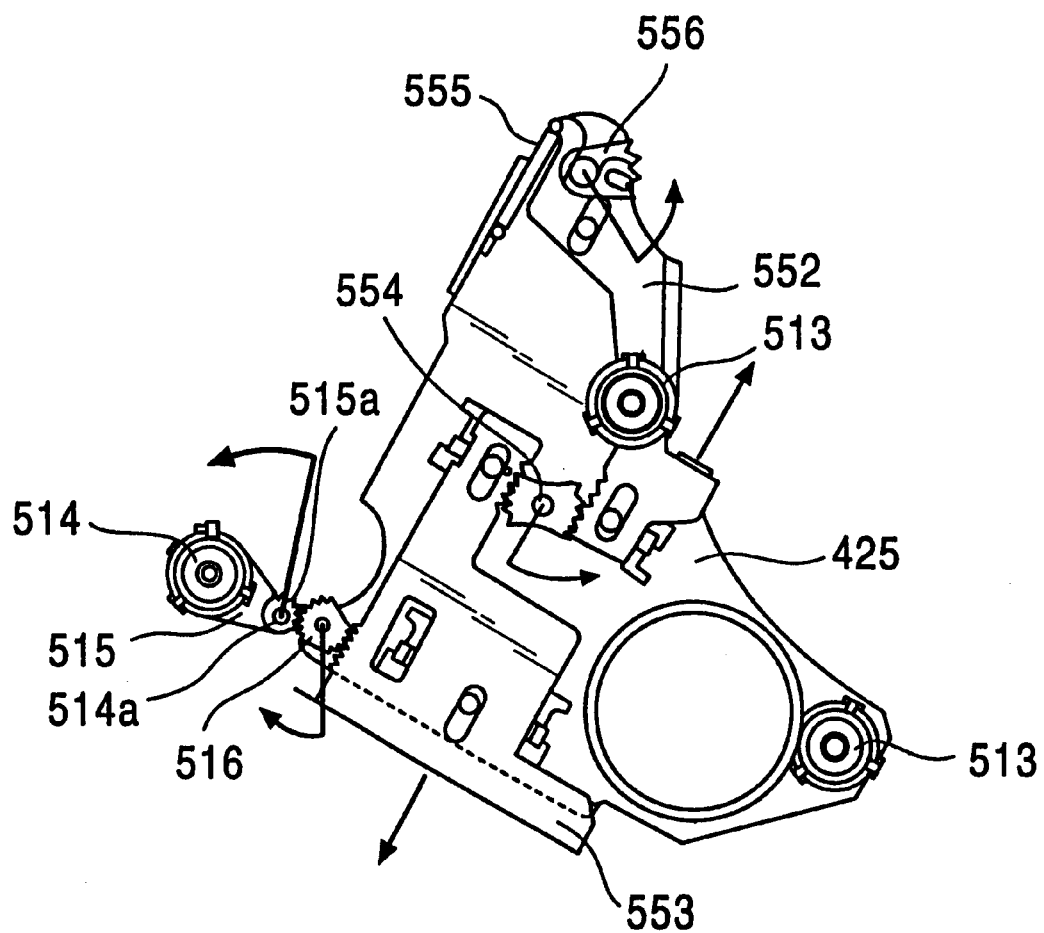
FIG. 60 is a partially transparent plan view showing a floating lock releasing operation and a damper retracting operation in the second embodiment shown in FIG. 51.

When the large cam gear 372 further rotates clockwise after the completion of the magazine retracting operation, the floating lock-actuating gear 372d meshes with the floating lock gear 556, so that the floating lock gear 556 is rotated counterclockwise. Then, as shown in FIG. 60, since the floating lock gear 556 is partially rotatably coupled to the left end section of the first lock plate 552, the first lock plate 552 slides in a direction shown by the arrow in the drawing.

The action of the first lock plate 552 is transmitted as the action in the reverse direction to the second lock plate 553 via the reverse link 554, so that the second lock plate 553 and the first lock plate 552 slide in the reverse direction. Therefore, the conical projections 511a of the drive base 510 are released from the locking holes 552a and 553a formed in the first and second lock plates 552 and 553.

Furthermore, since the action of the second lock plate 552 is transmitted to the damper arm gear 515a via the damper rotating gear 516, the damper arm is rotated counterclockwise. Then, the movable damper 514 retracts from the movable range of the optical pickup 530 (accommodation position) to the outside of the drive base 520 (playback position) to support the drive base 520 in this state. Accordingly, the drive base 510 is placed in a floating state supported only by two fixed dampers 513 and one movable damper 514.

10. Disk Playback Operation

After placing the drive base 510 in the floating state as described above, the playback operation of the disk D on the turntable 520 is performed. Since the drive base 520 is in the floating state, external vibrations are absorbed by the dampers 511, and the turntable 520 and the optical pickup 530 are not affected by the vibrations, so that information of the disk D can be read accurately.

11. Disk Re-Accommodating Operation

An operation for re-accommodating the playback-completed disk D in the tray 110 of the magazine casing 100 will now be described.

(Floating Re-Locking Operation)

When the driving motor 361 is started to rotate the large cam gear 372 counterclockwise after stopping the rotation of the turntable 520, the floating lock gear 556 is rotated clockwise. Then, the first lock plate 552 slides leftward and the second lock plate 553 slides rightward, so that the conical projections 511*a* of the drive base 510 engage with the locking holes 552*a* and 553*a*.

Further, the action of the second lock plate 553 is transmitted to the damper arm gear 515*a* via the damper rotating gear 516, and the damper arm 515 rotates clockwise, so that the movable damper 514 returns from the outside of the drive base 520 (playback position) into the movable range (accommodation position).

(Disk Re-Gripping Operation)

When the magazine shift motor 221 is started to move the magazine holder 210 downward to the disk chucking position in a state where the drive base 510 is floating locked to restrict displacement thereof, the position of the magazine shift plate 240 at this time is detected by the chucking switch 13, and the magazine shift motor 221 is stopped. When the magazine holder 210 moves downward to the disk chucking position again as described above, the third tray 110 in the magazine upper section 120 approaches the disk D on the turntable 520.

When the driving motor 361 is continuously driven to rotate the large cam gear 372 counterclockwise, the toothed portion of the tray driving gear 372*c* meshes with the intermediate gear 373, and the intermediate gear 373 is rotated clockwise, so that the tray gear 374 is rotated counterclockwise. Therefore, three trays 110 engaged with the tray gear 374 by the gear grooves 116*a* thereof are rotated clockwise.

At this time, since the tray-supporting projection 117 is pressed by the protuberance 123*d* formed in the slit 123*a*, and the pressed section 119*a* is pressed by the presser surface 127 formed on the magazine upper section 120, the disk-holding projections 117*a* and 119 project inward to hold the disk D.

(Disk Chucking Releasing Operation)

When the magazine shift motor 221 is started to move the magazine holder 210 upward to the magazine full-open position, the position of the magazine shift plate at this time is detected by the magazine open switch 14, and the magazine shift motor 221 is stopped.

When the magazine holder 210 moves upward to the magazine full-open position, the magazine upper section 120 held by the magazine holder 210 also moves upward. Accordingly, the disk D held by the disk-holding projections 117*a* and 119 of the third tray 110 falls out of the disk insertion section 524 at its center hole, and moves upward together with the magazine upper section 120.

(Swing Unit Drawing Operation)

The driving motor 361 is driven to rotate the large cam gear 372 counterclockwise after releasing the chucking of the disk D. Then, the toothed portion of the transferring gear 372*a* meshes with the transfer-rotation gear 425*b*, so that the swing chassis 420 starts to rotate clockwise about the transfer-rotation shaft 425*a*.

When the swing chassis 420 continues to rotate, the overall swing unit 400 is drawn out of the space between the divided magazine upper section 120 and the magazine lower section 130 to return to the initial position of the left rearward of the chassis unit 1.

(Magazine Uniting Operation)

When the magazine shift motor 221 is started to move the magazine holder 210 downward to the magazine insertion-ejection position after the swing unit 400 has been drawn out as described above, the position of the magazine shift plate 240 at this time is detected by the magazine close switch 12, and the magazine shift motor 221 is stopped.

The magazine upper section 120 gripped by the magazine holder 210 moves downward together with the three trays 110 to be united with the magazine lower section 130 that has been stayed downward with the two trays 110.

(Magazine Locking Operation)

When the large cam gear 372 is rotated counterclockwise, the toothed portion of the tray driving gear 372 meshes with the intermediate gear 373, and the intermediate gear 373 is rotated clockwise, so that the tray gear 374 rotates counterclockwise. Therefore, the three trays 110 engaged with the tray gear 374 by the gear grooves 116*a* thereof are further rotated clockwise.

When the trays 110 are rotated as described above, the tray-supporting projections 117 and 118 enter the slits 132*a* of the lower slit section 132. At this time, only the uppermost tray-supporting projections 117 and 118 are located over the boundary of the upper slit section 123 and the lower slit section 132, and the lower tray-supporting projections 117 and 118 completely enter into the lower slit section 132. Accordingly, the magazine upper section 120 and the magazine lower section 130 are placed in a locked state.

12. Vertical-Tracking Chassis Moving-Down Operation

When the loading motor 311 is started to rotate the sift cam gear 312 clockwise after the completion of locking of the magazine casing 100 as described above, the toothed portion of the intermediate gear 312*b* engages with the vertical-shifting rack 321 of the rear shift plate 320. Then, the rear shift plate 320 slides in a lateral direction, so that the vertical-guiding pin 351 of the vertical-tracking chassis 350 is urged downward by the rear stepped cam 322.

Simultaneously, the link plate 330 urged by the rear shift plate 320 is rotated, and the left shift plate 340 slides rearward, so that the vertical-guiding pin 351 formed on the left of the vertical-tracking chassis 350 is urged downward by the left stepped cam 341 of the left shift plate 340.

Since the vertical-guiding pins 351 are urged downward as described above, the vertical-tracking chassis 350 moves downward to return to the initial lowermost position. The intermediate gear 312*b* of the shift cam gear 312 faces the vertical-shifting rack 321 at its non-toothed portion, so that the rear shift plate 320 is stopped.

13. Magazine Ejecting Operation

When the shift cam gear 312 is continuously rotated clockwise, the lower gear 312*c* engages with the loading rack 650*a* of the rack plate 650, so that the rack plate 650 slides leftward. Then, the cutout 650*b* of the rack plate 650 urges the projection 660*a* of the catching arm 660 leftward, so that the catching arm 660 is rotated counterclockwise to move the ejecting member 630 forward.

The catching section 631 of the ejecting member 630 engages with the recess 131*a* of the magazine lower section 130, the magazine casing 100 is ejected with the forward movement of the ejecting member 630. When the magazine casing 100 is ejected from the magazine insertion opening 2 by a predetermined amount, the loading motor 311 is stopped by the eject end switch 11, and the loading arm 620 stays at the ejecting completion position. In this state, the user pulls the magazine casing 100 out of the magazine insertion opening 2.

(3) Effects

The second embodiment described above offers the following advantageous effects. That is, since the disk D is held by forming the protuberance 123d within the upper slit section 123 without providing a member such as the planetary gear 112 in the first embodiment, locking of the magazine casing 100, selection of the disk, holding of the tray 110, releasing and holding of the disk can be realized by a simpler configuration.

In addition, when the swing chassis 420 is not transferred, the movable damper 514 is located at the accommodation position. Thus, space required for the movable damper 514 is saved, thereby allowing a reduction in size of the overall apparatus. Since the movable damper 514 reaches the retracted position when the swing unit 400 is transferred, sufficient distance between the dampers is secured, and the vibration-reducing capability is not damaged.

Furthermore, since the movable damper 514 is rotated in synchronism with the floating lock mechanism 550, the movable damper 514 can be moved to the retracted position only when damper support is required.

Third Embodiment

Figure 61:
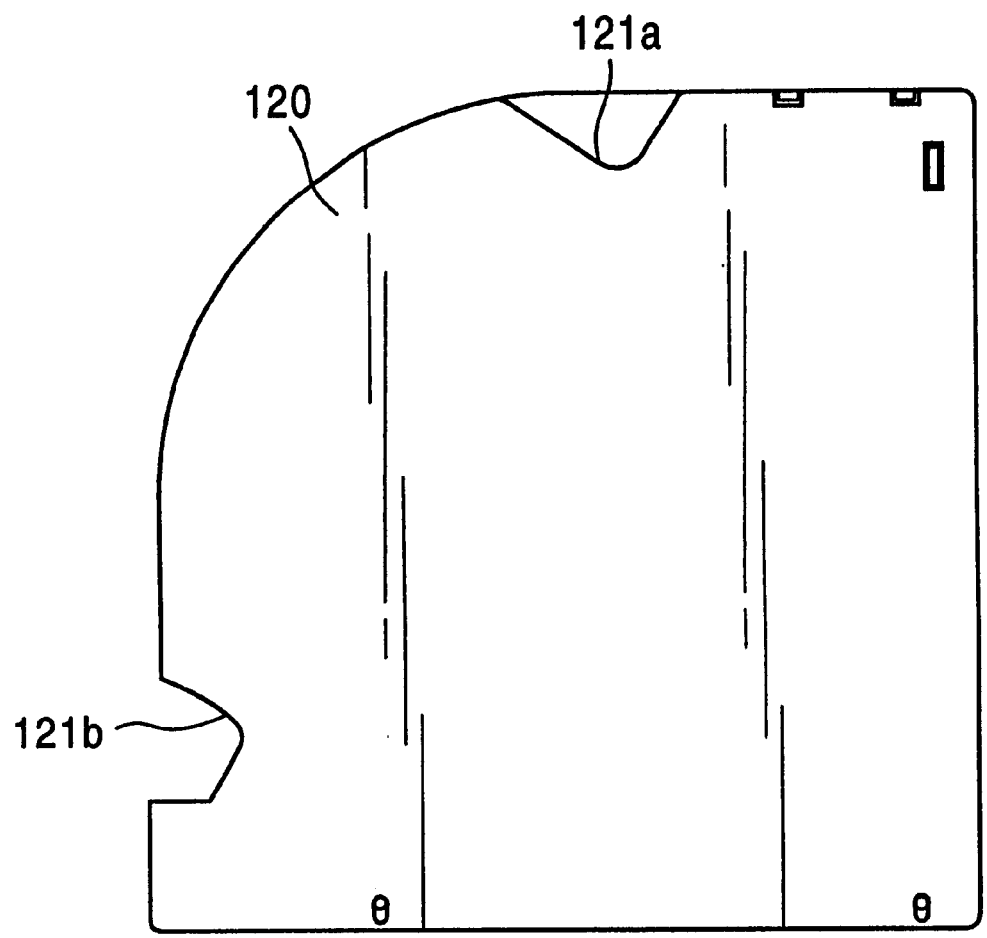
FIG. 61 is a plan view showing a disk magazine in accordance with a third embodiment of the present invention.

A third embodiment of the present invention will now be described with reference to FIG. 61.

(1) Configuration

The configuration of the disk magazine in this embodiment is substantially the same as that of the disk magazine of in the first embodiment. As shown in FIG. 61, however, in the disk magazine of this embodiment, a first cutout 121a is formed in the rear center of an upper plate 121 of a magazine upper section 120. In addition, a second cutout 121b is formed in the front left edge of the upper plate 121.

(2) Operation and Effects

According to the third embodiment, the outer periphery of a disk D completely accommodated in a magazine casing 100 is substantially covered with the magazine upper section 120 and the magazine lower section 130. Accordingly, the exposed disk D may not be scratched when the disk magazine is inserted into and ejected from the disk apparatus or during transport of the disk magazine.

When the disk ejection lever 125 shown in FIG. 28 is rotated to partly eject the disk D, a part of the outer periphery of the disk D is exposed from the first cutout 121a and the second cutout 121b. Accordingly, the disk can easily be taken out of the disk magazine by being grasped at its exposed edge without being touched by hands at the signal-encoding surface thereof, thereby preventing fingerprints from being left on the signal-encoding surface.

In addition, only the first and second cutouts 121a and 121b are formed, manufacturing costs can be saved.

Modifications

The present invention is not limited to the embodiments described above, and factors such as the number, shape, size, and so forth of each member may be changed as necessary.

For example, any number of the trays 110 may be provided in the magazine casing 100 as long as the plural number. Accordingly, the number of the slits 123a, 132a, and 212 may be changed. In addition, any of the trays 110 other than the third tray 110 may be selected by lifting the vertical-tracking unit 300.

The cutouts in the third embodiment may be formed in either or both of the upper plate 121 of the magazine upper section 120 and the lower plate 131 of the magazine lower section 130. In addition, one three or more cutouts may be formed, and the shape thereof may be freely selected.

It is possible that the magazine casing 100 is divided by moving upward and downward the magazine lower section 130, and the disk D is chucked on the downward-facing turntable 520 to perform disk playback operation.

In addition, any disk-like recording medium may be employed in the present invention. The present invention may be applied not only to playback apparatuses but also to apparatuses capable of recording and playback.

As will be understood from the foregoing description, the present invention provides a disk apparatus that can realize an advantageous operation by preventing a shift caused in dividing a disk magazine into upper and lower sections or in uniting the divided sections of the disk magazine with a simple mechanism.

In addition, the present invention provides a compact disk apparatus that can provide a transfer structure of a disk playback section and a lift structure of a magazine holder in a narrow space.

Further, the present invention provides a compact disk apparatus that can save space for dampers without damaging the vibration-reducing capability.

Still further, the present invention provides a disk apparatus that can more firmly hold a swing unit provided with a disk playback section, and that is resistant to vibrations during playing back of the disk.

In addition, the present invention provides a disk magazine that can prevent contamination of a signal-encoding surface when loading and unloading a disk, and prevent damage to the disk when being inserted into and ejected from a disk apparatus.

What is claimed is:

1. A disk apparatus comprising:
    a disk magazine having a plurality of trays, each tray having mounted therein a disk, said disk magazine divided into upper and lower sections;
    a chassis unit for removably receiving and mounting therein said disk magazine;
    a magazine dividing section for dividing and uniting said disk magazine when said disk magazine is mounted in said chassis unit;
    a disk selecting section for selecting a desired disk;
    a swing unit transferred into a space between the divided upper and lower sections of said disk magazine; and
    a disk playback section provided on said swing unit for playing back the disk selected by said disk selecting section;
    wherein said disk playback section is supported on said swing unit by a plurality of dampers;
    wherein at least one of said dampers is a movable damper provided so as to move between an accommodation position within a movable range of said disk playback section and a retracted position beyond the movable range of said disk playback section.

2. A disk apparatus according to claim 1, further comprising:
    a floating lock mechanism for providing a first floating locked state in which deviation of said disk playback section is restricted before said swing unit is transferred, and for providing a second floating locked state in which said disk playback section is supported by only said dampers after said swing unit has been transferred; and
    a gear mechanism for synchronizing said floating lock mechanism and said movable damper so that said movable damper is located on said accommodation position when said disk playback section is in the first floating locked state, and said movable damper is located at said retracted position when said disk playback section is in the second floating locked state.

3. In a disk apparatus having a chassis unit that can receive a disk magazine with a plurality of trays for supporting a plurality of disks, the disk magazine being dividable into upper and lower sections, the disk being individually selectable for playing information on the disks with a disk playback section, the improvement of a disk drive for the disk playback section comprising:

a drive base, a plurality of damper units for supporting the drive base;

a turntable unit on the drive base for receiving a disk;

an optical pickup for reading information on the disk; and a floating lock mechanism for locking the drive base by gripping it on opposite sides including a lock link, a first lock link plate connected to the lock link, a reverse link mounted on the first lock link plate and a second lock link plate operatively connected to the reverse link, wherein the first lock link plate and the second lock link plate are spring biased towards each other and the drive base is gripped by the respective first and second link plates.

4. The disk apparatus of claim 3 wherein the drive base is supported by three damper units and a tray guide projection can abut against a tray holding a disk to be mounted on the turntable.

5. The disk apparatus of claim 3 wherein the turntable unit includes a spring biased cylindrical sleeve unit for insertion into a center hole of a disk.

6. The disk apparatus of claim 5 further including disk hooks for holding the disk when the disk is mounted on the cylindrical sleeve unit.

7. The disk apparatus of claim 6 wherein each disk hook has a hooking section that is biased by the spring biased cylindrical sleeve unit to open and close on the disk.

8. The disk apparatus of claim 3 further including a swing unit for supporting the drive unit, the swing unit can be transferred into a space created by dividing the upper and lower sections of the disk magazine.

9. The disk apparatus of claim 3 wherein the lock link is rotatably mounted to engage a roller member stationary with the chassis unit.

10. The disk apparatus of claim 3 wherein the first lock link plate and the second lock link plate are slidably mounted on a swing unit.

11. The disk apparatus of claim 3 wherein a locking hole is provided on respectively the first lock link plate and second lock link plate and complementary projection for engaging the locking holes are provided on the drive base.

12. The disk apparatus of claim 3 wherein a tray guide surface is provided on the first lock plate to engage a tray when the disk magazine is mounted for loading a disk on the turntable.

13. The disk apparatus of claim 3 wherein the drive base is released from the floating lock mechanism and the plurality of damper units support the drive base during the rotation of the disk on the turntable unit to read the information on the disk whereby external vibration are absorbed by the damper units.

* * * * *